United States Patent
Bridgelall et al.

[19]

[11] Patent Number: 6,164,540

[45] Date of Patent: *Dec. 26, 2000

[54] OPTICAL SCANNERS

[75] Inventors: Raj Bridgelall, Mount Sinai; Edward Barkan, Miller Place; Stephen Shellhammer, Lake Grove; Joseph Campanelli, Selden; Joseph Katz, Stony Brook; Yajun Li, Oakdale; Daniel R. McGlynn, Brooklyn, all of N.Y.

[73] Assignee: Symbol Technologies, Inc., Holtsville, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/651,613

[22] Filed: May 22, 1996

[51] Int. Cl.[7] .................................................. G06K 7/10
[52] U.S. Cl. ............................... 235/462.01; 235/455
[58] Field of Search .................... 235/472.01, 462.01, 235/455

[56] References Cited

U.S. PATENT DOCUMENTS

| | | |
|---|---|---|
| 3,796,862 | 3/1974 | Asija . |
| 3,798,458 | 3/1974 | Buckingham et al. ................. 235/463 |
| 3,892,949 | 7/1975 | Dodson, III . |
| 3,932,840 | 1/1976 | Hanchett ................................. 235/463 |
| 4,160,156 | 7/1979 | Sherer .................................... 235/463 |
| 4,184,179 | 1/1980 | Demig .................................... 235/463 |
| 4,251,798 | 2/1981 | Swartz et al. . |

(List continued on next page.)

FOREIGN PATENT DOCUMENTS 0 036 950   10/1981   European Pat. Off. .

OTHER PUBLICATIONS

Ehrich et al., "Representation of Random Waveforms by Relational Trees," IEEE Transactions on Computers, vol. C–25, No. 7, pp. 725–736 (Jul. 1976).

Eklundh et al., "Peak Detection Using Difference Operators," IEEE Transactions on Pattern Analysis and Machine Intelligence, vol. PAMI–1, No. 3, pp. 317–325 (Jul. 1979).

Horowitz, "A Syntactic Algorithm for Peak Detection in Waveforms with Applications to Cardiography," Communications of the ACM, vol. 18, No. 5 (May 1975).

Kiryati et al., "Gray Levels Can Improve the Performance of Binary Image Digitizers," CVGIP: Graphical Models and Image Processing, vol. 53, No. 1, pp. 31–39 (Jan. 1991).

Pavlidis, "Algorithms for Shape Analysis of Contours and Waveforms," IEEE Transactions on Pattern Analysis and Machine Intelligence, vol. PAMI–2, No. 4, pp. 301–312 (Jul. 1980).

Pavlidis et al., "Fundamentals of Bar Code Information Theory," Computer, pp. 75–86 (Apr. 1990).

*Primary Examiner*—Harold I. Pitts

[57] ABSTRACT

An optical scanner with plural scan beam generation. Scan angle stress is configured in the beam generation.

6 Claims, 43 Drawing Sheets

U.S. PATENT DOCUMENTS

| | | | |
|---|---|---|---|
| 4,354,101 | 10/1982 | Hester et al. | 235/463 |
| 4,360,798 | 11/1982 | Swartz et al. | |
| 4,369,361 | 1/1983 | Swartz et al. | 235/470 |
| 4,387,297 | 6/1983 | Swartz et al. | 235/462 |
| 4,409,470 | 10/1983 | Shepard et al. | 235/472 |
| 4,460,120 | 7/1984 | Shepard et al. | 235/472 |
| 4,488,679 | 12/1984 | Bockholt | 235/472 |
| 4,496,831 | 1/1985 | Swartz et al. | 235/472 |
| 4,500,776 | 2/1985 | Laser | 235/162 |
| 4,740,675 | 4/1988 | Brosnan et al. | 235/462 |
| 4,746,789 | 5/1988 | Gieles et al. | 235/463 |
| 4,758,717 | 7/1988 | Shepard et al. | 235/472 |
| 4,760,248 | 7/1988 | Swartz et al. | 235/472 |
| 4,782,220 | 11/1988 | Shuren | 235/463 |
| 4,798,943 | 1/1989 | Cherry | 235/463 |
| 4,808,804 | 2/1989 | Krichever et al. | 235/462 |
| 4,855,581 | 8/1989 | Mertel et al. | 235/462 |
| 4,859,840 | 8/1989 | Hasegawa et al. | 235/463 |
| 4,896,026 | 1/1990 | Krichever et al. | 235/472 |
| 4,933,538 | 6/1990 | Heiman et al. | 235/462 |
| 4,973,829 | 11/1990 | Ishida et al. | 235/462 |
| 5,010,242 | 4/1991 | Frontino | 235/467 |
| 5,028,770 | 7/1991 | Miyazaki | 235/462 |
| 5,029,183 | 7/1991 | Tymes | 375/1 |
| 5,036,183 | 7/1991 | Ouchi et al. | 235/462 |
| 5,059,773 | 10/1991 | Shimizu et al. | 235/436 |
| 5,073,954 | 12/1991 | Van Tyne et al. | 382/18 |
| 5,128,527 | 7/1992 | Kawai et al. | 235/462 |
| 5,140,146 | 8/1992 | Metlitsky et al. | 235/462 |
| 5,206,491 | 4/1993 | Katoh et al. | 235/462.4 |
| 5,278,397 | 1/1994 | Barkan et al. | 235/462 |
| 5,302,813 | 4/1994 | Goren | 235/462 |
| 5,361,158 | 11/1994 | Tang | 235/462.4 |
| 5,457,309 | 10/1995 | Pelton | 235/462 |
| 5,510,605 | 4/1996 | Miyazaki | 235/462.4 |
| 5,532,467 | 7/1996 | Roustaei | 235/472 |
| 5,869,827 | 2/1999 | Rando | 235/462.4 |

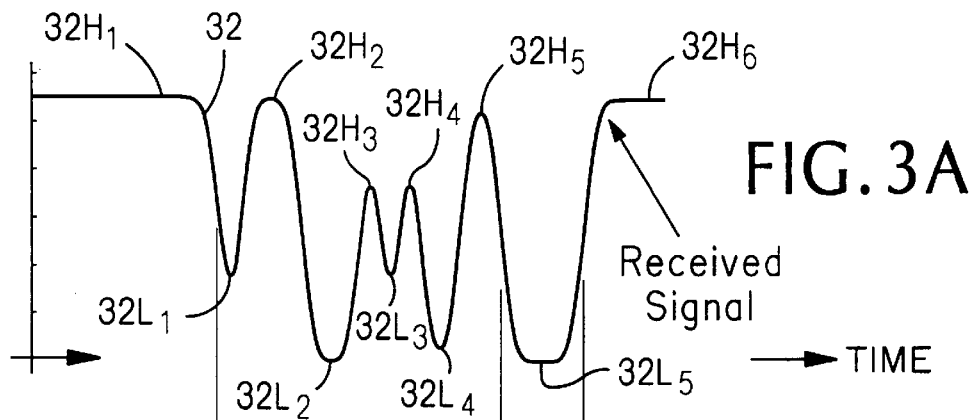
FIG. 3A — Received Signal
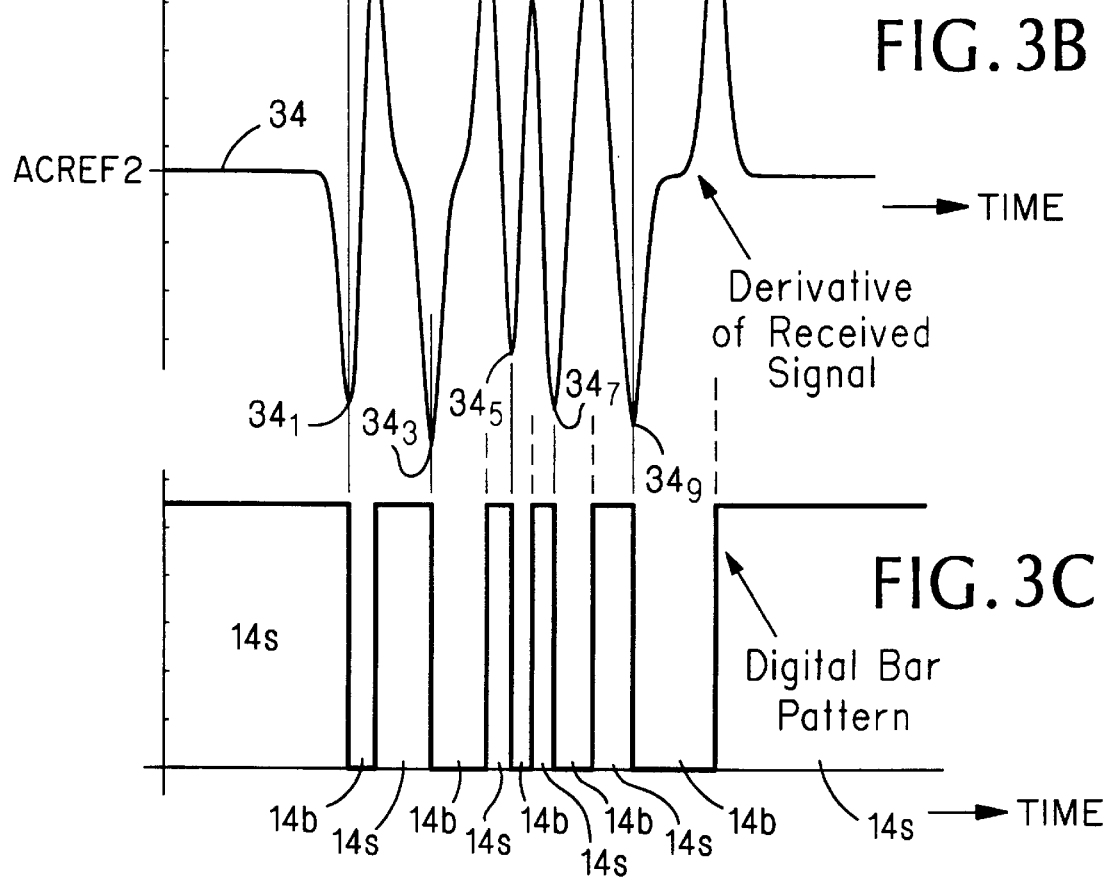
FIG. 3B — Derivative of Received Signal
FIG. 3C — Digital Bar Pattern

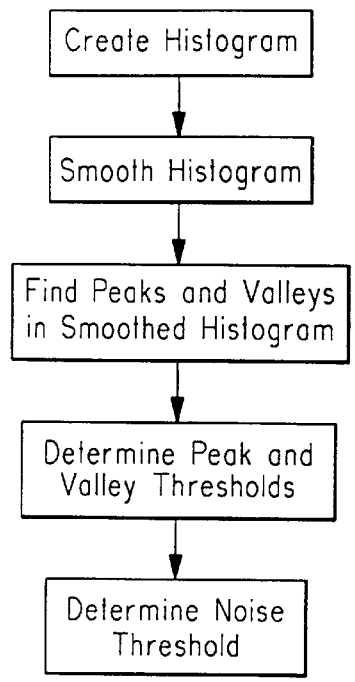
FIG. 23
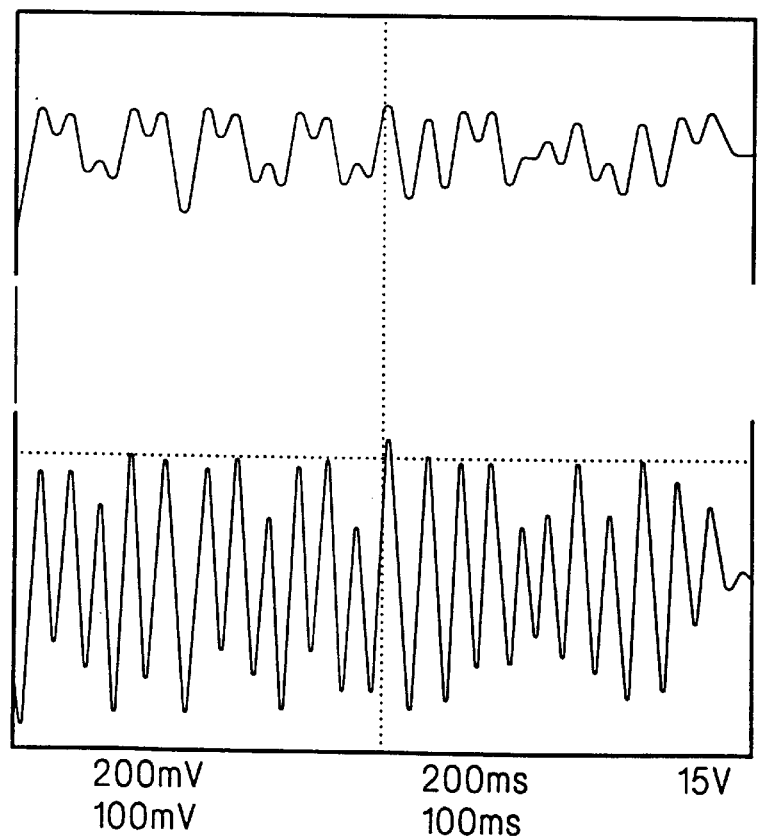
FIG. 24
FIG. 25

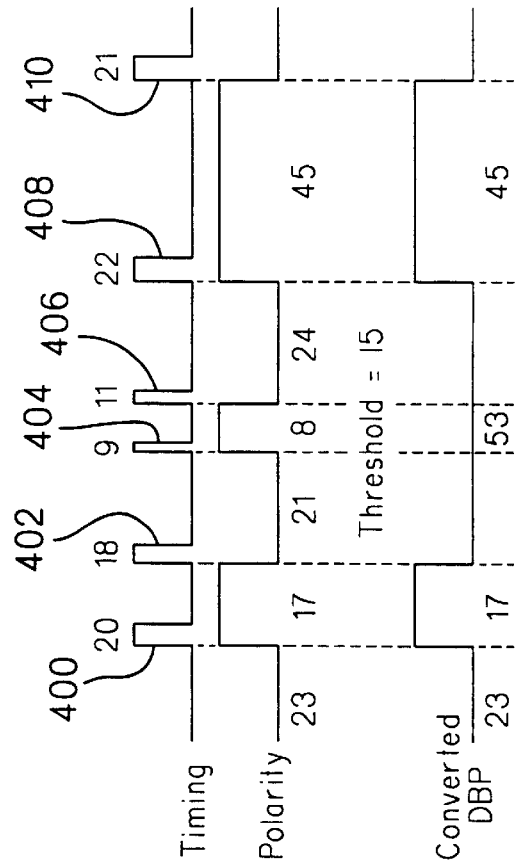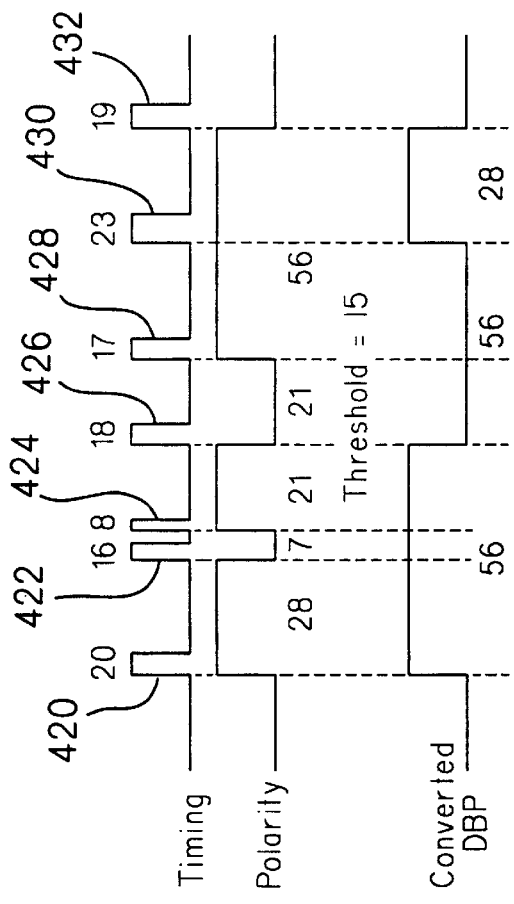
FIG. 26A Timing
FIG. 26B Polarity
FIG. 26C Converted DBP
FIG. 27A Timing
FIG. 27B Polarity
FIG. 27C Converted DBP Blurred Signal plus ambient noise
--- Ideal Barcode Reflectivity
Reflected noisy barcode signal with minimal blurring(Spot/Module Size=1)

— Full-Wave Rectified Derivative Signal
--- Ideal Barcode Reflectivity

— Blurred Signal plus ambient noise
--- Ideal Barcode Reflectivity

— Full-Wave Rectified First Derivative Signal
--- Point A signal of Peak Locator — Full-Wave Rectified First Derivative Signal
-- Point A signal of Peak Locator — Full-Wave Rectified First Derivative Signal
-- Point B signal of Peak Locator — Full-Wave Rectified First Derivative Signal
-- Point C signal of Peak Locator

OPTICAL SCANNERS

CROSS REFERENCE TO RELATED APPLICATIONS

This application relates to: U.S. patent application Ser. No. 08/335,001, filed Nov. 9, 1994; U.S. patent application Ser. No. 08/454,830, filed May 31, 1995, now U.S. Pat. No. 5,734,152; and U.S. patent application Ser. No. 08/455,216, filed May 31, 1995. This application also relates to U.S. patent application Ser. No. 08/347,597 filed Nov. 30, 1994 now U.S. Pat. No. 5,449,893, Sep. 12, 1995, which is a continuation of Ser. No. 08/153,638 filed Nov. 17, 1993 now abandoned; a patent application filed concurrently herewith entitled "Method of Scanning Indicia Using Selective Sampling", inventors David Goren, Raj Bridgelall, and Edward Barkin; to U.S. patent application Ser. No. 08/335, 001 filed Nov. 9, 1994; and, U.S. Pat. No. 5,302,813 issued Apr. 12, 1994 which related to U.S. patent application filed Apr. 4, 1992 all assigned to the same assignee as the present invention, the subject matter all of which is incorporated herein by reference, the benefit of the filing dates of one, or more, of such patent applications being claimed herein to the fullest extent allowed under the provisions of 35 U.S.C. 120.

BACKGROUND OF THE INVENTION

This invention relates to optical scanners and signal processors used therein and more particularly to bar code scanners having multi-bit digitizers used to detect a pattern of optically reflective/non reflective white space/black bar indicia and provide multi-bit digital signal representations of such indicia.

The invention further relates to a method of scanning indicia using selective sampling, particularly although not exclusively to a method of reading bar codes using a laser scanner. The invention further relates to a digitizer, for example a non-linear edge strength digitizer, to a signal processing apparatus in particular such an apparatus including a matched filter for bar code symbol reading, and to a signal processing apparatus, in particular such an apparatus including an automatic deblurring arrangement.

As is known in the art, optical scanners and signal processors used therein, have a wide range of applications. One such application is in reading bar codes provided on products. Such optical scanners are generally referred to as bar code scanners. Signals produced by the scanners are typically fed to computing apparatus for decoding and thereby provide an identification of the product to which the bar code is applied. Examples are found in almost every supermarket, convenience store, department store, etc., as well as in warehouses and factories which use such bar code scanners for inventory and production control.

Various optical readers and optical scanning systems have been developed heretofore for reading bar code symbols appearing on a label or on the surface of an article. The bar code symbol itself is a coded pattern of indicia comprising a series of adjacent bars and spaces of various widths, the bars and spaces having different light reflecting characteristics.

A number of different bar code standards or symbologies exist. These symbologies include, for example, UPC/EAN, Code 128, Codabar, and Interleaved 2 of 5. The readers and scanning systems electro-optically decode each symbol to produce multiple alphanumerical characters that are intended to be descriptive of the article or some characteristic thereof. Such characters are typically represented in digital form as an input to a data processing system for applications in point-of-sale processing, inventory control, and the like. Scanning systems of this general type have been disclosed, for example, in U.S. Pat. Nos. 4,251,798; 4,360,798; 4,369,361; 4,387,297; 4,409,470 and 4,460,120, all of which have been assigned to Symbol Technologies, Inc. As disclosed in some of the above patents, one commonly used example of such a scanning system functions by scanning the laser beam in a line across a symbol. The symbol, composed of alternating, rectangular, reflective and non-reflective segments of various widths, reflects a portion of this laser light. A photo detector then detects this reflected light and creates an electrical signal indicative of the intensity of the received light. The electronic circuitry or software of the scanning system decodes the electrical signal creating a digital representation of the data represented by the symbol scanned.

Typically, a scanner includes a light source such as a gas laser or semiconductor laser that generates a light beam. The use of semiconductor lasers as the light source in scanner systems is especially desirable because of their small size, low cost and low power requirements. The light beam is optically modified, typically by a lens, to form a beam spot of a certain size at a prescribed distance. It is preferred that the beam spot size be no larger than approximately the minimum width between regions of different light reflectivities, i.e. the bars and spaces of the symbol.

A scanner also includes a scanning component and a photo detector. The scanning component may either sweep the beam spot across the symbol and trace a scan line across the past the symbol, or scan the field of view of the scanner, or do both. The photo detector has a field of view which extends across and slightly past the symbol and functions to detect light reflected from the symbol. The analog electrical signal from the photo detector is first typically converted into a pulse width modulated digital signal, with the widths corresponding to the physical widths of the bars and spaces. This signal is then decoded according to the specific symbology into a binary representation of the date encoded in the symbol to the alphanumeric characters so represented.

In the prior art described above, a digitizer circuit may be used to translate the analog signal into a digital representation called a Digital Bar Pattern (or DBP). This simple digital representation of the data works extremely well in many situations, although it may sometimes be susceptible to unrecoverable errors if the bar code symbol to be read has substantial noise associated with it. With this prior art representation, a single extra edge detected or shifted due to noise may prevent proper decoding.

One straightforward way to acquire a more accurate representation of the bar code, for example for more aggressive or adaptive decoding, would be to sample the analog signal above the Nyquist rate, store the analog signal in memory, and then apply digital signal processing (DSP) techniques. This solution is, however, very expensive due to the large amount of samples required and the high speed processing that is necessary.

There is accordingly a need to provide a relatively cheap and reliable method of decoding an indicia (for example a bar code symbol) after the optical detection system has transduced it into a distorted analog waveform. Such a need is particularly acute where it is desired to decode the symbol aggressively, that is by attempting to decode after a single scan.

It is an object of the present invention to aim to meet this need.

It is a further object of the invention to provide an efficient and economical means of acquiring an improve representation of the bar code signal.

Where the analog signal representing the indicia that has been read is analyzed so as only to present the times at which edges (transitions between bars and spaces)—(DBP) are presented to the decoder, then not enough information is available for an optimum decode. In particular the decoder cannot analyze the signal applying different noise thresholds on the same scan data stream. To overcome this problem an edge strength value can be presented to the decoder along with the edge times having a sign indicating the edge type (bar to space or space to bar) as a result of which the decoder can try different noise thresholds for the same scan data stream by adaptably adding or removing edges based on their strengths. It is desired, however, to provide a system capable of operating in that manner using the minimum required electronics and parts thus giving rise to simplified manufacture and lower costs. It is further desired to arrive at an arrangement suitable both for standard and high speed scan engines.

It has also been established that in the scanning of printed indicia such as bar codes, the signal processing circuitry has to filter the received signal and detect the edges in the signal which originate from the bar to space or space to bar transitions in the printed bar code. Many techniques currently exist for carrying out this operation; known filters include the "real-pole", "Bessel" and "Butterworth" systems. Similarly, various types of edge detectors have been proposed including non-linear devices such as a capacitor for looking for a change in the signal. In other systems, a first derivative signal is established from the input signal and the peaks of the first derivative are detected representing transitions. A second derivative signal can also be taken in which the zero crossing point is identified representing the peak of the first derivative. Such systems are known as first derivative digitizers and second derivative digitizers respectively.

A problem in known systems is that of detecting the edges of transitions whilst simultaneously suppressing the noise in the signal. While solutions to this problem have been proposed in the communication industry, those solutions cannot be applied directly to the reading of printed indicia such as bar code symbols. For example in a communication system the bit rate is fixed but in a bar code scanner the bit rate, which is the inverse of the duration of the smallest bar or space, changes depending on the bar density, the scanning distance and the scanning speed. In addition, although most scanners have a fixed scan rate, the instantaneous scan speed in such a scanner will vary within a single scan, dependent on the location in the scan line. The scan rate of scanners can also depend on the mode of operation. Furthermore, in communication systems a bit synchronisation clock is available or can be extracted for determining when to sample the output of a filter, but in a bar code scanning system such a clock is not available and cannot be extracted as the scan speed is never constant. In particular, therefore, it is desired to solve the problems of filtering in a system that is not synchronised (with no external clock available).

It is known that the laser beam in a scanner converges to a waist and then diverges again, and that, given a fixed laser focus, the bar code image begins to blur as the scanning distance increases in either direction away from the focused position (waist) of the laser beam. This blurring is caused by the growing laser spot which has a near Gaussian intensity profile that effectively filters the sharp edges of the printed bar code. If the desired reading distance changes, therefore, this filtering effect makes edge detection difficult and erroneous and it is desired to solve that problem.

SUMMARY OF THE INVENTION

In accordance with the present invention, an optical scanning system is provided for producing a signal representative of a spatial distribution of indicia having different degrees of reflectivity to light, such as a bar code. The system includes an optical scanner for scanning beam of light over the spatial distribution of white space/black bar indicia and for producing an electrical signal corresponding to changes in the degree of reflectivity of the indicia. A digitizer, responsive to detections of a predetermined characteristic of the produced electrical signal is provided; preferably the predetermined characteristic is the strength of the edge region between a space and a bar as measured by the magnitude of the first derivative of the produced electrical signal. The digitizer converts the detections into digital words, such digital signals having a plurality of bits. Thus, preferably the digital words are related to the strength of the edge region between a space and a bar.

In a preferred embodiment, the digitizer includes a timing generation circuit for producing a timing pulse signal in response to each one of the detections with a time duration representative of the degree of reflectivity of the indicia as the beam of light. Thus, preferably the time durations of each timing pulse signal is related to the strength of an edge between a white space and a black bar. A decoder converts the time duration of the timing pulse signal into the digital word having a plurality of bits. The decoder also produces a polarity signal. The polarity signal is a bi-level (i.e., logic signal) indicating the "polarity" of the edge region producing the timing pulse signal. Here, for example, a positive edge (i.e., the polarity signal changes from a logic 0 to a logic 1) indicates a transition from a bar to a white space while a negative edge (i.e., the polarity signal changes from a logic 1 to a logic 0) indicates a transition from a white space to a bar.

With such an arrangement, the requirement of relatively expensive analog-to-digital converters is removed. Further, the interface between the digitizer and the decoder requires fewer lines.

According to the present invention there is provided a method of reading an indicia comprising areas of differing light reflectivity, comprising:
a) detecting light reflected from the indicia and producing an electrical signal representative thereof;
b) selectively sampling the signal, to produce a series of samples, at a sequence or points determined by detected features within the signal;
c) attempting to decode the indicia using at least some of the samples in the series and, if the attempt was unsuccessful:
  i) analysing the samples to provide information on the extent to which the samples appear to represent data corresponding to the indicia; and
  ii) repeating steps (a) and (b), adapting the producing of the electrical signal or the selective sampling according to the said information.

The method of the present invention allows aggressive and reliable bar code symbol decoding, after the optical detection system in the scanner has transduced it into a distorted analog waveform.

The invention allows in particular an efficient and economical means of acquiring a more accurate representation of the bar code signal (or a signal corresponding to any other indicia to be read) by selectively sampling the analog signal, or a processed analog signal at a rate which is well below the Nyquist rate. The sample points are not uniform and are chosen to represent key features related to the signal.

If an attempted decode fails, based upon the samples that have been obtained, mechanical, electrical or logical adaptations are made to the scanner in an attempt to provide an improved decode on the next scan. To that end, the decoder analyses the samples to provide information on the extent to which the samples appear to be represent data corresponding to the indicia, and the extent to which the samples are spurious (for example because they represent noise). The information thus determined is used to provide feed-back to adapt the scanner to the current scanning environment, thereby providing improved performance on the next subsequent scan.

There are many adaptions that could be made, on the basis of the information that has been determined, for example adapting the signal processing of the analog electrical signal, or changing noise thresholds, frequency bandwidths, deconvolution filters, scanning speed, scanning pattern, and laser focusing. Any one or any combination of these may be adaptively altered in the method of the present invention.

A timing signal is preferably produced which synchronizes and/or provides timing information on the samples that have been taken. In the preferred embodiment, the timing signal is a square wave which changes state whenever a sample has been taken. The timing signal provides further information which is used by the decoder, in association with the values of the samples themselves, thereby enabling the decoder to attempt to decode the indicia.

In the preferred embodiment, a sample is taken of an analog electrical signal which is representative of light which has been reflected from the indicia at positions which correspond to peaks in the derivative of the said signal. A minimum rejection level may be provided, and the detection logic arranged so that no sample is taken if the corresponding peak is smaller than the minimum level. The value of that minimum level may be one of the adaptive parameters which may be altered according to the estimated amount of noise that has been found on analysis of previous samples.

The method of the present invention may be particularly useful in devices which make use of non-conventional optics, for example axicon or holographic optics. Such optics may increase the working range of a laser scanner significantly, as is described for example in U.S. Pat. No. 5,080,456. The profile produced by such non-conventional optics are multi-modal and contain side lobes. These side lobes introduce additional "wiggles" or bumps on the analog signal. These additional "wiggles", if detected by a standard digitizer, will most probably result in an unrecoverable error in the bar code representation, thereby making the system less reliable. However, if such non-conventional optics are used in conjunction with the method of the present invention, a much more robust system can be created. Small wiggles introduced by the scanning beam profile may be ignored by the decoder, merely by properly selecting the larger features and ignoring the smaller ones.

The method of the present invention is also particularly useful in scanners that make use of enhancement filters to increase the depth of modulation, for example as described in U.S. Pat. No. 5,140,146. In such devices, the resulting enhanced analog signal normally exhibits "ringing". This ringing introduces additional "wiggles" in the analog signal, similar to those described above. However, if enhancement filters are used in conjunction with the method of the present invention, a much more robust system can be created. Small wiggles introduced by the enhancement filter can be ignored by the decoder by properly selecting the larger features and ignoring the smaller ones. This also reduces the trade-off that has to be made between reading high density bar code symbols with a very low depth of modulation, and low quality bar code symbols that might include printing noise (for example dot matrix bar codes). Aspects of the invention are claimed in the independent claims attached hereto, and preferred features are claimed in dependent claims attached hereto.

BRIEF DESCRIPTION OF THE DRAWING

FIGS. 3A, 3B are time histories of signals produced by the scanner of FIG. 1; FIG. 3A showing an output signal produced by a detector used in the scanner; FIG. 3B showing the output signal produced by a differentiator circuit used to differentiate the signal produced by the detector and shown in FIG. 3A; and FIG. 3C shows the bar code pattern scanned by the scanner to produce the signals in FIGS. 3A and 3B;

FIG. 23 is a flow diagram used by the decoder in determining the noise threshold level;

FIG. 24 is a diagram showing the time history of signals produce by a light detection section of the scanner of FIG. 1, without the enhancement filter of FIG. 7; and, FIG. 25 is a diagram showing the time history of the signals in FIG. 24 after passing through the enhancement filter of FIG. 7.

FIG. 26A is an exemplary timing history of timing pulse signals produced with the scanner of FIG. 1; FIG. 26B is a timing history of polarity signals associated with the exemplary timing pulse signals in FIG. 26B; and FIG. 26C is a timing history of the conversion of the timing pulse signals and polarity signals of FIGS. 26A and 26B.

FIG. 27A is another exemplary timing history of timing pulse signals produced with the scanner of FIG. 1; FIG. 27B is a timing history of polarity signals associated with the exemplary timing pulse signals in FIG. 27B; and FIG. 27C is a timing history of the conversion of the timing pulse signals and polarity signals of FIGS. 27A and 27B.

FIG. A.1 shows a correlation receiver for binary signals; and

FIG. A.2 shows a matched filter received for binary signals.

DESCRIPTION OF THE PREFERRED EMBODIMENTS

In one aspect the invention relates to a low cost adaptable multi-bit digitizer for standard and high speed scanners. In fact it will be appreciated from the following discussion that the invention may be incorporated in any system utilizing optical receivers, although the discussion that follows is limited to bar code scanners.

Standard digitizers suffer from the problem that as their sensitivity is increased in order to cope with higher density symbols, when poorly printed symbols are encountered there is a risk that defects may be interpreted as indicia to be read as a result of which the scanning time and efficiency and the processing of the signal may be increased in order to overcome the noise problem. This gives rise to a loss of "aggressiveness" for the scanner as a whole.

This problem has been addressed by applying multiple thresholds for the same scan but the hardware in such systems cannot be readily scaled for higher speed scan engines. Alternatively, where systems can be easily scaled for higher speed scan engines, it has not been possible to perform multiple thresholds on the same scan.

It is desired therefore to provide a decode algorithm within a digitizer with enough information about the edges detected that the probability of decoding poorly printed bar codes is greatly improved without losing decoding performance on the high density bar codes. In addition it is desirable to process signals where two adjacent edges of the same polarity are commonly found. This gives rise to the beneficial ability to try multiple thresholds on the same scan data where all of the valid and possibly invalid edge locations and edge strengths are available. In cases where only a few scans cross a bar code symbol during a single swipe, the ability to try different noise thresholds in the same scan data greatly improve the chance of decoding.

Figure 28:
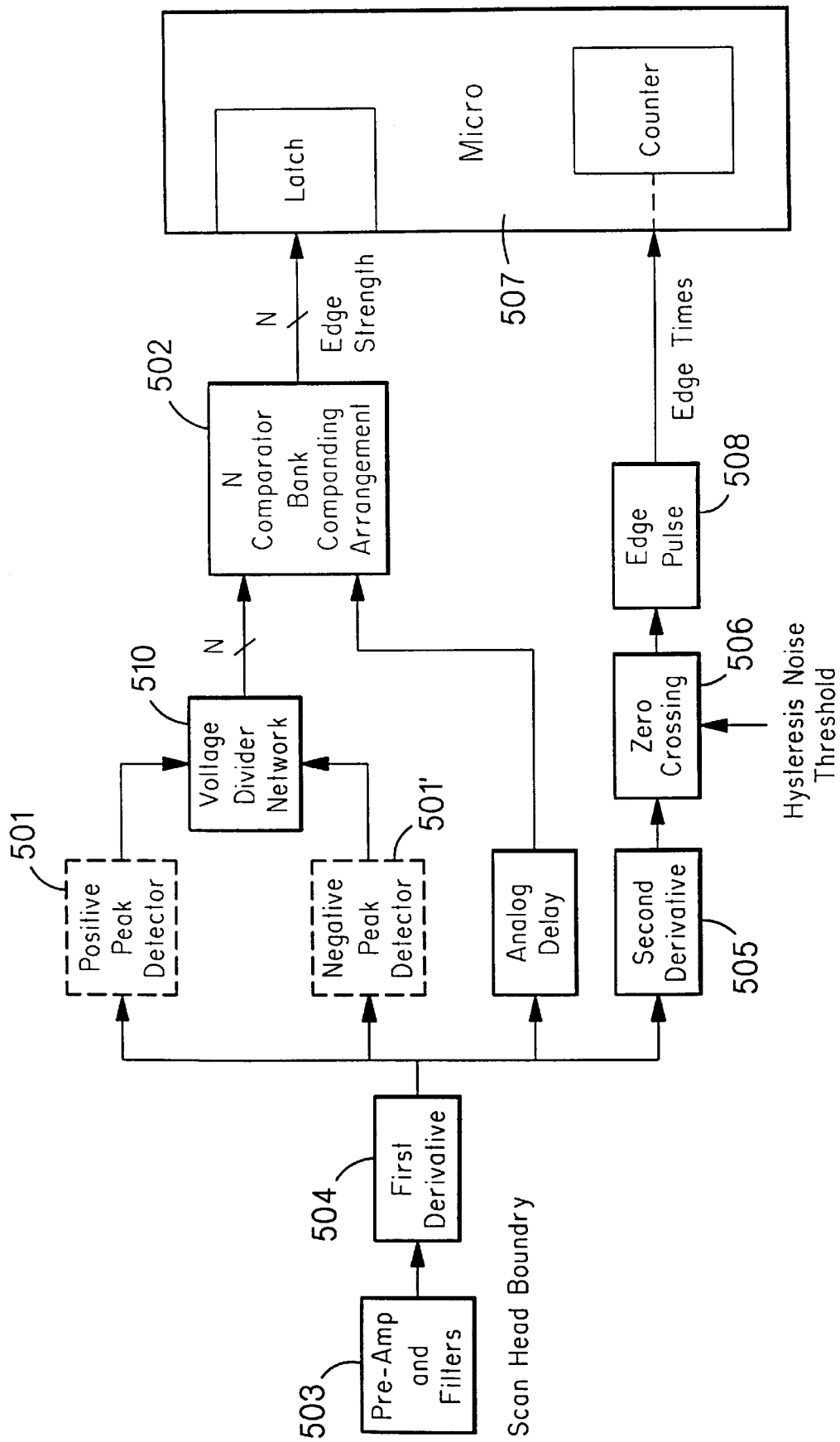
FIG. 28 shows an edge strength digitizer architecture.

Referring to FIG. 28 a low cost architecture suited for both standard and high speed scanners is shown. The architecture is adaptable, as will be described in more detail below, as it can be readily converted for tunability by tuning only the derivative functions. This is to be contrasted with prior arrangements which could not be readily redesigned for higher speeds because of the use of "timing polarity" signals to encode the edge time and strength.

The system shown in FIG. 28 can be implemented in a bar code reader comprising a scan head and a main body such that the basic scan data is analyzed and a signal representative of the first derivative of the analog signal is output from the scan head. The significance of the first derivative is discussed in more detail below. The main body of the bar code reader which may comprise a decoding terminal may house the rest of the circuitry. Such an arrangement reduces the number of signal lines between the scan head and the decoding terminal.

Figure 29:
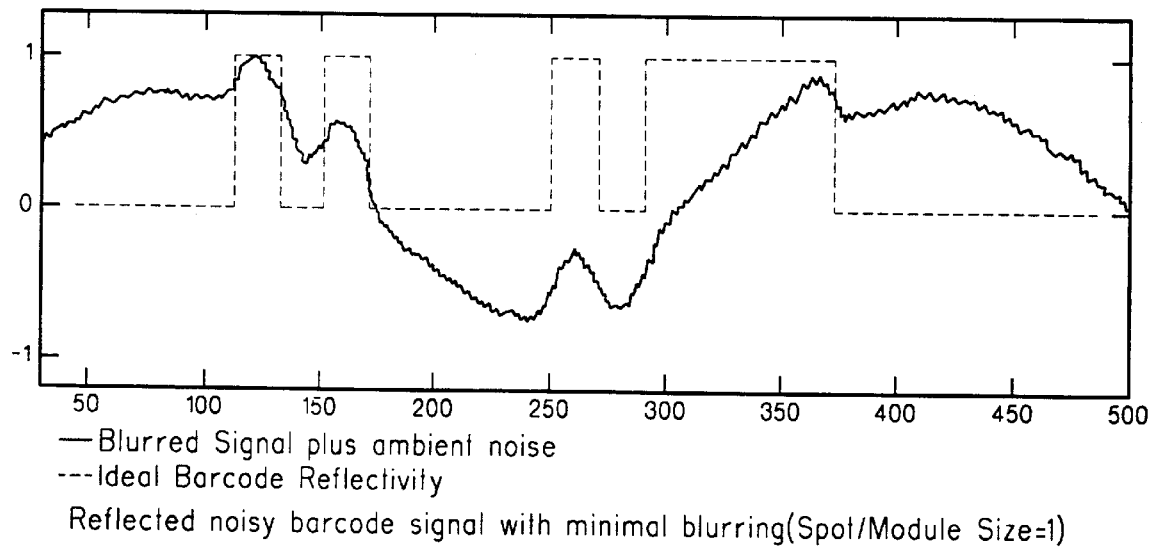
FIG. 29 represents a signal derived from a noisy bar code.
Figure 30:
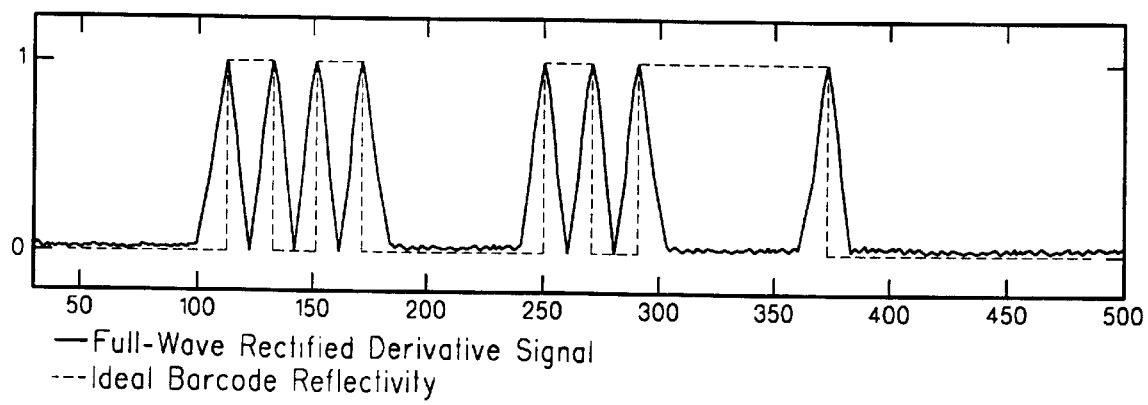
FIG. 30 represents the full-wave rectified first derivative signal of the analog signal of FIG. 29.

It is known to perform analysis of an analog signal representing a bar code symbol by taking the first derivative of that signal. Referring to FIG. 29, a noisy bar code signal is shown. The noise can be introduced, for example, by defects in the symbol to be read, by ambient noise, or by "blurring" which may take place for example because of the finite spot size of the scanning beam. The bar code symbol being read is represented by the dotted line showing the ideal reflectivity where the light portions of the bar code symbol have reflectivity 1 and the dark portions of the bar code symbol have reflectivity 0. FIG. 30 shows the information that can be derived by taking the first derivative of the noisy signal—it will be seen that the derivative signal includes peaks at each transition from dark area (bar) to light area (space) and vice versa. The signal shown is full wave rectified.

The peaks and valleys of the first derivative signal are good indicators of the "edge strength", that is, the quality of the transition between areas of differing reflectivity, as well as the level of convolution distortion.

According to the present invention it is proposed to apply non-linear quantization to the peaks and valleys of a first derivative signal. As will be explained in more detail below, only two to three bits of quantisation above and below the reference voltage are sufficient to categorise relative edge strengths. The information is thus suitable for multi-bit processing and a full featured conventional analog to digital converter is unnecessary. Instead a bank of comparators with non-linear or companding thresholds above and below a reference voltage is used. Because the conventional analog to digital converter is eliminated the conversion time latency or delay is avoided so that the edge strength data is immediately available to the decoder and the digitizer is capable of scan speeds limited only by the data processing speed of the decoder. The technique essentially implements a $\log_2(N)$ flash type analog to digital converter with non-linear quantization levels (similar to U-LAN and A-LAW companding used in PCM telephone systems, where N is the number of bits in a conventional analog to digital converter.

Referring once again to FIG. 28, positive and negative peak detectors 501, 501' allow the thresholds of a bank of comparators 502 to track with the signal strength when an automatic gain control is not available in the scan head. As a result maximum resolution is achieved throughout the scanner's working range. The system provides a window having thresholds set by a voltage divider resistor network that is symmetrical about the reference voltage. The thresholds can be arranged in a companding manner such that greater resolution is available near the reference voltage where the edge strengths are small. Alternatively the thresholds may be otherwise arranged to best fit the feature of the expected signals.

The system includes a preamplifier and suitable filters 503 for pre-processing of the input signal to a first derivative module 504 which outputs a signal representative of the first derivative of the pre-processed signal. The system also includes a second derivative module 505 and a zero crossing detector 506. It will be appreciated that the zero crossing detector will output a signal each time the second derivative signal crosses the zero line, corresponding to a peak or valley in the first derivative signal. The combination of the second derivative module 505 and the zero crossing detector 506 thus provide both edge polarity (bar to space or space to bar) and edge times to the micro controller 507 via an edge pulse detector 508. It is found that the edge detector based on the second derivative is very sensitive as a result of which enhancement filters which have been proposed before offer negligible performance benefits when reading high density symbols.

Figure 31A:
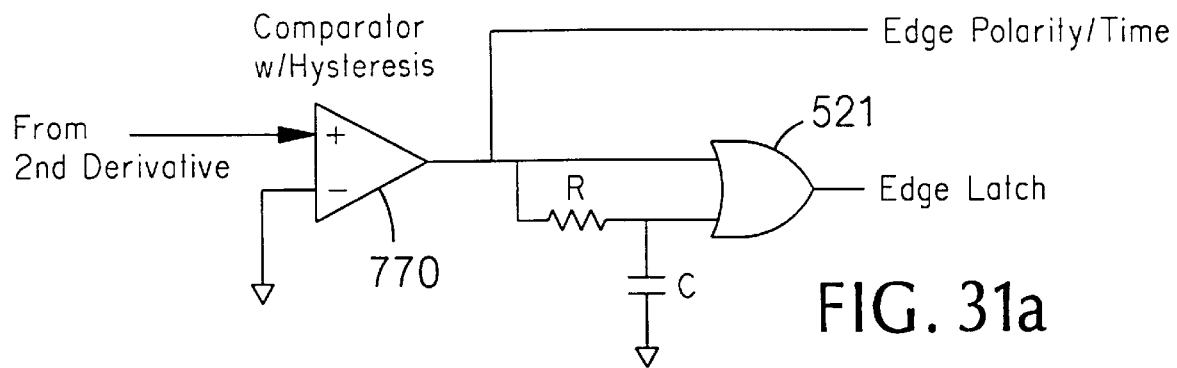
FIG. 31a shows an implementation of a zero crossing circuit.

An implementation of the zero crossing circuit is shown in FIG. 31a. FIG. 31a shows the second derivative input to the positive pin of a differential amplifier 520, the negative pin running to ground. The output provides an edge polarity and time value which also runs directly to one input of an exclusive-OR gate 521 and, in parallel, across a resistor R to the other input, a ground connection passing through capacitance C being provided between the resistor R and the input. The output of the exclusive OR gate is an edge latch signal.

The companding arrangement 502 may be of any suitable known type which will be familiar to the skilled man. In particular the term "companding arrangement" is meant in a general sense denoting that more resolution is given to the smaller valves and less to the larger valves. Thus, the window levels are close together for low voltage valves, and further apart for longer valves.

The threshold arrangement is not necessarily logarithmic as the term "companding arrangement" may imply. The skilled man will appreciate that the threshold voltages are designed taking into account many parameters of the system such as laser focusing, laser power, expected ambient light conditions, the type and quality of barcodes that the scanner is expected to read, and the level of electronic and speckle noise that is being generated in the system.

For example, the skilled man may choose to place the first threshold above the electronic noise level, a second threshold just above the noise level resulting from a combination of electronic noise plus speckle noise, and a further few thresholds above the previous two but dependent on the quality and type of barcode expected to be scanned. For example, specks and voids in poorly printed barcodes may result in signal levels higher than both the electronic noise plus speckle noise and which must be distinguished.

Figure 31B:
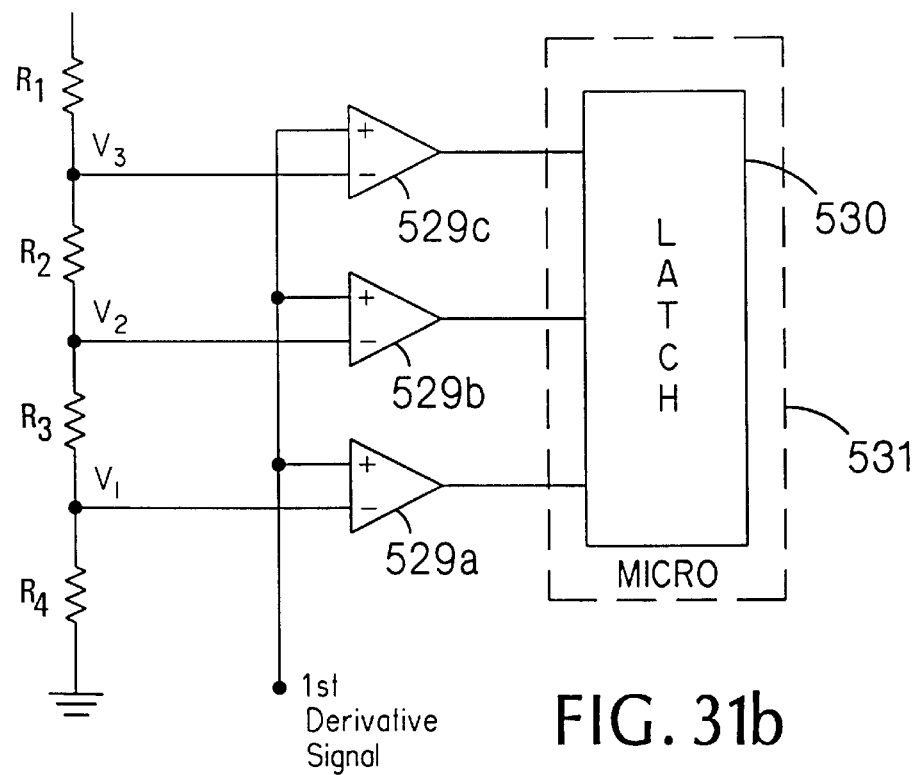
FIG. 31b shows a bank of comparators for three thresholds.

Obviously, such an arrangement of thresholds will likely not be linear. The voltage divider network is set up to generate these pre-determined thresholds. A bank of comparators will compare the input first derivative signal to these thresholds. All comparators that detect input signals higher than their corresponding reference threshold will assent their output. For example, for $\log_2(N)=3$ thresholds the arrangement is shown in FIG. 31b. The first derivative signal is applied to the positive inputs of three comparators 529*a*,529*b*,529*c*, a first, second and third threshold voltage V1,V2,V3 respectively are applied to the negative inputs of respective comparators 529*a*,529*b*,529*c*, the thresholds being set by resistors $R_1$ to $R_4$ in a voltage divider. The comparators output to a latch 530 in a system 531. The companding arrangement of the comparators sets up a coarse non-linear histogram bin indicator as a result of which edge strengths may be categorised in edge strength bins. A data base of multi-bit data collected by the F.A.T fixture, or someone experienced in the art of digitizer design may be utilised in order to determine the optimum thresholds and their arrangement for classifying these edge strength bins. As it is proposed to rely on two to three bits of quantization above and below the reference voltage there are few edge strength bins to process within three bits of quantization and an algorithm capable of using edge strength data will require less computing resources and hence provide clear advantages over present systems.

Figure 31C:
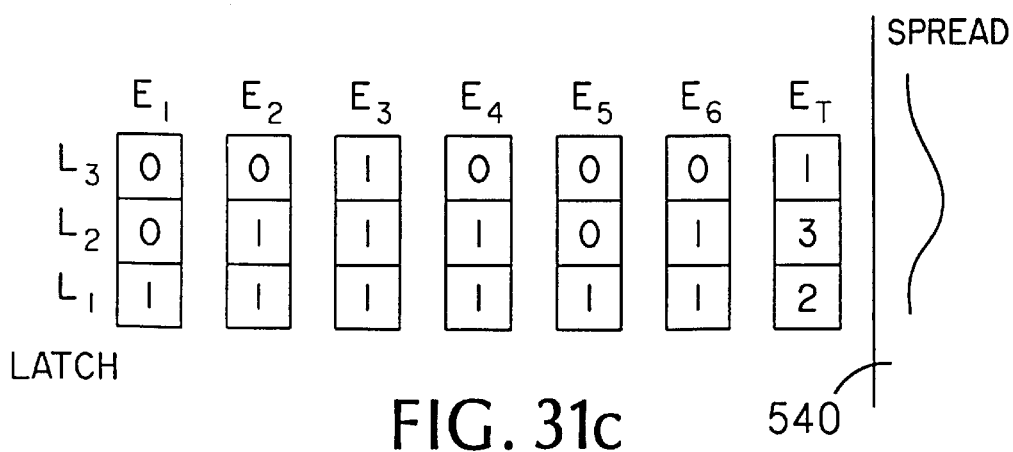
FIG. 31c shows the histogram bins for a given signal.

Histogram bins set at the latch 530 are shown in FIG. 31*c*. Six bins are shown designated $E_1$ to $E_6$ corresponding to six edge signal scans. The histogram for the entire scan is shown denoted $E_t$ providing the spread shown at 540. It will been seen that the latched values from each of the comparators 529*a*,529*b*,529*c* are held in respective positions $L_1$, $L_2$ and $L_3$. The histogram for the entire scan $E_t$ shows that one edge went above the highest threshold (V3), three edges went above the second highest threshold (V2) but below V3 and two edges went above the lowest threshold (V1) but below V2.

Figure 32:
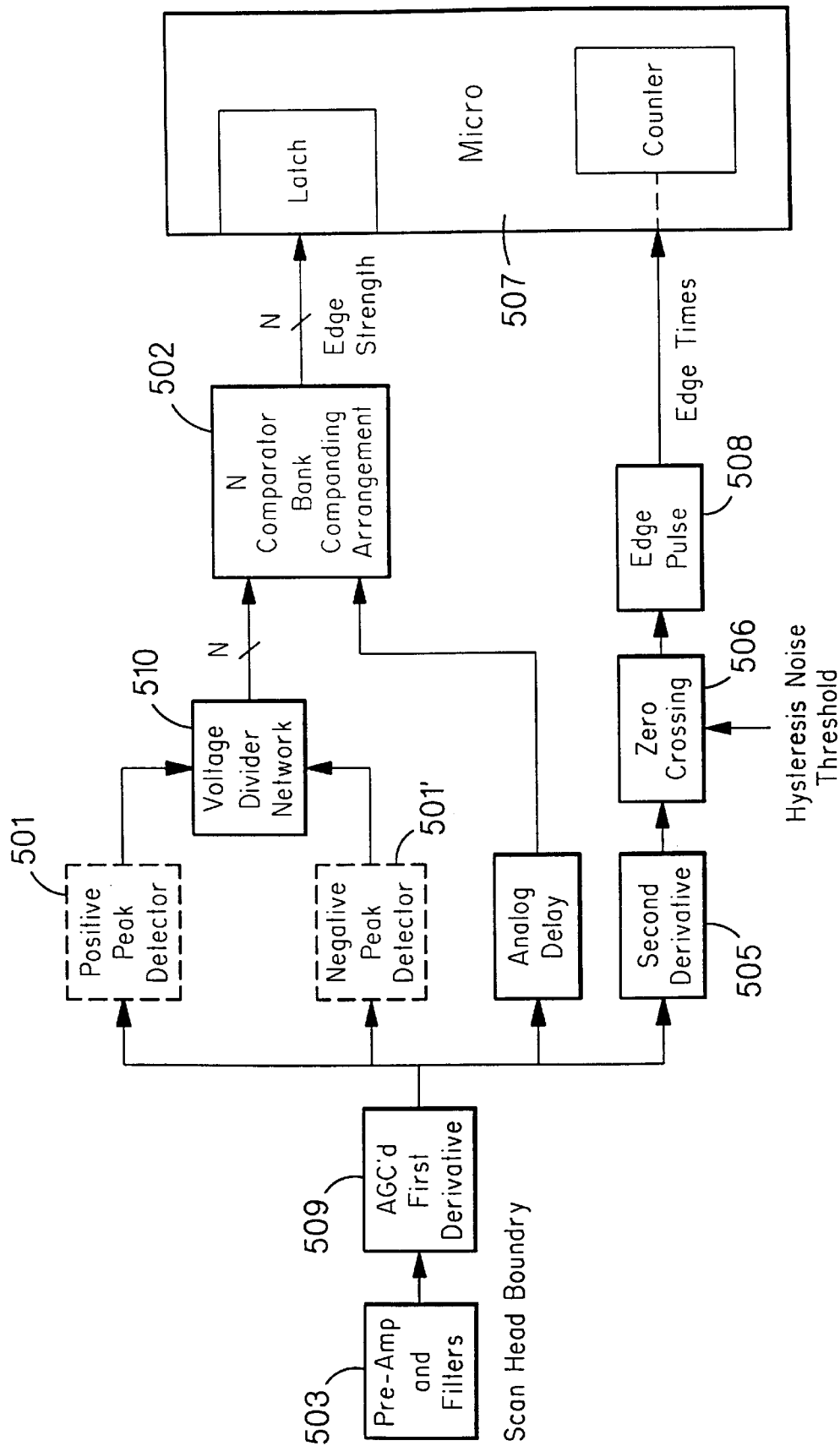
FIG. 32 shows an edge strength detector including an automatic gain control.

FIG. 32 shows an alternative arrangement in which an automatic gain control 509 is incorporated. The automatic gain control 509 receives an input from the preamplifier and filters 503 and outputs a suitably controlled first derivative. The positive and negative peak detectors described with reference to FIG. 28 may thus be replaced with a floating and a fixed threshold respectively. The system is arranged such that, for positive peaks of the first derivative, the zero crossing output will switch high as a result of which the window comparators will now derive their threshold from a higher voltage rail (see voltage divider network 510). For negative peaks of the first derivative, the opposite situation holds. As a result the circuit may be used to double the quantisation resolution or require half the number of comparators.

In certain cases some valleys of the first derivative signal may not fall below the reference voltage and some peaks may likewise not rise above the reference voltage. In such cases, and where it is established that a valid bar code data sequence has been read, the digitizer will need to know whether or not the peak or valley in question was above or below the reference voltage and the floating threshold can be set to a constant for operation of the decoder.

The algorithms adopted for processing the signal can be very dependent on external conditions. For example such external conditions may include the laser spot size—where the laser spot size is large compared with the bar code information then there will be an element of smoothing of noise such as speckles, dots and voids, and the transition between light and dark regions of the symbol will also be less pronounced. The position will be converse if the spot to bar ratio is very small. The spot size depends to a certain extent upon the distance of the reader from the symbol to be read; as is known a laser beam converges very slightly to a "waist" and then diverges again.

Since the peaks and valleys of the first derivative signal are categorized in non-linear edge strength bins by the hardware, an algorithm can accumulate a histogram and examine the variance or spread of the larger edges in order to determine the level of convolution distortion. That is, the peaks and valleys height variation of the first derivative signal gives additional information about the (laser) spot to bar ratio. Large variations is these peaks and valleys indicate that the spot to bar ratio is most likely large. This also means that the depth of modulation is low, and that the dots and voids in a poorly printed bar code are mostly removed by the optical smoothing. In addition, speckle noise is lower due to the larger spot being averaged out. This situation may be further correlated if there is a relatively small number of tiny edges, thus indicating lower speckle and printing noise due to the larger spot. Therefore, for this case, a lower edge selection threshold should be the first try in order to improve the first try read rate and thus decoding aggressiveness. Although a good decode cannot be guaranteed for this first try, the probability of success is higher because of apriori information about the variance of large edges and the quantity of smaller edges.

Likewise, when the variance of the larger edges is collectively small, the spot to bar ratio is most likely small. This also means that the symbol may be near the waist of the laser beam, and that speckle noise may be higher. Also, spots and voids on poorly printed symbols will be resolved as part of the analog signal. Alternatively, this may simply be a low density symbol. If there is a relatively large number of tiny edges, the first case is more probable. In either situation, the decoder should set the noise threshold high on the first attempt in order to improve the probability of a first read.

True Fuzzy Logic algorithms may also benefit from this data. The quantity of small edges, medium edges, larger edges, and huge edges may be assigned fuzzy membership functions. In addition, the times between edges may be assigned fuzzy membership functions. Fuzzy rules may then be applied in order to determine whether or not an edge belongs to a scan data stream based on the characteristics of its adjacent or neighbouring edges.

It will be appreciated that the invention allows reduced complexity and a number of components allowing noticeable reduction in costs of the system.

It will be seen that by using the comparators instead of conventional analog to digital convertors the speed can be scaled and, without automatic gain control, the comparative thresholds contract with signal strength. It is only necessary to derive the peak heights of the first derivative to provide enough information to determine focusing and so forth. Because only peak heights are taken, the processor is required to store far less samples than with full sampling.

Figure 1A:
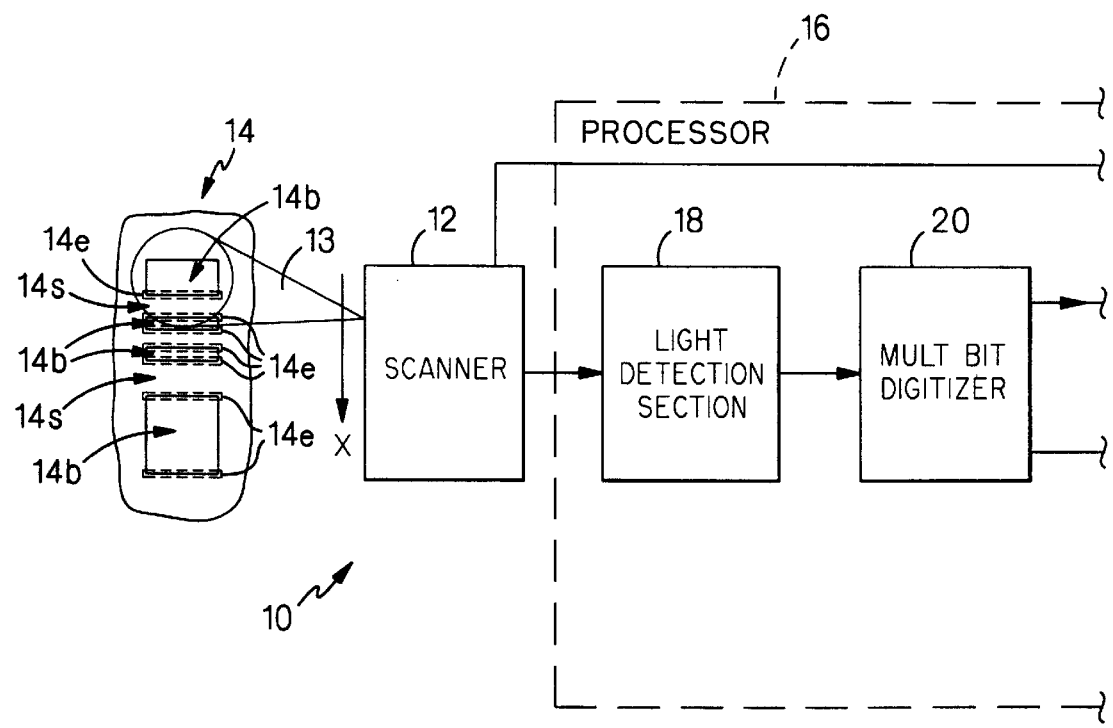
FIG. 1 is a block diagram of a bar code scanner according to the invention.
Figure 1B:
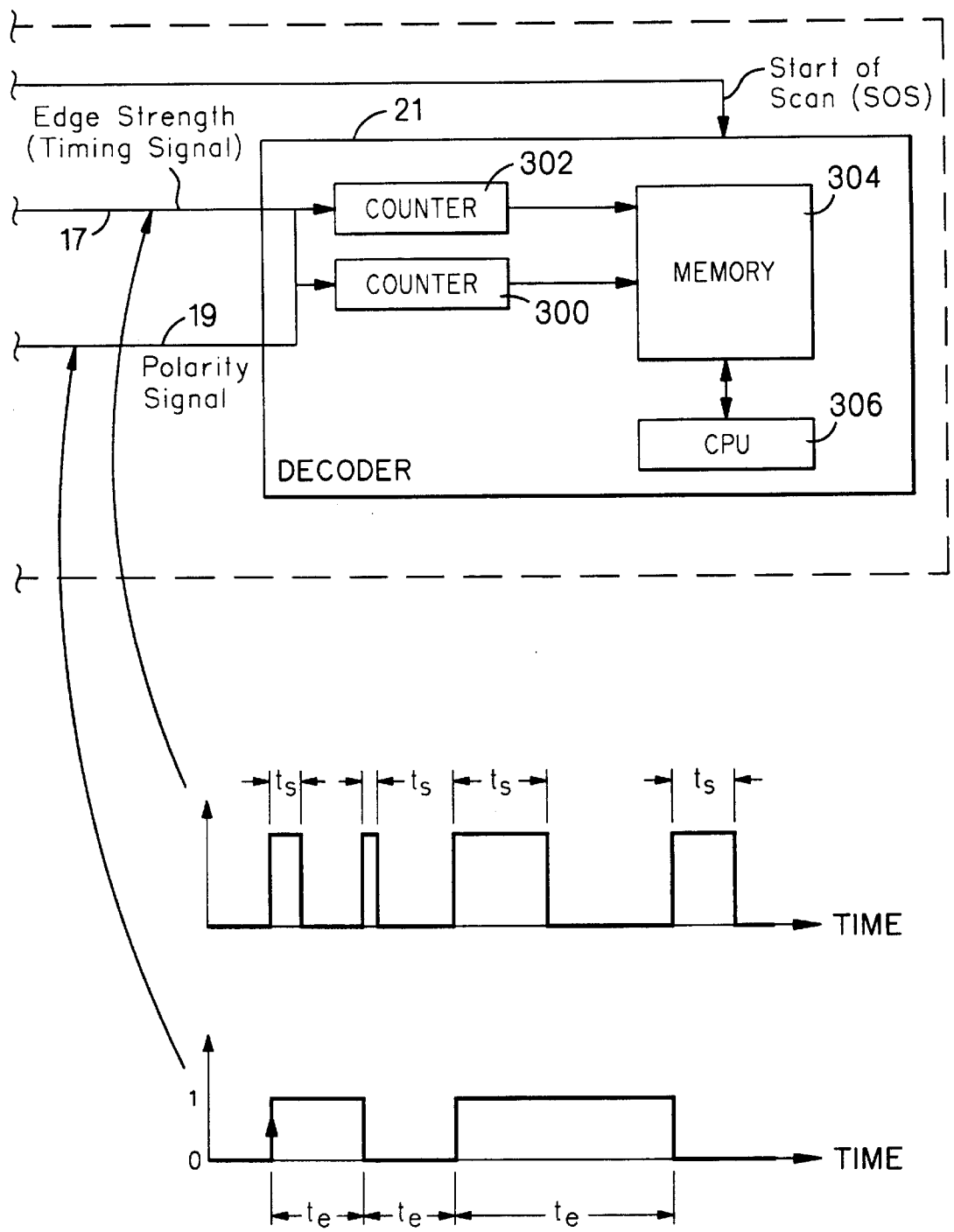

Referring now to FIG. 1, a bar code scanner 10 is shown. The bar code scanner 10 includes a scanner 12 for scanning a beam of laser light 13 across a bar code 14. The bar code 14 comprising a series of interleaved, or alternating black bars 40*b* and white spaces 14*s*, each bar 14*b* and space 14*s* having a juxtaposed edge region 14*e* therebetween. The bar code scanner 10 also includes a processor 16 having a light detection section 18 and a multi-bit digitizer 20 for producing a series of edge strength, or timing, pulse signals on output line 17. Each one of the timing pulse signals has a time duration, $t_s$, related to reflectivity characteristics of a corresponding one of the edge regions 14*e*. Here, the time duration, $t_s$, of each of the timing pulse signals on line 17 is proportional to the magnitude of the edge strength as measured by the first derivative of the analog signal produced by the light detection section 18 in response to reflections of the laser light across through an edge region 14*e*. The multi-bit digitizer 20 also produces a polarity signal on output line 19. The polarity signal is a logic signal having a logic state indicative of whether the edge strength pulse produced concurrently therewith is a bar-14b-to-space 14s edge transition or, alternatively, a space-to-bar edge transition. Here, for example, a positive edge (i.e., the polarity signal changes from a logic 0 to a logic 1) indicates a transition from a bar 14b to a space 14s while a negative edge (i.e., the polarity signal changes from a logic 1 to a logic 0) indicates a transition from a space 14s to a bar 14b. The time duration, $t_e$, between leading edges of the timing pulse signals is a measure of the edge to edge time duration of a bar 14b or a space 14s.

A decoder 21 is provided for decoding the timing pulse and polarity signals on lines 17, 19 into corresponding multi-bit digital words.

Figure 2A:
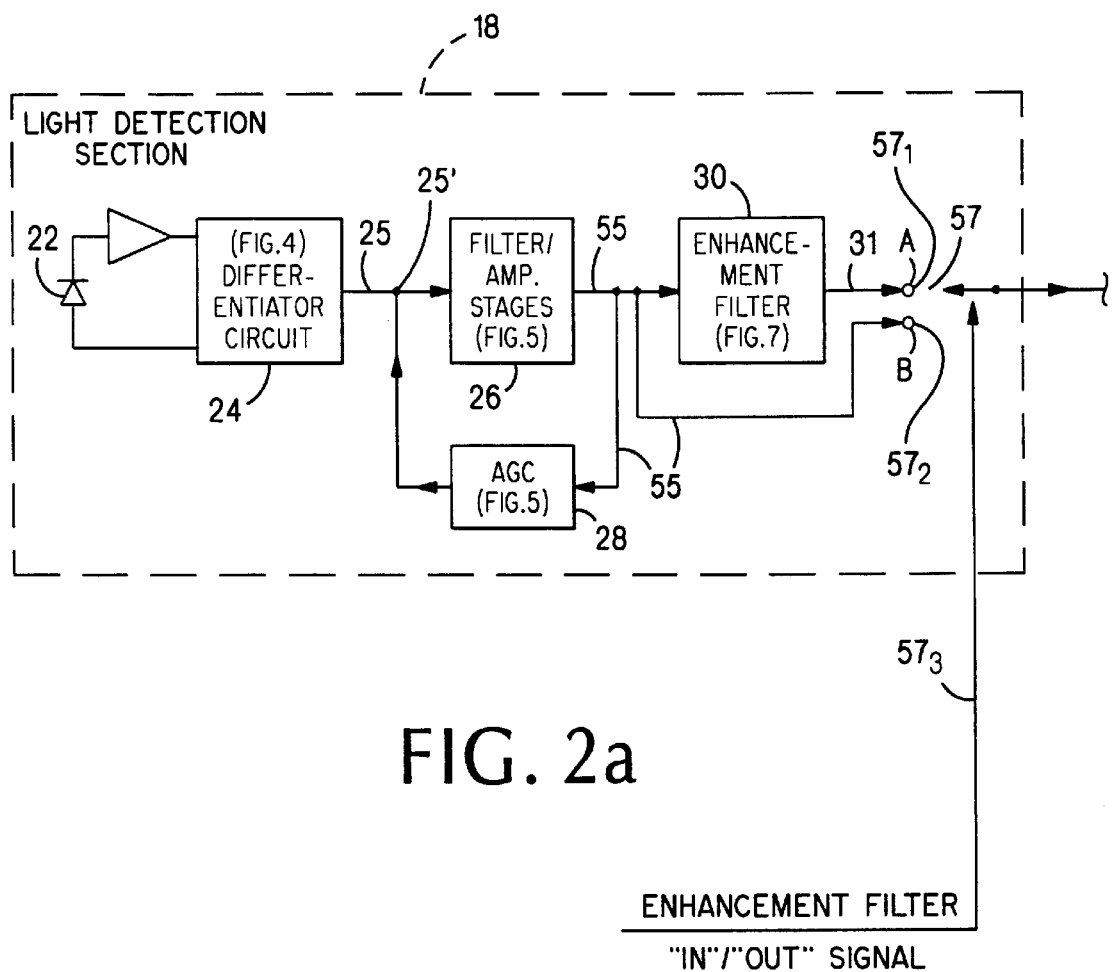
FIG. 2 is a block diagram of a light detection section and multi-bit digitizer used in a processor of the bar code scanner of FIG. 1.
Figure 2B:
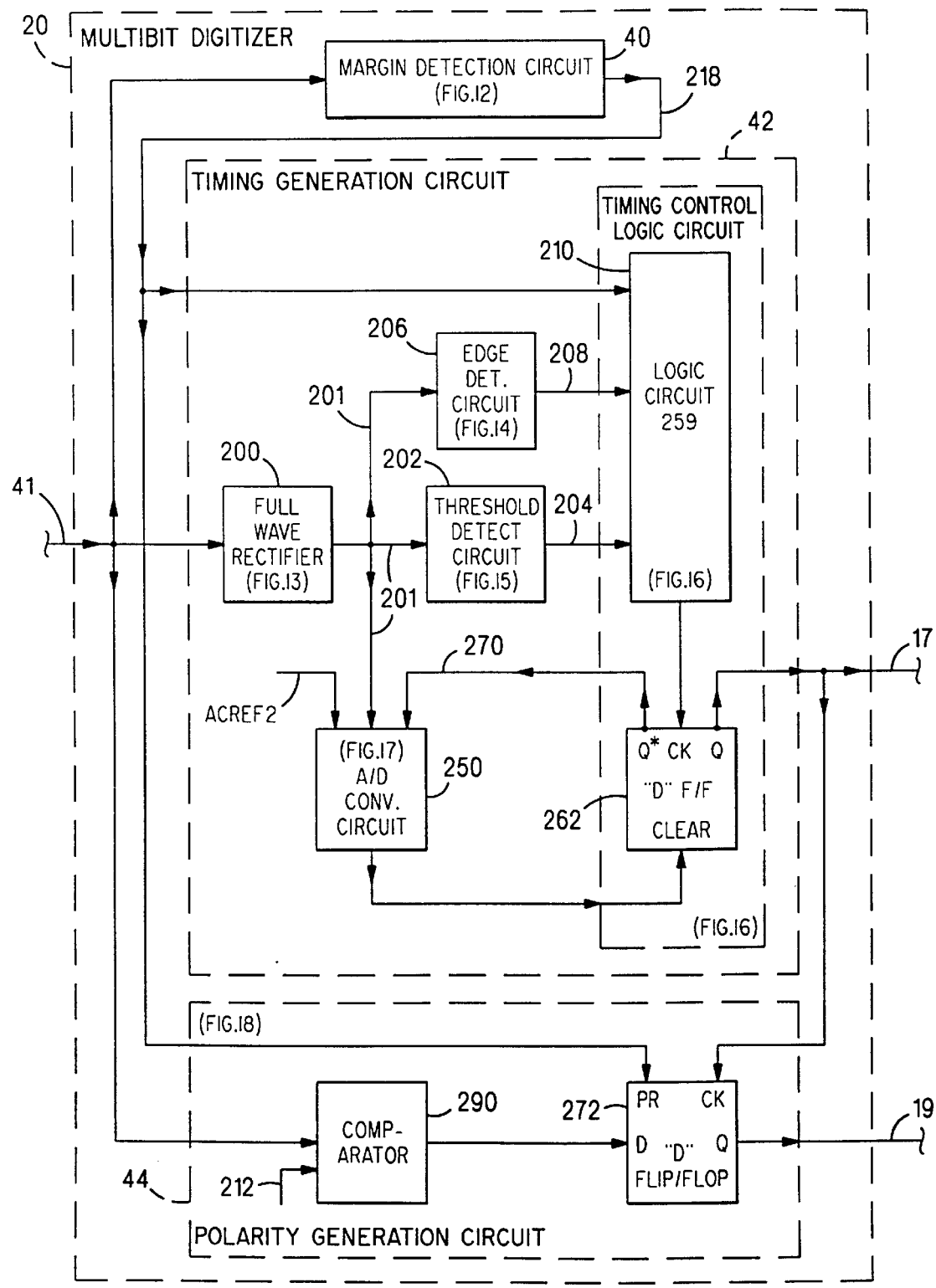
Figure 2C:
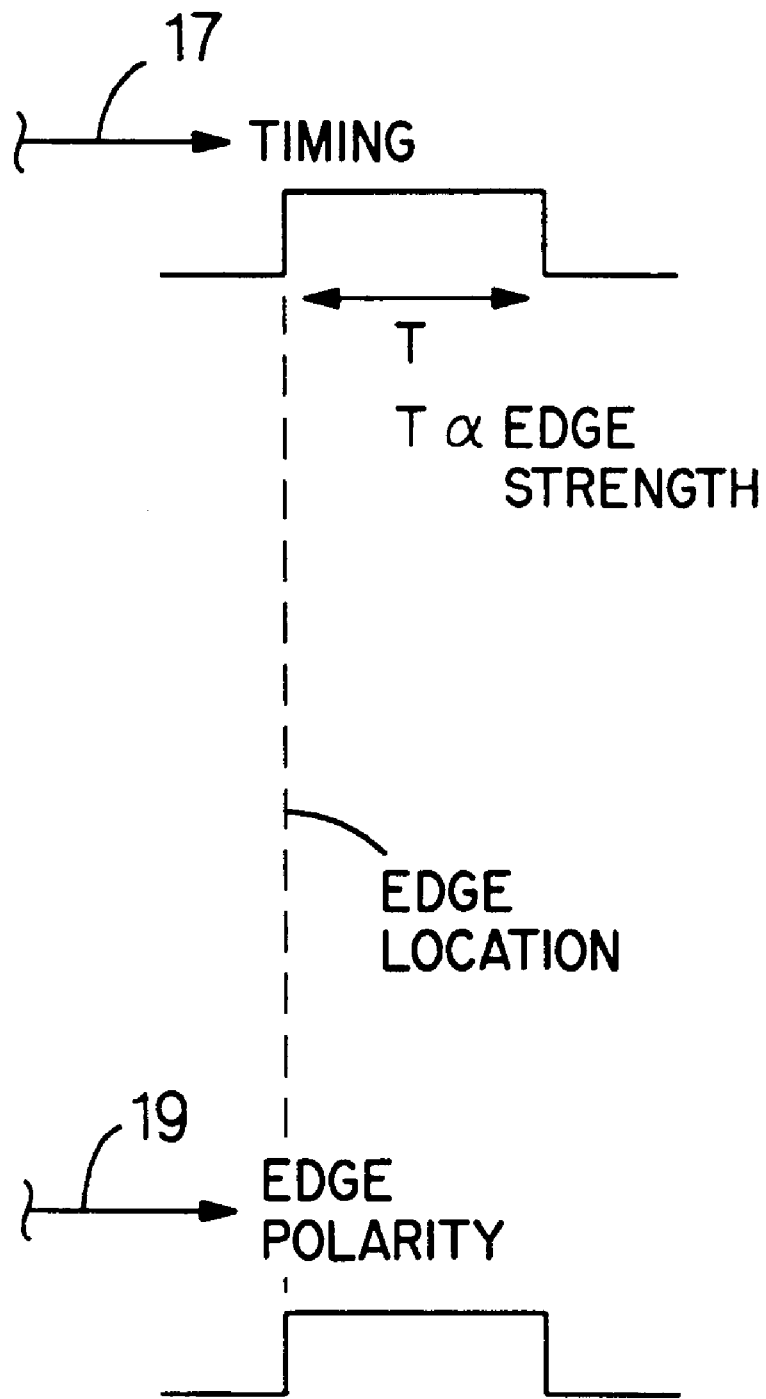

Referring also to FIG. 2, the light detection section 18 includes a detector 22, a differentiator circuit 24, a filter/amplifier stage 26, an automatic gain control (AGC) section 28, and an enhancement filter 30, arranged as shown. The enhancement filter is usually selectable so that the decoder can sent the signal through the enhancement filter, or can by pass it, if desired. The detector 22 produces an electrical signal having an amplitude which varies in accordance with the bar code 14 as the beam of light 13 is scanned over the bar code 14. More, particularly, the detector 22 produces an electrical signal 32 (FIG. 3A) having an amplitude which varies in accordance with the reflectivity of the light 13 from the bar code 14 as scanner 12 scans the laser produced beam of light 13 across the bar code 14, the pattern scanned being shown in FIG. 3C. The electrical signal 32 amplitude alternates between higher levels $32H_1$, $32H_2$, $32H_3$, $32H_4$, $32H_5$ and $32H_6$ and lower levels $32L_1$, $32L_2$, $32L_3$, $32L_4$, and $32L_5$, in response to the beam of light being scanned across the edge regions 14e.

The differentiator circuit 24 produces an electrical signal 34 on line 25 (FIG. 3B) having an amplitude which varies in accordance with time rates of change in the variations in the amplitude of the detector produced electrical signal 32. Thus, the differentiator circuit 24 produces a pulse $34_1$–$34_{10}$ each time the electrical signal changes between the higher and lower levels $32H_1$–$34H_6$, $34L_1$–$34L_5$ (i.e., $32H_1$-$32L_1$, $32L_1$-$32H_2$, $32H_2$-$32L_2$, $32L_2$-$32H_3$ . . . , $32L_5$-$32H_6$), respectively, as shown. The electrical signal 34 produced by the differentiator circuit 24 is a bipolar signal; that is, negative polarity pulses $34_1$, $34_3$, $34_5$, $34_7$, $34_9$ are produced when the electrical signal 32 goes from a high level to a lower level and positive polarity pulses are produced when the electrical signal 32 goes from a lower level to a higher level, as shown. (It is noted that "positive" and "negative" are relative to a reference potential, here VREF, as will be described in more detail hereinafter).

The electrical signal 34 produced by the differentiator circuit 24 is fed, via line 25 to a terminal 25'. Also fed to terminal 25' is the output of AGC circuit 28. The output of terminal 25' is to the filter/amplifier stage 26. The output on filter/amplifier stage 26 is fed, via line 55 to: the input of AGC circuit 28; the input of enhancement filter 30; and, terminal B of switch 75, as shown. The enhancement filter 30 modifies the pulses $34_1$–$34_{10}$ produced by the differentiator circuit 24; i.e. from signals such as those shown in FIG. 24 to those as shown in FIG. 25. Such modification includes increasing the rise time, and peak level of, the pulses $34_1$–$34_{10}$ produced by the differentiator circuit 24. The output of the enhancement filter is fed to a second input $57_2$ of switch 57. The output of switch 57, i.e., line 41, is coupled to either: the output of the enhancement filter 30, as when line 41 is coupled to the input $57_1$ of switch 57 (i.e., switch 57 position A); or, on the other hand directly to the output of the filter/amplifier stages 26 as when line 41 is coupled to input $57_2$ of switch 57 (i.e., switch position B). A signal on line $57_3$ from decoder 21 is used to control the A, B switch position of switch 57. When in position A the enhancement filter 30 is used (i.e., "in") and when in position B the enhancement filer 30 is not used (i.e., "out"). Here, the decoder 21 places the enhancement filter "in" every N scans, where N is a pre-selected integer, here, for example 3.

The peak levels of the modified pulses $34'_1$–$34'_{10}$, in the case when the enhancement filter 30 is "in"; or, the pulses $34_1$–$34_{10}$, in the case when the enhancement filter 30 is "out" are converted, in either case, into the edge strength pulses by the multi-bit digitizer 20, in a manner to be described in detail hereinafter. Suffice it to say here, however, that multi-bit digitizer 20 includes a threshold level detector 202 (FIGS. 2 and 15) for rejecting modified pulses $34'_1$–$34'_{10}$ having peak levels below a threshold level and for converting only non-rejected modified pulses $34'_1$–$34'_{10}$ into the edge strength (i.e., timing) pulse signals and polarity signals on lines 17, 19 respectively. Further, as will be described, each one of the converted edge strength timing pulse signals on line 17 has a time duration related to reflectivity characteristics of a corresponding one of the edge regions 14e (here the peak level of the converted, modified pulses 34'). The decoder 21 converts the edge strength timing pulse signals on line 17 into a timing signal and using a counter, not shown, to measure the time duration of the edge strength timing pulse signals produced on line 17.

More particularly, the multi-bit digitizer 20 (FIG. 2) includes a margin detection circuit 40, a timing generation circuit 42, and a polarity generation circuit 44, all arranged as shown. The margin detector circuit 40 (FIG. 4) is responsive to the signals produced on line 41 and detects the presence of a bar code 14 (FIG. 1). The timing generation circuit 42 is responsive to the margin detection circuit 40, and the signals produced on line 41, and produces the series of edge strength timing pulse signals on output line 17. The polarity circuit 44 is responsive to the signals produced on line 41, and the margin detection circuit 40, and produces, on line 19, a series of logic signals having logic states related to the whether the edge strength pulse is from a bar to space edge transition or, alternatively, from a space to bar edge transition, respectively, of the scanned bar code 14. The width of the edge strength timing pulse signals on line 17 provide the absolute value of the strength of the edges. The time from rising edge of one edge strength pulse to the rising edge of the next edge strength pulse is the time, $t_e$, between leading edges of the timing pulse signals and is, as noted above, a measure of the edge to edge time duration of a bar 14b or a space 14s. And the value (i.e., logic state) of the polarity signal on line 19 at the rising edge of the edge strength timing pulse signals on line 17 represents the polarity of the edge (i.e., whether the edge is a bar 14b or a space 14s, a discussed above.

Figure 4:
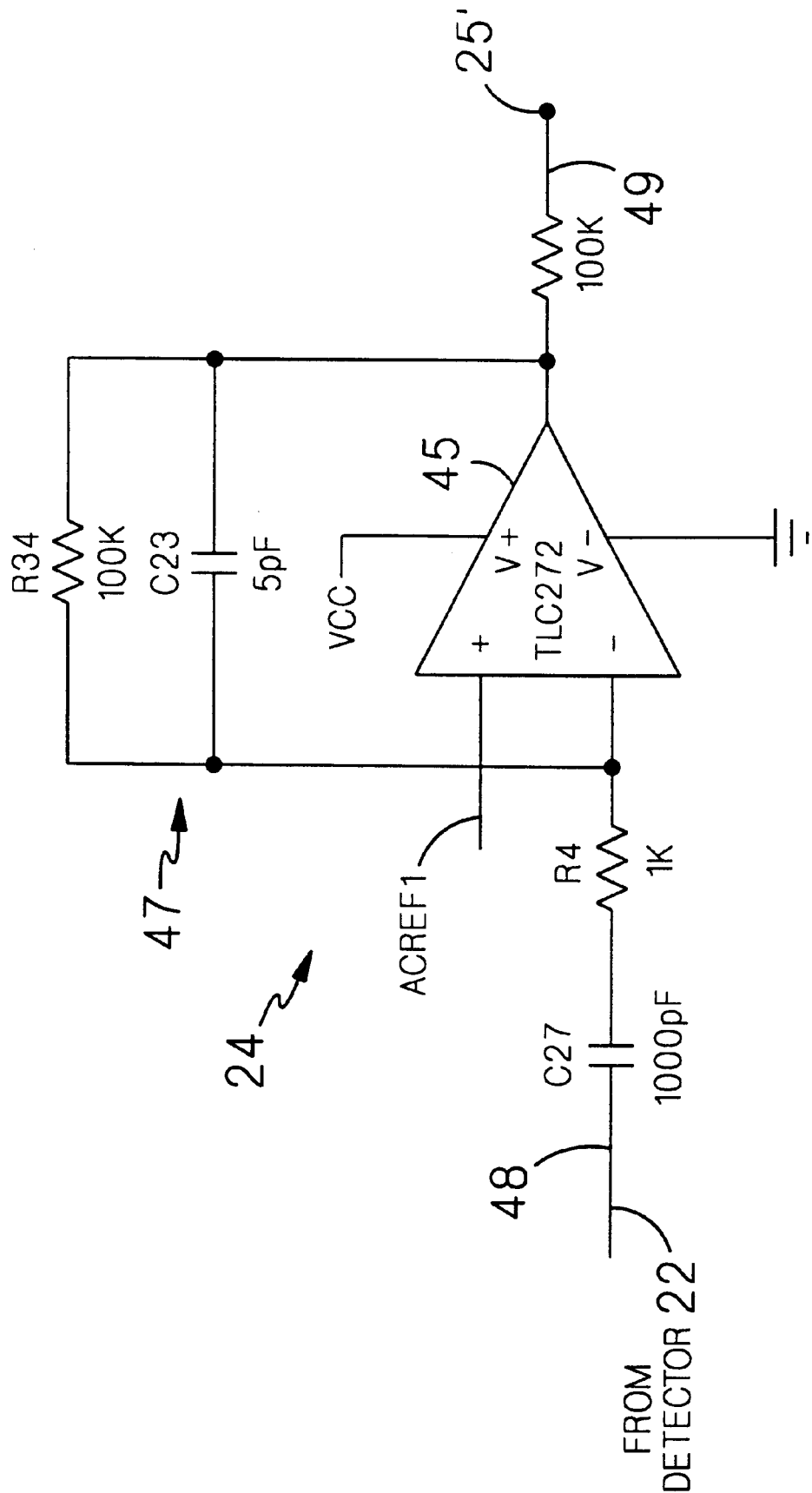
FIG. 4 is a schematic diagram of a differentiator circuit used in the light detection section of FIG. 2.

Referring now in more detail to the light detection section 18, differentiator circuit 24 is shown in detail in FIG. 4. The differentiator circuit 24 includes an operational amplifier 45 having the inverting input (−) thereof fed, via line 48, by the detector 22 through a capacitor C27, here 1000 pF, and serially connected resistor R2, here 1 k ohm and the non-inverting input (+) fed by a reference potential (VREF), here nominally 1.9 volts, as shown. (The reference voltage VREF is derived from a resistor-divider circuit (not shown) and is filtered through a parallel combination of a 2.1 microfarad electrolytic capacitor (not shown) and a 0.1 microfarad ceramic capacitor (not shown)). As noted above, the input line 48 is fed by detector 22 (FIG. 2), i.e., the signal 32 (FIG. 3A). A parallel resistor R34-capacitor C23 network 47 is connected between the output and inverting input (−) of the operational amplifier 45, as shown. Here R34 is 100 K ohms and capacitor C23 is 5 pF. The gain of the differentiator is here 40 db with poles at 318 kHz and 159 kHz. Here, the differentiator circuit 24 has a bandwidth of 40 kHz and produces analog signal levels on line 49 (i.e., signal 34, FIG. 3B) from 10 m $V_{p-p}$ to 1.6$V_{p-p}$.

Figure 5:
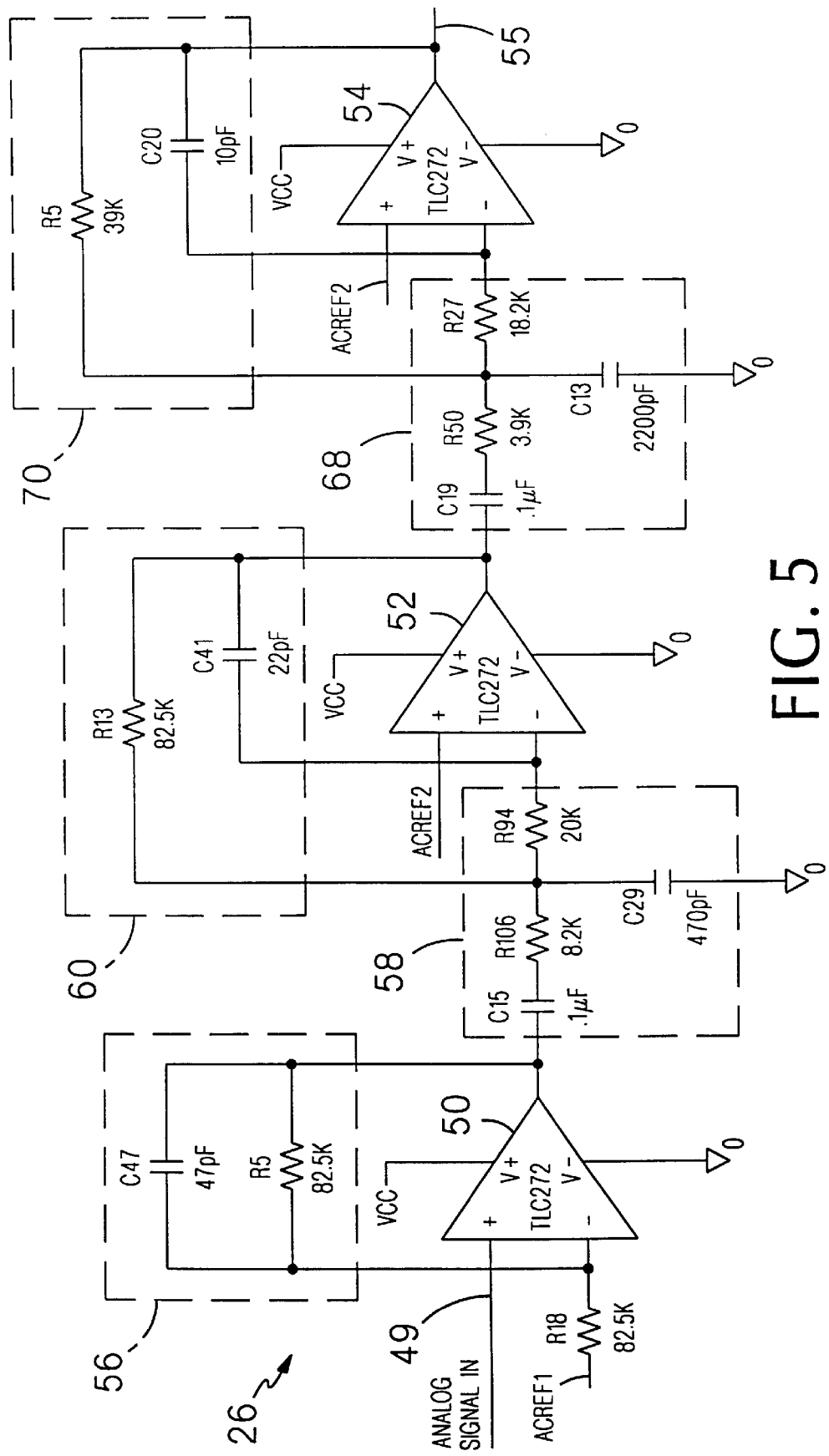
FIG. 5 is a schematic diagram of a filter/amplifier stage used in the light detection section of FIG. 2.

The filter/amplifier stage 26 is shown in FIG. 5. Here the filter/amplifier stage 26 is a five pole modified Butterworth filter and is used to provide additional signal conditioning to the differentiator circuit 24 output signal on line 49. Here, the gain through the stage 26 is 46 db. The stage 26 includes three cascaded operational amplifiers 50, 52, 54. A first amplifier 50 has the non-inverting (+) input thereof fed by the output of the differentiator circuit 24 via line 49 and the inverting (−) input fed to the 1.9 volt VREF reference potential through a, here 82.5 k ohm resistor R18, as shown. A parallel 82.5 k ohm–47 pF resistor R28-capacitor C47 network 56 is provided in a feedback loop, as shown. The intermediate amplifier 52 has the inverting input (−) thereof coupled to the output of the first amplifier 50 through an network 58 made up of resistor R106 (here 8.2 k ohms), capacitor C15 (here 0.1 microfarad), grounded capacitor C29 (here 470 pF) and resistor R94, here 20 k ohms, arranged as shown. The non-inverting input (+) is coupled to a second reference potential, VFERF, as shown. A feedback network 60 made up of resistors R13, here 82.5 k ohms, and capacitor C41 here 22 pF, is provided, as shown. The last amplifier 54 has its inverting input (−) coupled to the output of the intermediate amplifier 52 through a network 68 made up of resistor R50, here 3.9 k ohms, a capacitor C19, here 0.1 microfarad, a grounded capacitor C13, here 2200 pF and a resistor R27, here 18.2 k ohms, arranged as shown. The non-inverting input (+) is coupled to the second reference potential, VREF, as shown. A feedback network 70 made up of resistors R5, here 39 k ohms, and capacitor C20 here 10 pF, is provided, as shown.

Figure 6:
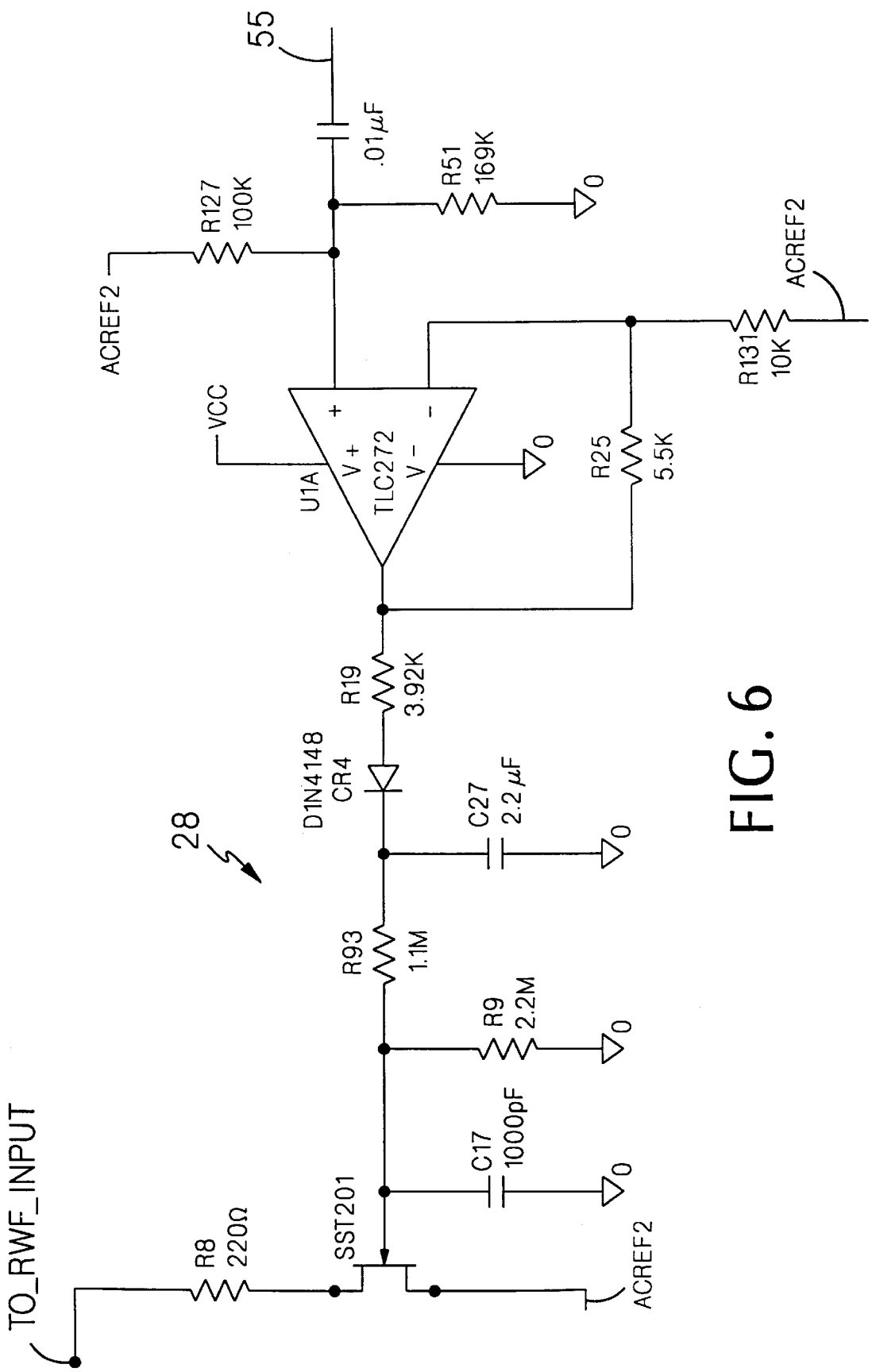
FIG. 6 is a schematic diagram of an automatic gain control (AGC) circuit used in the light detection section of FIG. 2.

The AGC circuit 28 is shown in FIG. 6. The purpose of the AGC circuit 28 is to provide amplitude regulated analog signals to the multi-bit digitizer 20 (FIG. 2). The AGC'd Butterworth filter stage 28 provides a range of gain, here approximately a maximum of 44 db to a minimum of 2.8 dB. With signal levels from the output of the differentiator circuit 24 ranging from 10 m$V_{p-p}$ to 1.6 $V_{p-p}$, the AGC'd Butterworth filter stage 26 provides a maximum signal magnitude for the signal on line 41 of 2.22 $V_{p-p}$ and a minimum signal of 1.66 $V_{p-p}$, for a maximum to minimum ratio of 1.4.

Figure 7:
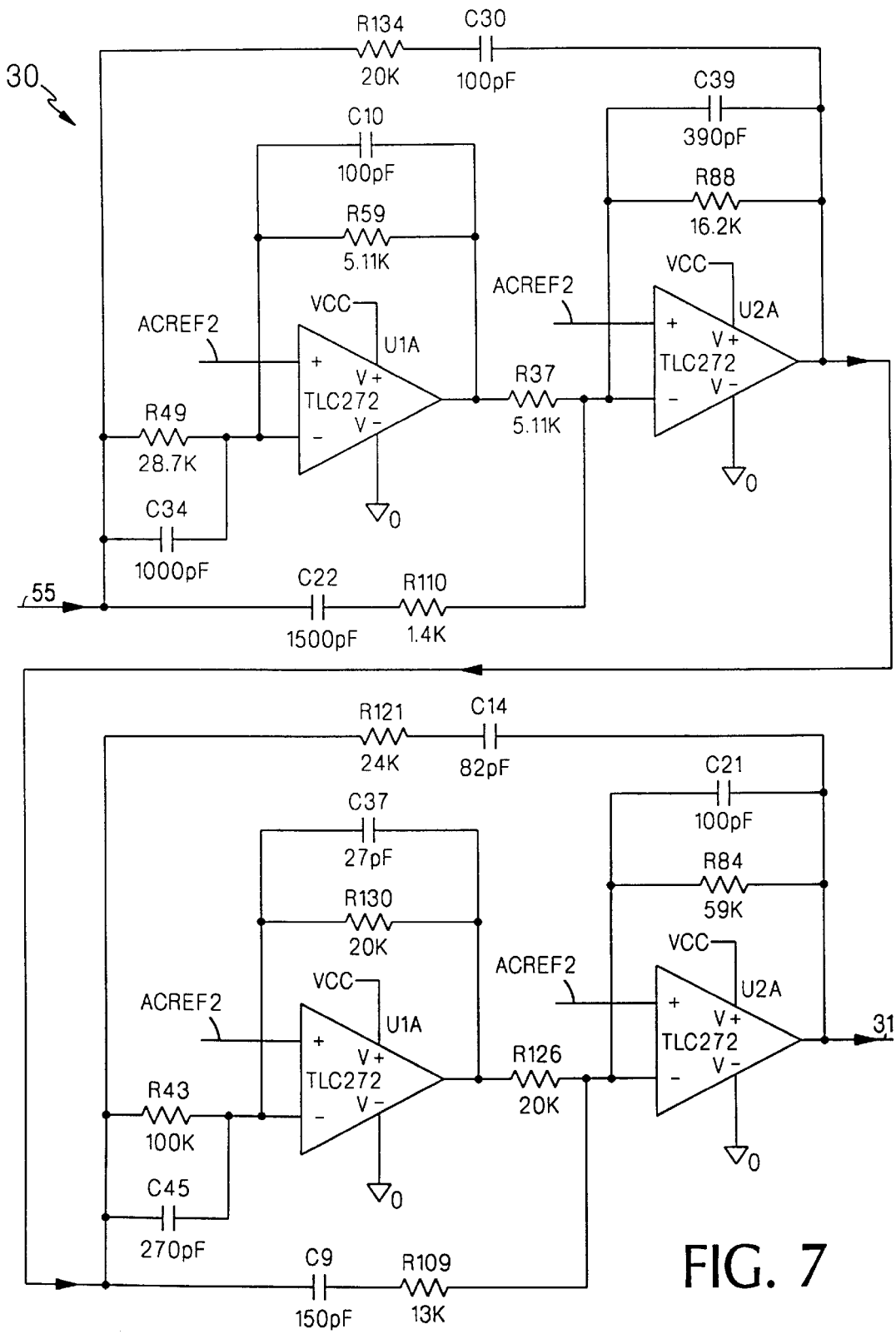
FIG. 7 is a schematic diagram of an enhancement filter used in the light detection section of FIG. 2.

The enhancement filter 30 is shown in FIG. 7. The purpose for the enhancement filter 30 is to correct for convolution distortion by enhancing, or amplifying, the high frequency content of the analog signal fed thereto while maintaining linear phase. More particularly, the enhancement filter 30 corrects for some of the convolution distortion realized when the spot size of the laser beam 13 (FIG. 1) is significantly larger than the narrowest symbol element (i.e., a bar 14b or a space 14s) in the bar code 14. As the face of the laser beam 13 moves outward from the bar code 14, a typical beam profile in the x-direction (FIG. 1) starts out wide, grows narrow until a minimum is reached at the waist, and then grows larger at farther ranges. Convolution distortion is most prominent when high density symbols are placed close to the scanner 12 where the spot size is large, or symbols placed far into the range of scanner 12 where the spot size also becomes large. More particularly, in bar code laser scanning one of the factors limiting the working range of the scanner is the filtering effect of the optical beam on the original bi-level (i.e., bar-space) bar code signal. The purpose of an analog edge enhancement filter 30 is to compensate for the effect of the finite width of the optical beam. This effectively gives the scanner higher resolution.

Figure 8A:
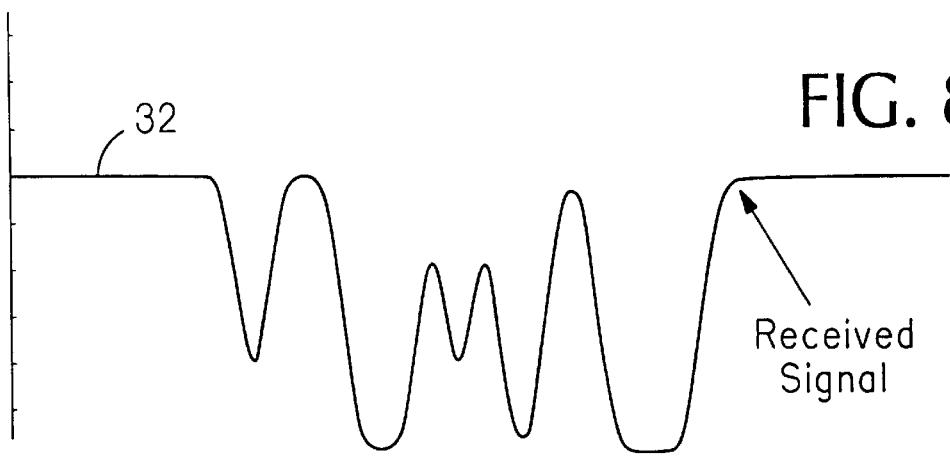
FIGS. 8A and 8B are timing histories of signals produced by the scanner of FIG. 1 prior to passing through the enhancement filter of FIG. 7.
Figure 8B:
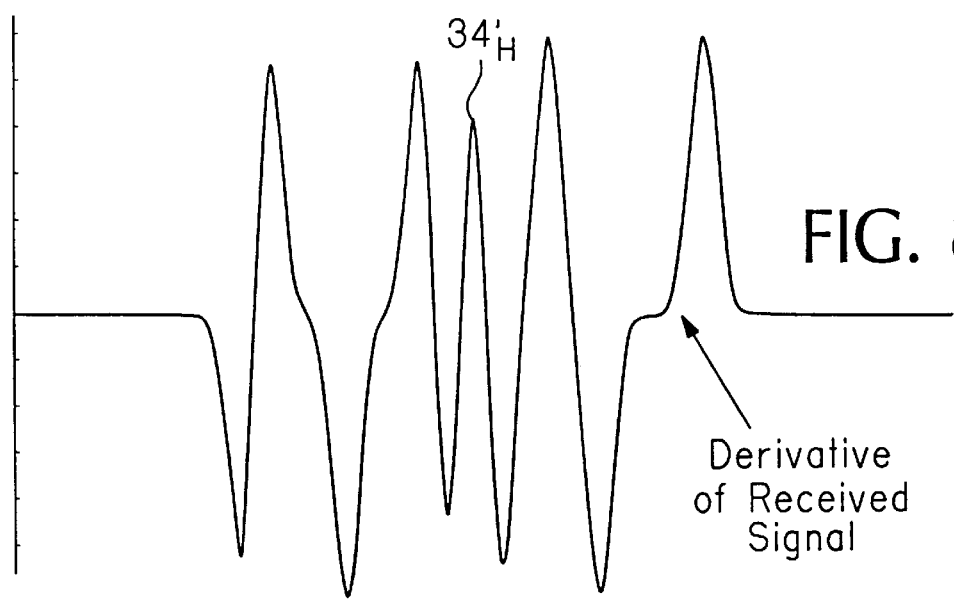
Figure 8C:
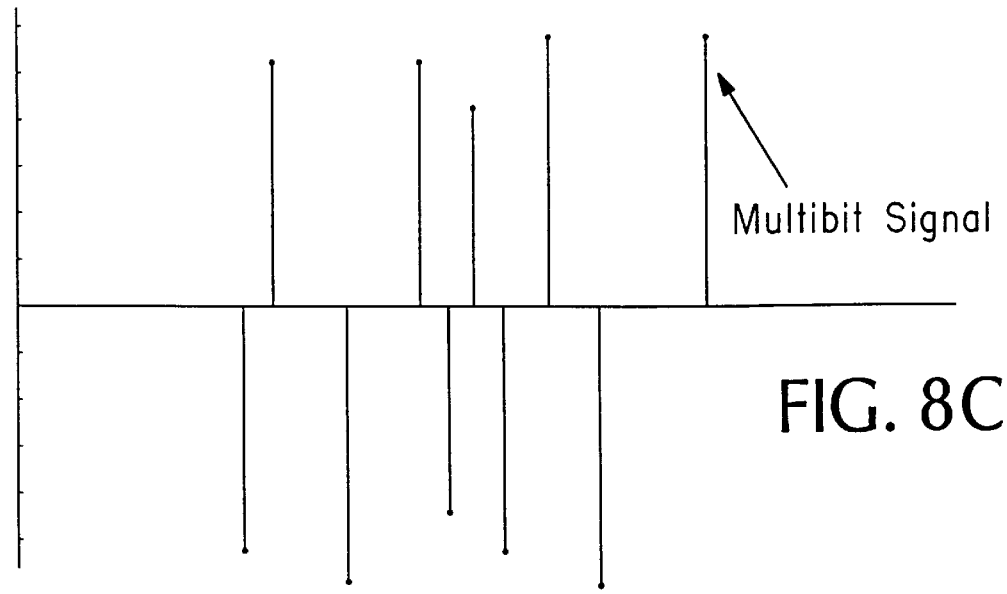
FIG. 8C shows the peaks in the signals produced in FIG. 8B.
Figure 9A:
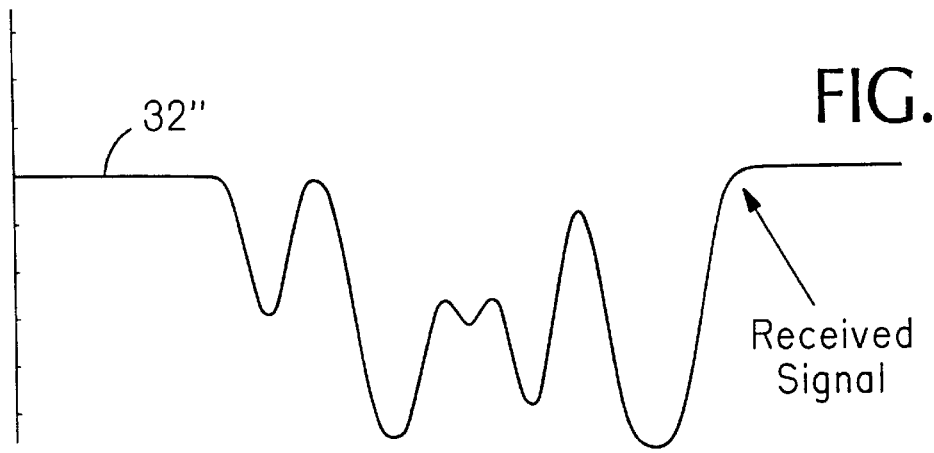
FIGS. 9A and 9B are timing histories of signals produced by the scanner of FIG. 1 prior to passing through the enhancement filter of FIG. 7, the timing history of FIGS. 9A and 9B being for a scanning spot size larger than the scanning spot size used for FIGS. 8A and 8B.
Figure 9B:
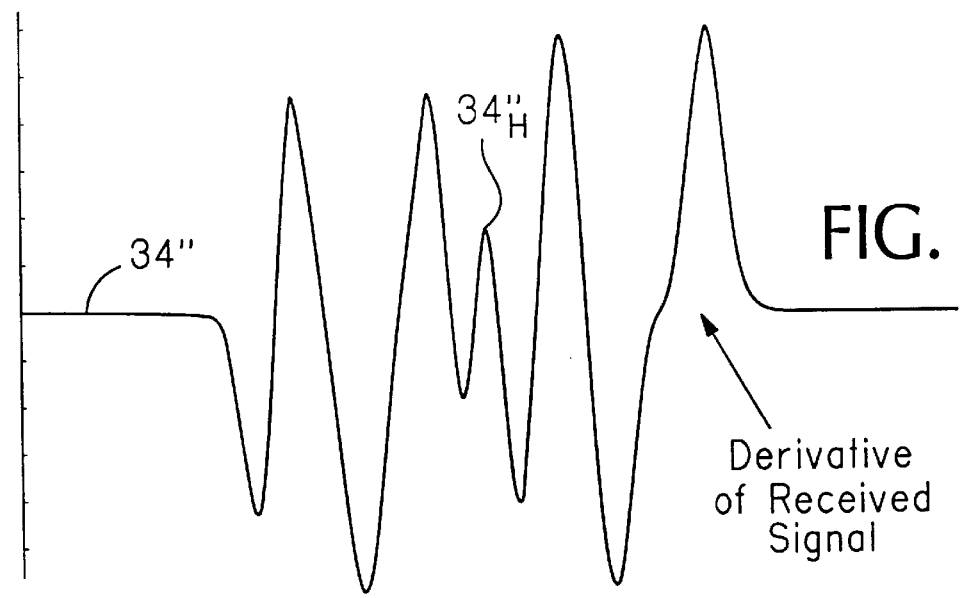
Figure 9C:
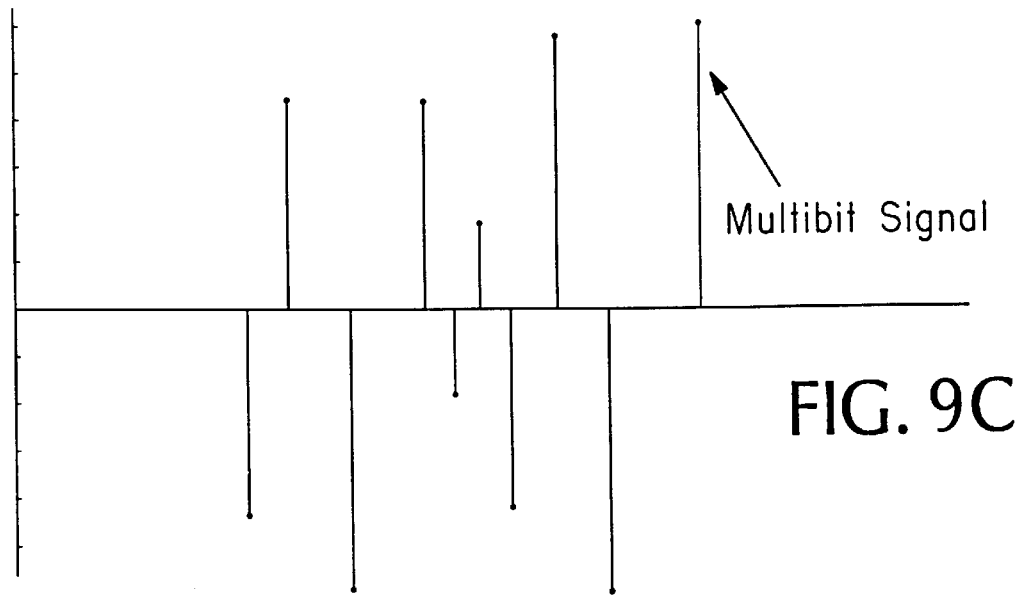
FIG. 9C showing the peaks in the signals produced in FIG. 9B.
Figure 10:
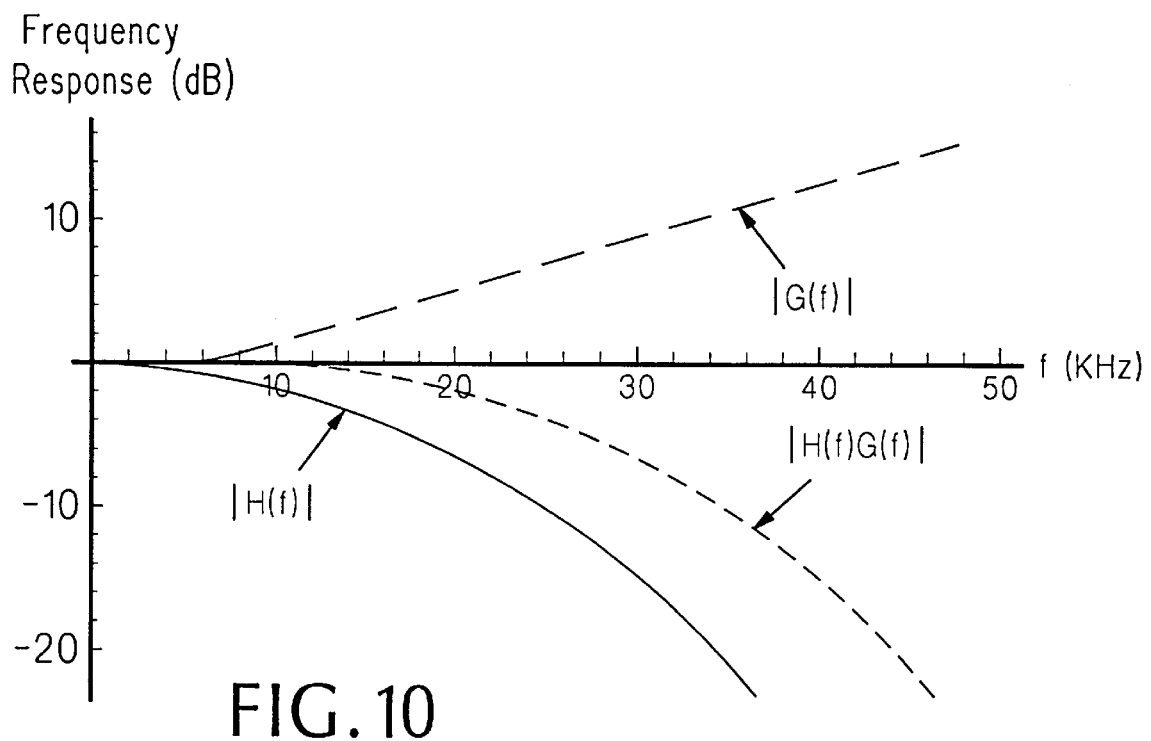
FIG. 10 shows the frequency response of the enhancement filter of FIG. 7.

The optical spot of the laser acts as a low pass filter on the original bar code signal 32 (FIG. 3A) produced by the detector 22. This results in a smoothing of the edges of the signal. If the spot size is larger than the smallest element of the bar code (i.e. a unit module; bar or space) then not only are the edges smoothed but the height of the edges decreases. This can be seen by looking at the signal in FIGS. 8A and 9B, where FIG. 8A is the output signal 32' of detector 22 for a spot size of 2.0 modules and FIG. 9A is the output signals 32" of detector 22 for a spot size of 2.8 modules. Also, as the spot size gets larger, the actual edge locations shift. This is often referred to as convolution distortion. Excessive convolution distortion can prevent decodability of the bar code. If one compares the first derivative signals for a large spot (2.0 modules as shown in FIG. 9A with 2.8 modules as shown in FIG. 9B) the height of the peaks of the first derivative signal $34_{H''}$ to decreases for some of the edges as for example is evident when peak $34_H''$ in FIG. 9B is compared with the same corresponding peak 34' in FIG. 9A. If these peak values drop below a fixed threshold (usually about 20% of the maximum) then a threshold circuit 202 (FIG. 2, to be described) will not accept them. If the edges are smaller than the threshold, or if the edges shift too much, then the bar code is undecodable. The purpose of the enhancement filter 30 is to enhance the edge strengths (i.e., the peaks $34_1$–$34_{10}$, in the signal produced by the differentiator circuit 34 before being passed to the multi-bit digitizer 20 so that the valid edges will exceed the threshold as well as be close enough to the proper location so that the bar code is decodable. The peaks in the signals shown in FIGS. 8B and 9B are shown in FIGS. 8C and 9C, respectively.

The spot size of the laser is a physical length measured in microns or mils. However, since the laser beam is scanning the spot size can be thought of as having a size (or time duration) in seconds. The time duration of the spot is the physical size (say in inches) divided by the velocity (say in inches/second). It is convenient to think in the time domain since the received signal is a time domain signal and all subsequent processing (i.e. analog filtering, digitizing, etc.) is done in the time domain.

As noted above, the optical spot size changes with distance from the scanner. Past the waist of the beam the spot size grow approximately linearly with distance. The spot speed of the laser grows linearly as a function of distance from the scanner. Hence, past the waist of the beam the spot duration, in seconds, is approximately fixed since it is the ratio of the spot size to the scan speed. This makes it easier to design an edge enhancement filter 30 since in the time domain the low pass filter that operates on the bar code signal (i.e. the laser beam) is approximately a fixed filter. Since the optical beam is Gaussian the impulse response of the low pass filter is Gaussian, $$h(t) = \frac{1}{\sqrt{2\pi\sigma^2}} e^{\frac{-t^2}{2\sigma^2}}$$

where the spot size in the time domain is $4\sigma$. The Laplace Transform of this impulse response is, $$H(s) = e^{\frac{s^2\sigma^2}{2}}$$

Edge enhancement filter 30 is to implemented to an approximate inverse filter of H(s) using a Taylor series approximation:

$$G(s) \approx \frac{N(s)}{\Delta(s)}$$

$$N(s) = 1 - \frac{S_2\sigma_2}{2} \approx H^{-1}(s)$$

The demoninator, $\Delta(s)$, gives the pole locations which are usually some standard low pass filter poles (e.g. Butterworth, Bessel). These poles are placed at higher frequencies than the zeros, so to prevent too large a gain at high frequencies that would just increase noise.

FIG. 9 shows the transfer function H(f) due to the optical spot, the transfer function G(f) due to the edge enhancement filter, and the transfer function of the combination H(f)G(f). Note that the bandwidth of the combined system is widened.

The effect of the edge enhancement filter 30 is to improve the working range of the scanner 12. At distances where the spot size of the laser beam 13 is so large that the strength of the edges are less than the threshold in the multi-bit digitizer 20, or the edges have shifted too much, the bar code is undecodable. As noted above, the edge enhancement filter 30 enhances the edges of the signal so that they will exceed the threshold and be closer to the proper location and the bar code is decodable. FIGS. 24 and 25 show signals produced when scanning a high density bar code (e.g. 3.5 mil) several inches from the noise of a standard range scanner. FIG. 24 shows the signal produced by the differentiator circuit 24 and FIG. 25 shows the same signal after passing through the enhancement filter 30. It is noted that the edges of the enhanced signal produced by enhancement filter 30 are much more pronounced and it is much easier to digitize and decode such an enhanced signal.

Figure 11:
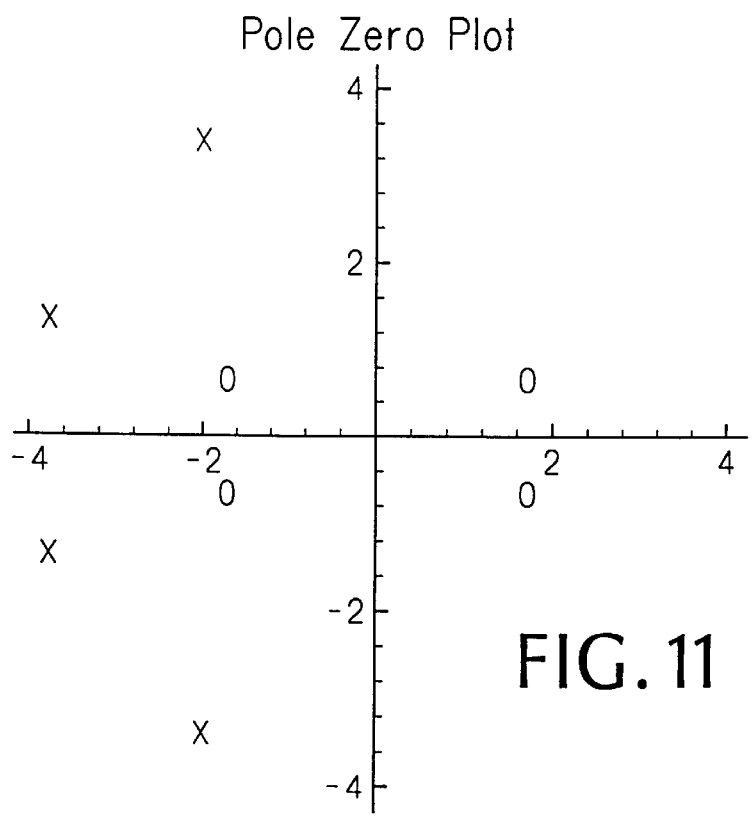
FIG. 11 shows the locations of the poles and zeros of the enhancement filter of FIG. 7.

Referring now to FIG. 11, the enhancement filter 30 includes four modified Butterworth poles, and two complex conjugate pairs of zeros (one pair of complex conjugate zeros to the right of the imaginary axis, the other pair to the left) arranged is such an order to provide linear phase over the 'enhanced' frequencies of interest.

Referring now in more detail to the timing generation circuit 42 (FIG. 2), such circuit 42 includes: a full wave rectifier circuit (FWR) 200 for converting the bipolar signal on line 41 into a corresponding unipolar electrical signal on line 201. The threshold circuit 202 is fed by the unipolar signal on line 201 and by a reference potential produced by the threshold circuit 202 itself to represent a predetermined percentage, here 80% of a peak level in the unipolar signal. The threshold circuit 202 produces a logic signal on line 204 related to the difference between the level of the unipolar signal on line 201 and the reference potential. The timing generation circuit 42 includes the edge detector circuit 206 (FIG. 14) fed by the unipolar signal on line 201 for high pass filtering of the unipolar signal on line 201 and for producing a logic signal on line 208. The logic signal on line 208 changes logic state when the unipolar signal on line 201 is at its minimum or maximum value. The timing generation circuit 42 includes a timing control logic circuit 210, fed by the edge detector circuit 206, the threshold detector circuit 202 (FIG. 15) and the margin detection circuit 40, for producing the edge strength timing pulse signals on line 17. The edge strength pulse commences when a peak in the unipolar signal on line 201 above the threshold level established by the threshold detector 202 is detected and continues for a period of time related to the magnitude of the peak of the unipolar signal, i.e., the peak level of the unipolar signal pulse. The polarity generation circuit 44 is responsive to the electrical signal produced by the differentiator circuit 24 (or after modification, if any, by the enhancement filter 30), the electrical signal produced by the margin detection circuit 40, the edge strength timing pulse signal on line 17, and a reference signal on line 212 representative of the average level of the electrical signal produced by the differentiator circuit 24 and, when "in", enhancement filter 30, for producing a logic signal on line 19 having a first logic state signal when the electrical signal produced by the differentiator circuit 22 and, when "in", enhancement filter 30 is greater than the reference signal on line 212 and a second logic state when the electrical signal produced by the differentiator circuit 24 and, when "in", enhancement filter 30 is less than the reference signal on line 212.

Figure 12:
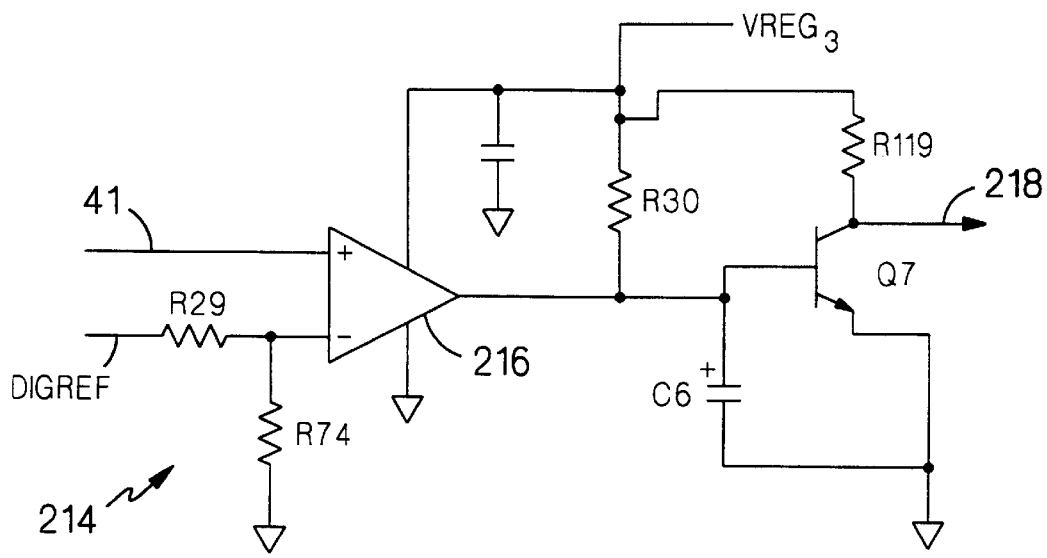
FIG. 12 is a schematic diagram of a margin detection circuit used in the multi-bit digitizer of FIG. 2.

Margin detection circuit 40 (FIG. 12) detects the presence of a bar code and enables timing and polarity signals to be produced on line 17, 19, respectively. Margin detection circuit 40 includes a resistor voltage divider network 214 (R29, R74) fed by a reference voltage VREF, here 1.9 volts. The voltage produced by the network 214 is compared to the enhanced differentiated analog signal produced by the signal on line 41. When the first negative going bar edge (i.e., as the signal 34, FIG. 3A, goes from $32H_1$ to $32I_1$), comparator 216 (FIG. 12) produces a relatively low voltage. This low voltage turns "off" transistor Q7, and raises the level of the voltage on the collector electrode thereof (i.e., line 218) to a supply voltage, VREG, through a resistor R119. This in turn allows the timing pulse and polarity signals to be produced on lines 17, 19. After the bar code is no longer present, i.e, the signal 34 (FIG. 3A) reaches a high steady state level, i.e., $32H_6$, the comparator 216 becomes an open circuit at its output. In such condition, capacitor C6 start charging to VREG through resistor R30. When the voltage on capacitor C6 voltage reaches 0.7 volts, the transistor Q7 saturates pulling the collector electrode thereof, and hence line 218, to a "low" level. This prevents the timing pulse signal from being produce on line 17, and also sets logic level of the polarity signal on line 19 "high". As noted above, the multi-bit digitizer 20 produces the timing pulse signal on line 17 with the duration proportional to the height of the peaks of the enhanced, differentiated analog signal on line 41. The rising edge of the pulse occurs at the peak of the enhanced, differentiated analog signal on line 41 of the above described threshold conditions are met.

Figure 13:
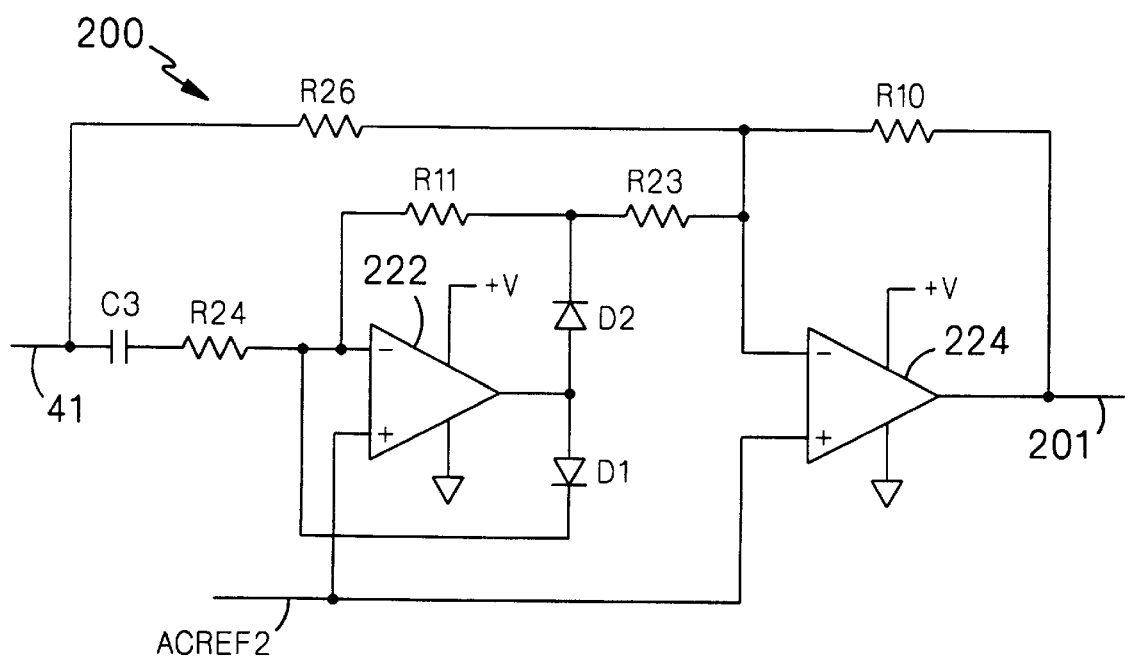
FIG. 13 is a schematic diagram of a full wave rectifier circuit used in the multi-bit digitizer of FIG. 2.

Referring now to FIG. 13, the FWR 200 includes capacitor C3, resistors R24, R11, R23, R10, R26, a pair of diodes D1, D2, and operational amplifiers 222, 224, all arranged as shown. The function of the FWR 200 is as follows: When the enhanced, differentiated analog signal on line 41, (Vin)

goes below the reference voltage VREF, diode D1 is forward biased and diode D2 is reversed biased. This sets the voltage at the anode of diode D2 at the reference voltage VREF. The voltage at the output 220 of the FWR 202, i.e., Vout=−(VREF+Vin)(R10/R26−VREF(R10/R23)+VFER(1+R10/(R26∥R23)); where "∥" is the resistance of the (R26)(R23)/(R26+R23); i.e, the resistance of the parallel combination of resistors R26, R23. Therefore, Vout=VREF−Vin. On the other hand, when Vin swings above VREF, D1 is reversed biased and D2 is forward biased. This sets the voltage at the anode of D2 equal to −Vin+VREF. In this case the output on line 201 of the FWR 200 will equal to: Vout=−(VREF+Vin)(R10/R26)−(−Vin+VREF)(R10//R23)+VREF(1+R10/(R26∥R23)). Therefore, Vout=VREF+Vin. Therefore, the output of the FWR 200 is a unipolar signal relative to the reference voltage, VREF.

Figure 14:
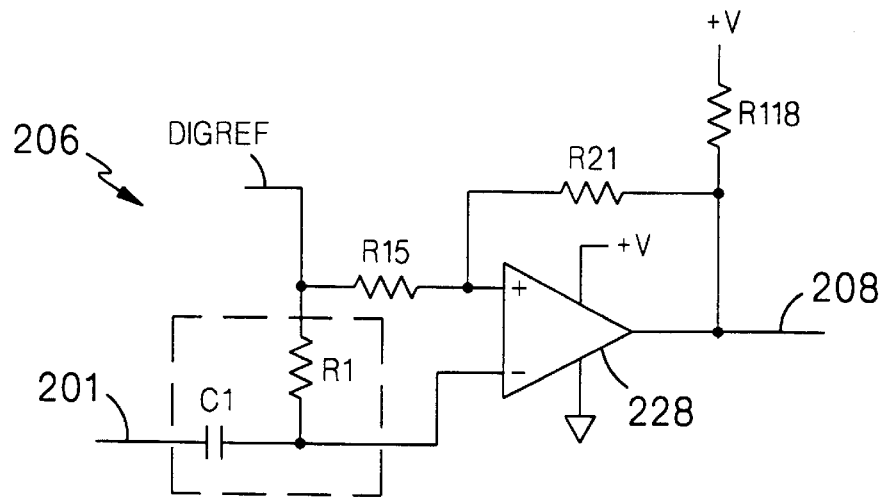
FIG. 14 is a schematic diagram of an edge detection circuit used in the multi-bit digitizer of FIG. 2.

Referring now to FIG. 14, the edge detection circuit 206, as shown. It is first noted that the function of the edge detect circuit 206 is to locate the edges of the enhanced, differentiated analog signal on line 41 which should correlate to the bar/space edges 14s (FIG. 1) of the bar code 14. The full waive rectified, enhanced differentiated analog signal on line 201 is fed, through an R-C network 226 made up of a capacitor C1, here 1000 pF and resistor R1, here 1.8 kohms for filtering. The RC combination, i.e., network 226, acts as a passive differentiator stage with the result that the peaks (maximums) of the signal on line 201 from FWR 200 get mapped into zeros, i.e. signals having levels at VREF. This filtered signal is compared to VREF (1.9 volts) in comparator 228. When the peaks in the differentiated signal produced by the network 226 are greater than VREF, comparator 228 is triggered and produces a high voltage on output 208. Resistors R118, R15 and R21 generate hysteresis which prevents the comparator 228 from switching on noise. The comparator 228 output 208 switches to a high level every time the differentiated signal produced by network 226 peak is detected.

Figure 15:
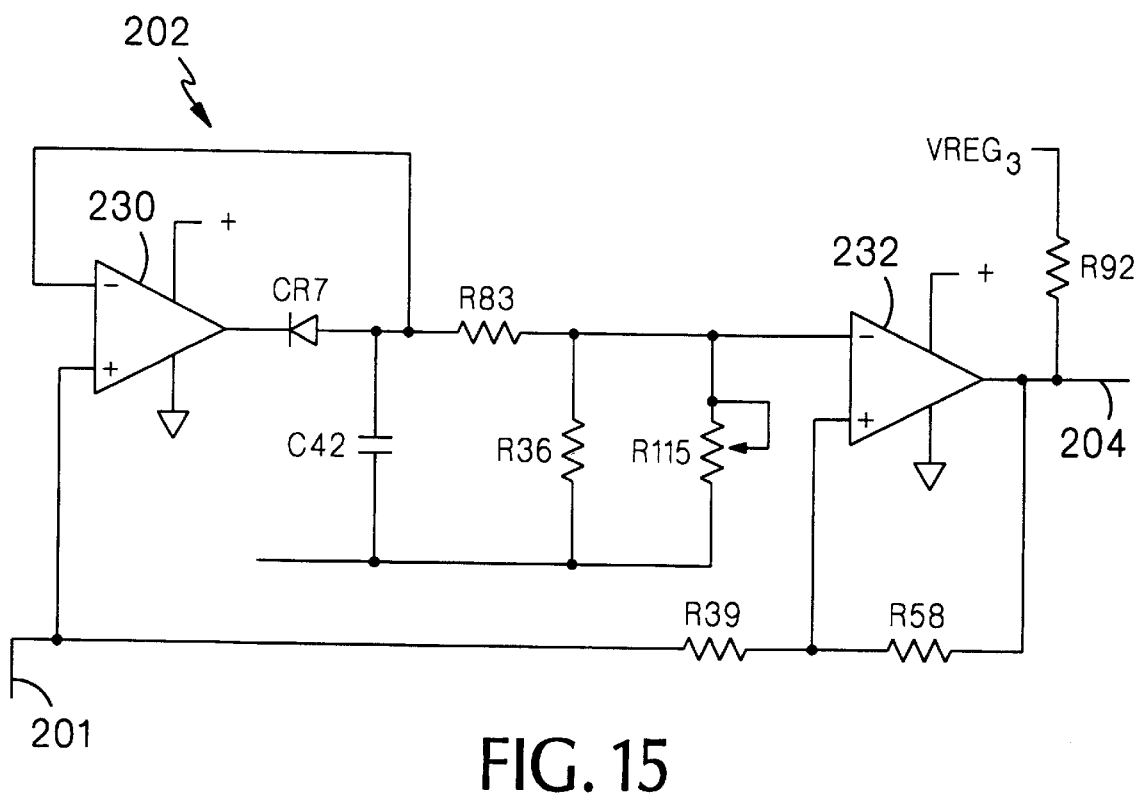
FIG. 15 is a schematic diagram of a threshold detection circuit used in the multi-bit digitizer of FIG. 2.

Referring now to FIG. 15, the threshold circuit 202 is shown. The function of the threshold circuit 202 is to monitor the level of the FWR signal produced on line 201 and switch the output 204 of the threshold circuit 202 to a high level when the level of the signal from FWR 200 (i.e., the level of the signal on line 201) gets above some percentage, here, 80% of the peak voltage level on line 201. Comparator 230, diode CR7 and capacitor C42 form a positive peak detector. The charge time of capacitor C42 is controlled by the output impedance of comparator 230 in series with the dynamic resistance of diode CR7. The discharge time of capacitor C42 is controlled by resistor R83 in series with the parallel combination of resistors R115, R36, as shown. The voltage fed to the inverting input (−) of comparator 232 is, therefore, a percentage of the peak voltage on capacitor C42; more particularly, the voltage on the input inverting input (−) of comparator 232 is equal to Vcap(R36/(R36+R83∥R115)); where Vcap is the voltage on capacitor C42 and R83∥R115 is (R115)(R36)/(R115+R36). The voltage on the input inverting input (−) of comparator 232 is compared to the FWR voltage produced on line 201. The voltage on line 201 is fed to the non-inverting (−) input of comparator 232 through resistors R39, as shown. When the FWR voltage on line 201 is above the voltage at the inverting input (−) of comparator 232, the comparator 232 output 204 goes to a high level, here VREG. Resistors R39, R118, and R92 provide hysteresis and pull up the output of the comparator 232 to its supply voltage VREG.

Figure 16:
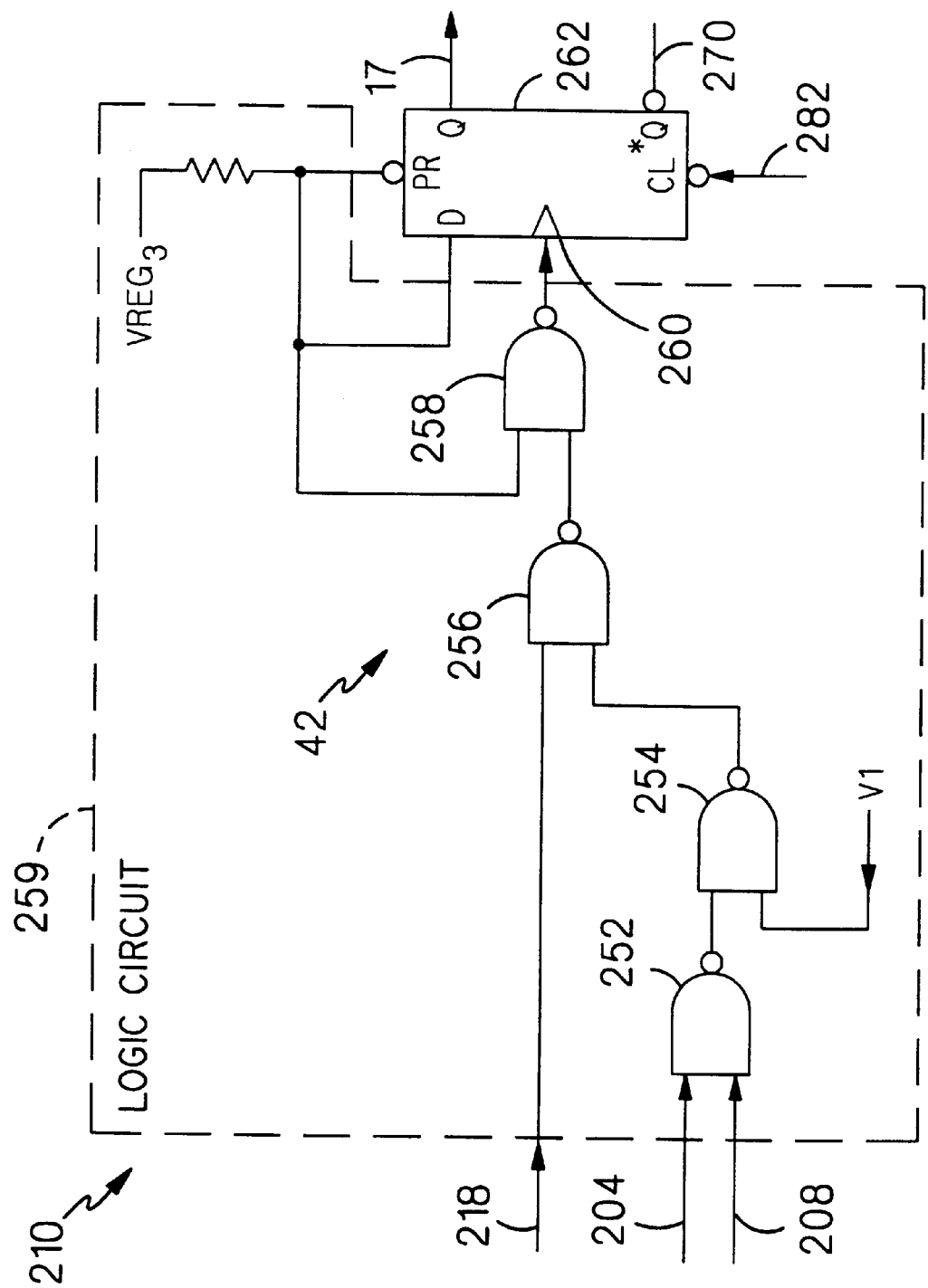
FIG. 16 is a schematic diagram of a timing control logic circuit used in the multi-bit digitizer of FIG. 2.
Figure 17:
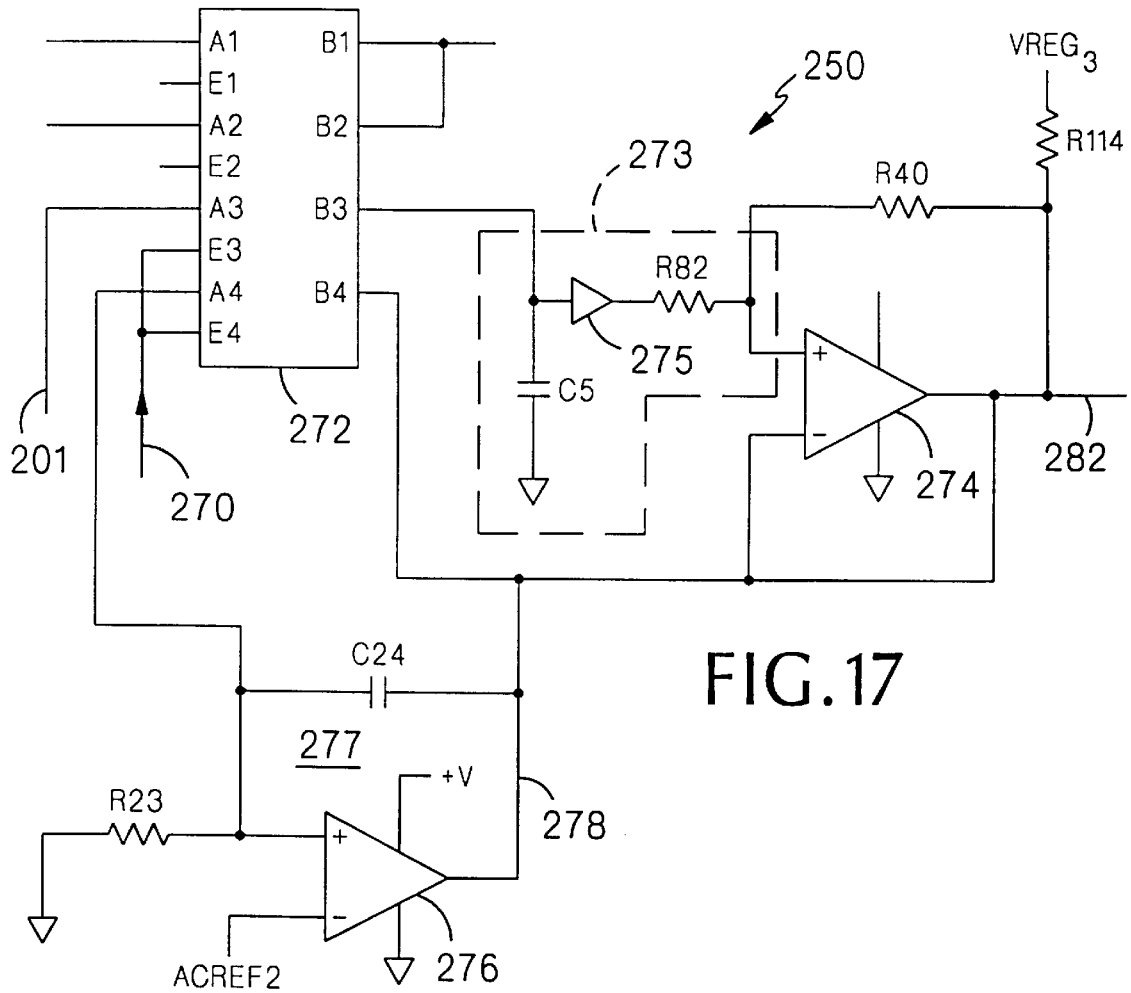
FIG. 17 is a schematic diagram of a logic circuit used in the timing control logic circuit of FIG. 16.

Referring again briefly to FIG. 2, the timing generation circuit 42 also includes a timing control and logic circuit 210 (FIG. 16) and an A/D converter circuit 250 (FIG. 17). The timing control and logic circuit 210 produces a positive going pulse on line 17 at the peaks produced by the FWR 200 on line 201. Referring now to FIG. 16, the timing control logic circuit 210 is shown to include four NAND gates 252, 254, 256 and 258 arranged as shown and configured to be logically equivalent to a single triple input AND gate section 259. The inputs to the logic circuit 259 are the outputs of margin detection circuit 40 (i.e, line 218), edge detection circuit 208 (i.e., line 208), and threshold detection circuit 202 (i.e., line 204). Lines 204, 208 are fed as inputs to NAND gate 252, the output of which, along with a fixed logic voltage V1, is fed to NAND gate 254, the output of which, along with line 218 is fed to NAND gate 256, as shown. The output of logic circuit 259 provides a signal for clock terminal 260 of a D flip-flop 262. Thus, when three conditions are met; (1) a margin, or bar code pattern is detected by margin detection circuit 40 (line 218); (2) an edge detected by the edge detection circuit 206 (line 208); and (3) the threshold requirement established by threshold detector 202 is met (line 204), a clock signal is fed to terminal 260 to clock in a high signal fed to the "D" input terminal of flip/flop 262, thereby producing a high level at the Q output of flip/flop 262, such Q output being fed to line 17. Thus, when the three conditions are satisfied, the edge strength pulse is commenced on line 17. Also, as output Q goes high, the complementary output Q* goes low. The low level signal on the complementary output Q* is fed, via line 270 to the A/D converter 250 (FIGS. 2 and 17).

More particularly, the Q* output is fed, via line 270 to pins E3 and E4 of an analog switch 272, here a model HC 4066. The A/D converter circuit 250 is enabled when the complementary output Q* goes low. Prior to that event, Q* is high. A high level on pins E3 and E4 of analog switch 272 forces the closure of the analog switch and connects input pin A3 to output pin B3 and connects input pin A4 to output pin B4. Pin A4 is the output of FWR 200 via line 201. Output pin B3 is connected to a resistor-capacitor network 273 made up of capacitor C5, a high input impedance buffer amplifier 275 and resistor R82, as shown. While pins A3 and B3 are connected, capacitor C5 acts as a sampling capacitor, and the signal at input pin A3 (i.e., the output of FWR 200) is fed through the resistor-capacitor network 273 to the non-inverting input of comparator 274, as shown. Resistor R32, capacitor C24, and comparator 276 are arranged as shown to form an integrator 277. As long as input pin A4 is connected to output pin B4, the integrator 277 is disabled, and VREF, fed to the non-inverting input (+) of comparator 276, appears at the output of comparator 276 (i.e., on line 278) and therefore at the inverting input (−) of comparator 274. When the level of the signal produced at the output of FWR 200 (on line 201) at non-inverting input (+) of comparator 274 is greater than VREF on line 278, the comparator 274 is at a high level. The output of comparator 274 is fed, via line 282, to the clear input of D flip/flop 262 (FIG. 16). (It should be noted that switch 57 may be implemented with the upper portion of switch 272. More particularly, terminal $57_1$ may be connected to terminal $A_1$, terminal $57_2$ may be connected to terminal $A_2$ and terminal $B_1$ (here connected in common with $B_2$) may provide line 41).

When a peak in the signal produced at the output of FWR 200 (line 201) is detected (and the three conditions described above are met), the complementary signal Q* (line 270) goes low. Therefore, the signal at pins E3 and E4 of analog switch 271 go low disconnecting input pin A3 from output pin B4 and disconnecting input pin A4 from output pin B4. At this point the voltage on capacitor C5 (FIG. 17) is being held at it's peak value, and the integrator 277 is enabled. The output voltage, vout, produced by integrator 277 on line 278 will be a ramp. The exact voltage formula is as follows:

$$vout=(1/C24)(\int ARCREF2/R32)dt+ARCREF2)$$

When the ramp voltage on line 278 becomes greater than the peak voltage on the non-inverting (+) input of comparator 274, the comparator 274 switches from its high level to its low level and, via line 282, clears the D flip/flop 262 (FIG. 16); i.e., the Q terminal goes low terminating the timing pulse signal on line 17. Further, the Q terminal goes high. At this point the integrator 277 is again disabled. Resistors R82, R40, and R114 provide Hysteresis and pull up to VREG.

Therefore, in summary, the output terminal Q of the D flip/flop 262 produces the timing pulse signal for decoder 21 (FIG. 1). It gets set by the clocking at the peaks of the signal produced by FWR 200 and reset by the clear signal for the D flip/flop 262 on line 282 from the A/D converter 250 (FIG. 17). The time during which the Q terminal of the D flip/flop remains at a high level is proportional to the amplitude of the peaks of the signal produced by FWR 200 on line 201.

Figure 18:
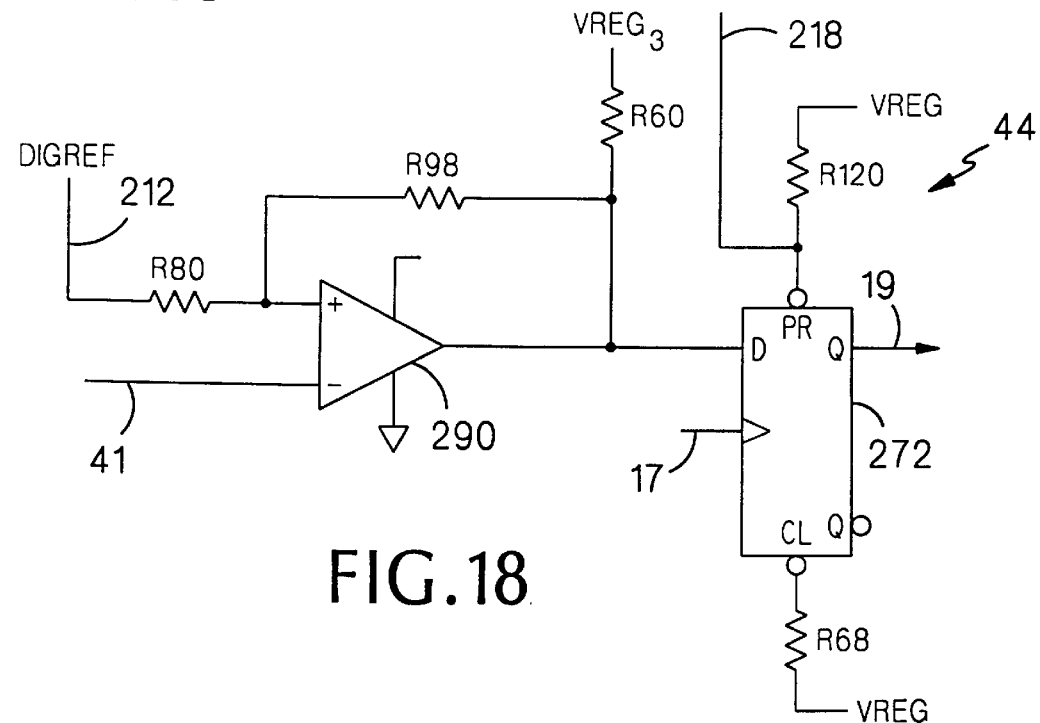
FIG. 18 is a schematic diagram of a polarity generation circuit used in the multi-bit digitizer of FIG. 2.

Referring now to FIG. 18, the polarity generation circuit 44 is shown. The polarity signal produced by such circuit 44 on line 19 represents the polarity of differentiated analog signal on line 41 at it's peaks. The differentiated analog signal on line 41 is compared to VREF (it's ac ground) on line 212 in comparator 290. If the signal on line 41 is above the reference VREF, the output of comparator 290 is at a low level. On the other hand, if the signal on line A1 is below the reference VREF, the output of comparator 290 is at a high level. This output acts as data line to a D flip/flop 272. Resistors R80, R98, and R60 provide hysteresis and pull up to VREG, as shown. The data at the D terminal of the D flip/flop 272 appears as the polarity signal on line 19 at the rising edge of timing pulse signal on line 17. (The signal on line 17 is fed to the clock terminal, CK, of D flip/flop 272, as shown).

In order to decode a multi-bit signal (based on a combination of the described timing pulse signal on line 17 and the polarity signal on line 19), it is first necessary to convert the signals on lines 17 and 19 into digital values representing the edge locations and strengths. Briefly, the decoder 21 includes two counters; a 16-bit counter 302 to measure bar code edge-to-edge times, $t_e$ (FIG. 1), from the edge strength or timing pulse signal on line 17 and an 8-bit counter 300 to the magnitude of the strength signal (i.e., the time duration $t_s$) from the signal strength timing pulse signal on line 17. The clock rate of the counter 300 is faster than the clock rate for counter 300, here by a factor of 5. At each bar code edge the decoder 21 reads the two counter values, resets the counters, and stores the values in memory 304 along with the polarity bit of the polarity signal on line 19. The polarity is tested and if it is positive then the strength value is stored directly. If it is negative the decoder stores a negative strength. Once a scan of multi-bit data has been stored it must be decoded. As shown in the timing histories for the example in FIG. 1, the middle two timing pulse $P_1$, $P_2$ signals have the same polarity, as when there are two negative edges in a row.

Figure 19:
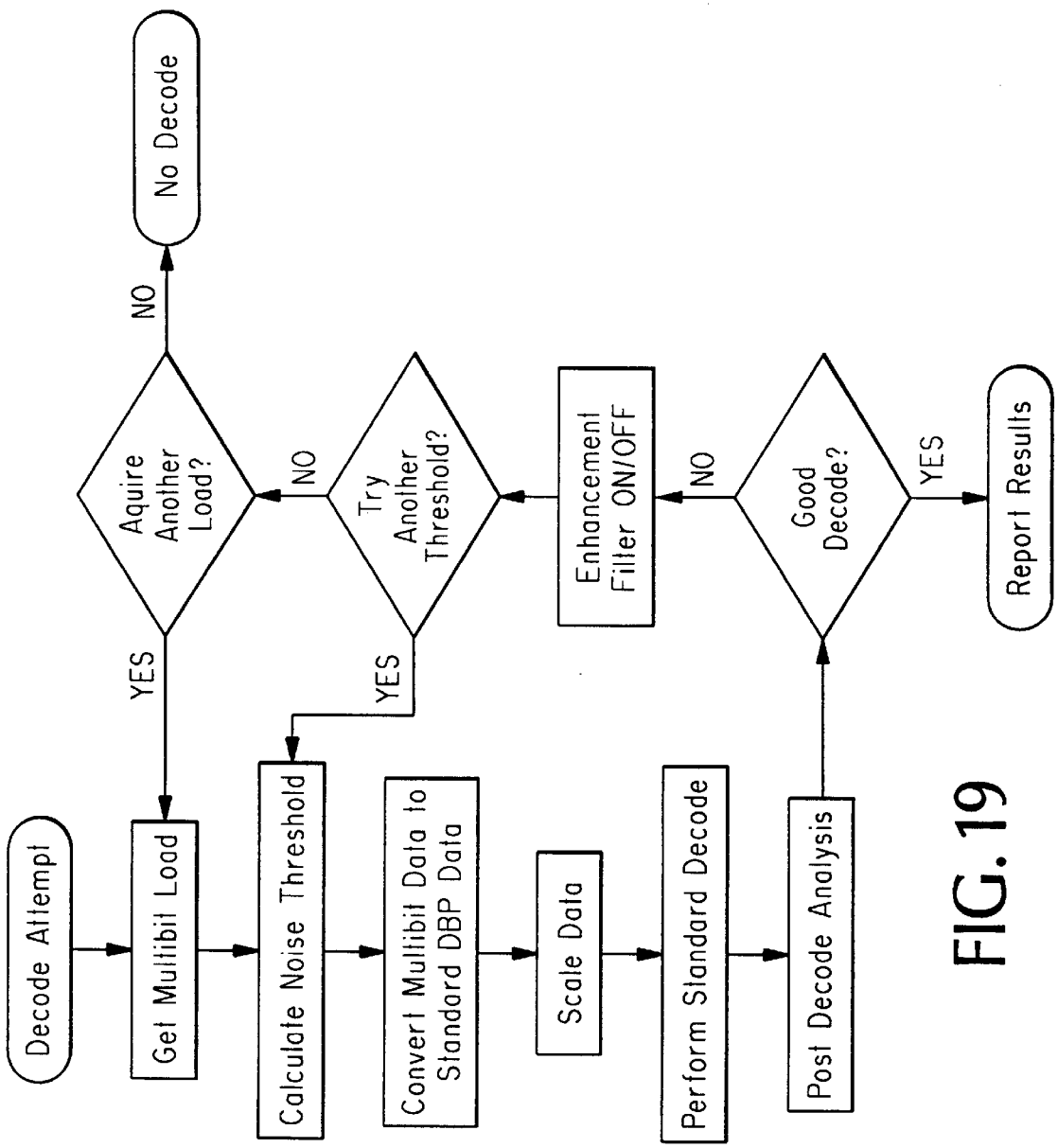
FIG. 19 is a flow diagram showing the operation of a decoder used in the processor of FIG. 1.

The decode algorithm, preformed by CPU 306, can be viewed as a pre-process and post-process. FIG. 19 shows a flow chart of the decode algorithm. The pre-process involves first analyzing the edge strength timing pulse signals to determine edge strength, choosing a noise threshold to separate real and false edges, and then converting the data to a standard DBP format. After a standard decode attempt has been performed on the converted DBP data, the post-process analyzes the decode results and initiates appropriate actions. If a full decode occurred, the post decode analysis will decide whether to accept this decode based on certain security checks. The post-process will also decide whether to attempt a second decode on the same data and whether to place the enhancement filter 30 "in" or "out".

Figure 20:
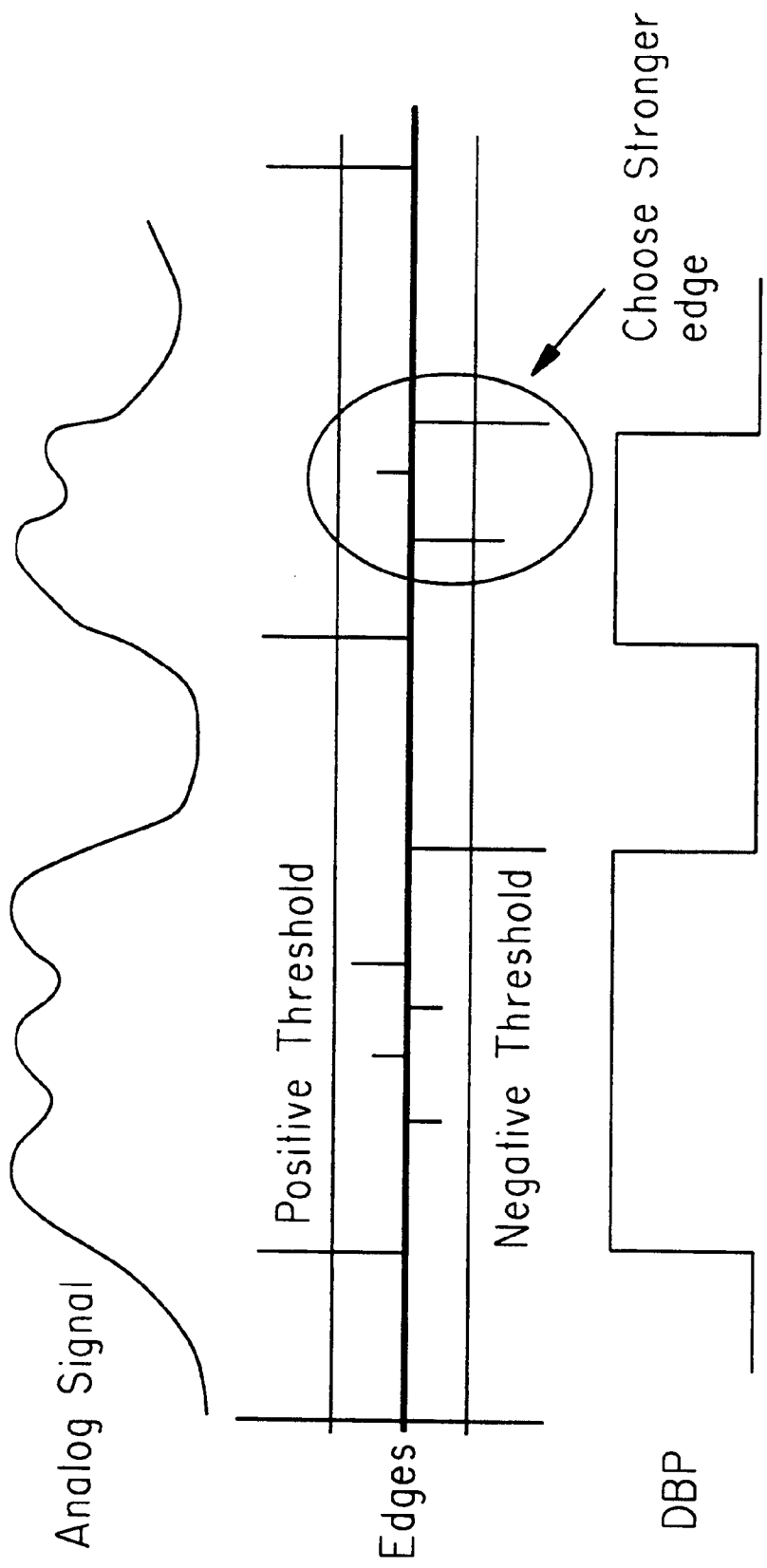
FIG. 20 is a timing diagram useful in understanding the decoder.
Figure 21:
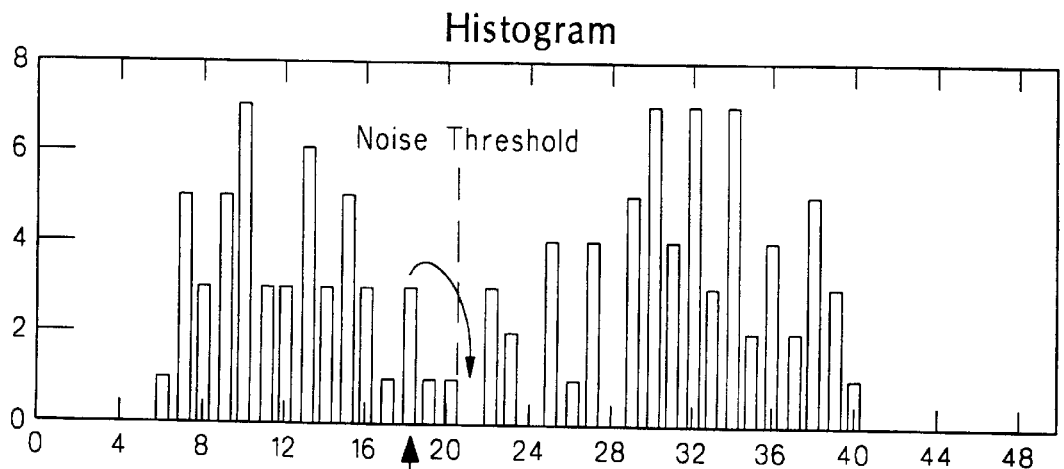
FIG. 21 is an unsmoothed histogram used by the decoder in establishing a noise threshold level for the decoder.
Figure 22:
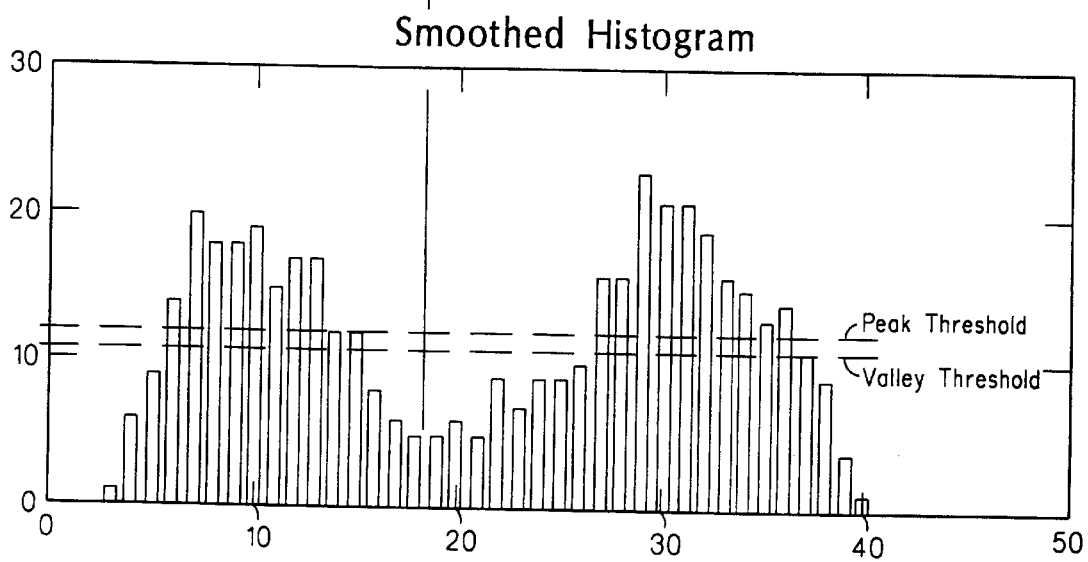
FIG. 22 is an unsmoothed histogram, constructed from the unsmoothed histogram of FIG. 21 and used by the decoder in establishing a noise threshold level for the decoder.

The process of converting the Multibit data to DBP is shown in FIG. 20. The edge strengths are depicted as vertical lines whose height and direction represent strength and polarity. There are two rules used in the converting process. First, all edges that are below the noise threshold are ignored. Second, if there are multiple edges of the same polarity above the noise threshold, the stronger edge is chosen. The single decode attempt processing steps are described below:

(1) A complete scan of data is acquired through the Timing, Polarity, and start of scan (SOS) signals (FIG. 1) and loaded into memory 304. The data consists of a sequence of edges (positive or negative) and edge strengths;

(2) After the data is acquired, histograms (FIGS. 21 and 22, to be described in detail herein after) are constructed using the magnitude of the edge strengths. The histograms' peaks and valleys are analyzed and stored as histogram features. Valleys in the histograms represent possible conversion thresholds. Edges whose strengths are below the conversion threshold are considered noise and are ignored; and, (3) Once a conversion threshold is chosen, the data is converted to a standard DBP format. During the conversion, the number of edge strength signals ignored is counted to indicate the amount of noise present in the bar code signal. This noise measure is used by the post decode analysis;

(4) To achieve a large dynamic range, the time between edges, $t_e$, are measured using 16 bit timers. After the multibit data is converted into a standard DBP format, the 16 bit data is scaled down to 8 bits. The amount of scaling is chosen based on the center ten elements of the DBP data;

(5) After the Multibit data has been converted into a standard DBP format, it is processed by the standard 8-bit decode algorithms. The standard decode algorithms are slightly modified in order to return detailed information about a failed decode attempt (eg. how many characters were decoded ?). This information is used by the post decode analysis;

(6) After a standard decode attempt, the post decode analysis examines the decode results, the noise measure, and the histogram features and initiates appropriate actions. If a full decode occurred, the post process will decide whether to accept this decode based on the decoded message and the noise measure (number of edges ignored). For example, "weak" code types such as Interleaved 2 of 5 may be rejected if a large amount noise is present. The post decode analysis will also decide whether to attempt a second decode on the same Multibit data and whether the enhancement filter should be turned "on" (i.e., "in") or "off" (i.e. "out").

A important aspect to decoding poorly printed bar codes using the edge strength timing pulse signals is determining which edges are 'real' as opposed to those which were caused by noise. To do this, histograms (FIG. 21) of the edge strengths are used. Typically, these histograms have two main peaks; one peak consisting of the weaker edges represents the noise, the other, consisting of the stronger edges, represent barcode. The lowest point in the valley between the two peaks is the noise threshold (edges stronger than the threshold are considered real).

Finding this point consists of the following steps (FIG. 23):

(1) The edge strength histogram consists of a 128 byte array. Each element of this array represents a possible edge strength (0–127). The value of each element in the array represent the number of occurrences of edges having that strength. To create the histogram, the Multi-Bit load is traversed and, using each strength as an index into the array, the appropriate histogram location is incremented;

(2) The initial histogram (FIG. 21) tends to be very coarse in distribution, having many high peaks and deep valleys. This make it difficult for the software to determine which of these are the true peaks and valleys. To help solve this problem the histogram is smoothed (FIG. 22) using a rolling sum technique. In the smoothed histogram, each location represents the sum of four consecutive locations of the original histogram. Each consecutive sum in the smoothed histogram overlaps the previous sum by three locations of the original histogram. For example:

smoothed_hist[0]=hist[0]+hist[1]+hist[2]+hist[3]

smoothed_hist[1]=hist[1]+hist[2]+hist[3]+hist[4];

(3) Once the histogram is smoothed (FIG. 22), each peak and valley is identified. A peak is defined as any location whose immediate neighbors are smaller. Likewise, a valley is defined as any location whose immediate neighbors are larger. In cases where an immediate neighbor is equal, the nearest non-equal neighbor is used for the determination. When a peak or valley has a neighbor which is equal, the left-most location is selected;

(4) Although the histogram has been smoothed, it still has ripples in it. In order to determine which of the peaks and valleys found in the previous step are of interest, peak and valley thresholds are chosen. Only valleys that are below the valley threshold are considered. Likewise, only peaks which are above the peak threshold are considered. The peak threshold is determined by taking the average of all the peaks heights greater than 4, excluding the highest peak and the lowest peak (which is greater than 4). This vale is then biased by negative 2 to accept borderline peaks. If there are less than 5 peaks which are greater than 4, the threshold is set to the lowest peak which is greater than 4. If only there is only 1 peak greater than 4, the threshold is set to that value minus 1. Only those peaks which are greater than the threshold are considered in the following steps. The valley threshold is determined by taking the average of all the valley depths greater than 0, excluding the highest valley and the lowest valley (which is greater than 0). This value is then biased by positive 2 to accept borderline valleys. If there are less than 5 valleys which are greater than 0, the threshold is set to the highest valley which is greater than 0. If only there is only 1 valley greater than 0, the threshold is set to that value plus 1. Only those valleys which are less than the threshold are considered in the following steps. In cases where the peak threshold is less than the valley threshold, the following rule applies. If there were more peaks found than valleys, set the valley threshold qual to the peak threshold. Otherwise, if there were more valleys than peaks, then set the peak threshold equal to the valley threshold.

Now that all of the peaks and valleys have been identified, and peak and valley thresholds have been chosen, the noise threshold van be determined. Basically this is done by finding, in the smoothed histogram (FIG. 22), the deepest valley that is less than the valley threshold, which is between two peaks that are greater than the peak threshold. Occasionally, this method may fail to find a valley for several reasons; only 1 peak above the peak threshold,l no valleys below the valley thresholds between peaks above the peak threshold, no peaks or valleys that exceed their thresholds, etc. When this happens, the following method is used to pick a valley. If no there were no peaks above the peak threshold or, the first peak in the list exceeds the peak threshold, pick the first valley in the list regardless of whether its below the valley threshold. Otherwise, chose the deepest valley in the list that precedes the first peak that exceeds the peak threshold.

Regardless of the method used, once a valley has been selected from the smoothed histogram, the four locations in the original unsmoothed histogram which represent the selected point are examined. The lowest of the four locations is selected as the threshold. If more than one of those location shares the lowest value, the left-most location is selected. This value is then decremented so that strengths equal to the lowest point are accepted as real data during the conversion process.

Now that a noise threshold has been determined, the data can be converted to standard DBP format for decoding by the standard decode algorithms described in the above referenced patent applications, the subject matter of which is incorporated herein by reference). This is done by traversing the load and concantinating edges that do not exceed the noise threshold which fall between edges, of alternating polarity, that do. For example. referring to FIG. 26A, timing pulse signals 400, 402, 404, 406, 408, and 410 are shown having edge strength levels, 20, 18, 9, 11, 22, and 21, respectively, as indicated. The corresponding polarity signal is indicated in FIG. 26B. With a threshold level of 15, for example, timing pulse signals 404 and 406 do not exceeded such threshold level and therefore are considered as false edges (i.e., edges from noise). Thus, in the DBP conversion, the decoder ignores timing pulse 404, as indicted in FIG. 26C.

When more than one edge of the same polarity, that exceed the threshold level, are found before encountering a suitable edge of the opposite polarity, the strongest edge strength timing pulse signal is selected, as shown in FIGS. 27A–27C. There, for example, timing pulse signal 420, 422, 424, 426, 428, 430 and 432 are shown having edge strength levels 20, 16, 68, 18, 17, 23 and 19, respectively, as indicated, in FIG. 27A. Again, a threshold level is 15, for example. Thus, timing pulse signal 424 does not exceed the threshold level of 15, and is ignored, as described above. Further, in this example, two consecutive timing pulse signals, 428, 430 have the same edge polarity, as shown in FIG. 27B. Thus, the timing pulse signal having the strongest edge strength level, here timing pulse 430 is selected as the timing pulse to determine polarity (i.e., the converted DBP signal FIG. 27C) changes state in response to the stronger edges strength; i.e., timing pulse signal 430, as shown in FIG. 26C.

It should be noted that the edge enhancement filter 30 (FIG. 3) can be switched "in" or "out" under software control. When switched "in", this filter 30 increases the scanners ability to read high density symbols, as discussed above. However, with the filter 30 "in", the scanners ability to read poorly printed dot matrix symbols is reduced. Preferably, the edge enhancement filter 30 is switched "in" every third scan for the duration of one scan. This is done to ensure that the filter is active on alternating scan directions. In cases where multiple decodes are required, once a decode has occurred the filter will be left in the state it has in at the time of the initial decode.

According to another aspect of the invention there are provided matched filters for optimum bar code edge detection. In known systems edge detection of bar code signals is usually performed by low-pass filtering and differentiation followed by peak detection (first-derivative digitizer) or zero crossing detection (second-derivative digitizer). The low-pass filter is used to remove noise while only minimally distorting the bar code signal, and is thus designed to approximate an ideal brick wall filter with a sharp transition band and excellent stop band attenuation.

A new perspective to this filter design is now proposed. It is now proposed to replace the standard low-pass filter and first derivative with a matched filter. The matched filter is the optimum filter in terms of signal to noise and therefore represents an upper bound in terms of performance. As discussed in more detail below, since the exact matched filter is not realizable using analog components (because of its finite length impulse response), an approximation can be arrived at.

The concept of matched filters has been discussed in relation to communication receivers, and the basic theory behind matched filters is provided in Appendix A to the specification.

As discussed in some detail in the introduction, known matched filters are unsuitable for the bar code scanners as they are designed for communication systems in which the bit rate is fixed and a bit synchronisation clock is available. On the other hand, for bar code scanners and other optical readers the first primary difference is that they are not synchronous systems (that is, no external clock is available) so that each edge between areas of differing light reflectivity such as bars and spaces (analogous to a bit transition) is detected in an isolated manner, asynchronously from the other edges. Also, in many bar code systems it is necessary, or at least beneficial, to change the band width of the matched filter (this is tuning the filter).

Any type of bar code scanning would benefit from the bar code matched filter in terms of improving the signal to noise ratio and hence improving the scanning performance as discussed in more detail below. The filter is of particular relevance to systems where the scan rates may change. A tunable bar code matched filter could also be used in standard fixed scan rate systems in which the band width of the bar code signal (that is the inverse of the smallest bar or space) nonetheless does change due to scanning different densities and scanning at different distances.

As discussed in more detail below, the ideal matched filter can be shown to have a signal to noise ratio of 2.8 dB greater than the best filter currently used and 4.2 dB better than the standard filter we often use. Two different approximate matched filters are considered. These filters can be built with analog components and they have signal to noise ratios of 0.3 dB and 0.8 dB less than the ideal matched filter. The filters are useful in scanners that are limited by the signal to noise ratio. This applies to long range scanners, high speed scanners, non-retro scanners and LED scanners. These filters can be used for no additional cost. By using one of the filters the scanner design can be improved by either a reduction of the collection area (e.g. mirror size or photodiode size) or an increase in working range.

It can be shown that by switching from a standard real-pole filter to one of the proposed filters the collection area (e.g. mirror size for retro scanner and photodiode size for non-retro scanner) can be reduced to 41% of its original size. Similarly, if the working range is limited by ambient light induced noise the working range can be increased by 25%.

The system is now described in more detail:

In bar code laser scanners the edges of the bar code are detected by what is referred to as a digitizer. There are many forms of digitizers but they share certain features. The older scanners used non-linear elements (i.e. diodes) to build simple low cost digitizers.

Figure 33:
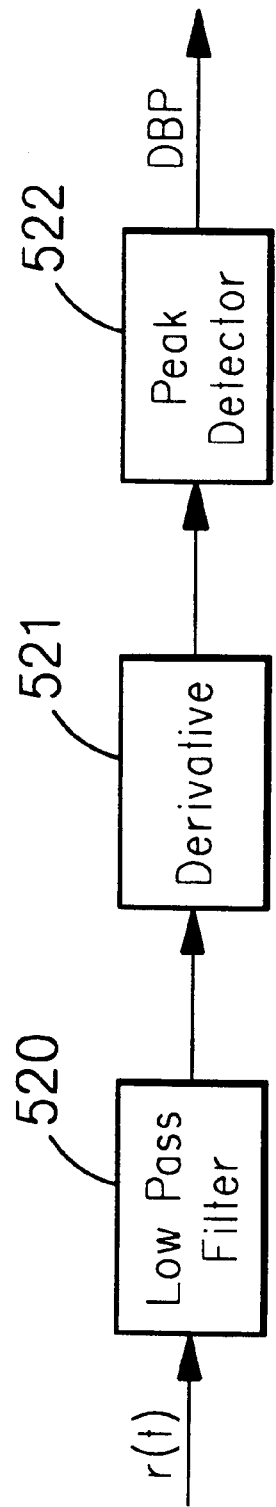
FIG. 33 is a block diagram of a standard first derivative digitizer.

However, due to the distortion caused by these non-linearities most current digitizers fit into one of two categories: first-derivative and second-derivative digitizers. In a first-derivative digitizer a peak detector is needed and in a second-derivative digitizer a zero crossing detector is needed. There are other more subtle factors but the basic approach is similar. Referring to a first-derivative digitizer, FIG. 33 is a block diagram of a standard first-derivative digitizer, with input signal r(t).

In the first-derivative digitizer a low-pass filter 520 is used to remove as much noise as possible without distorting the bar code signal. A derivative and peak detector (521,522) together detect the inflection-points (transitions) of the filtered signal. These points should occur very close to the edges of the original bar code signal; however, there will be some error due to convolution distortion and noise.

The basic matched filter system is shown in FIG. A2 and described in appendix A to the specification. In the matched filter the impulse response of the filter (the time reversal of the signal that is to be detected) is matched to the signal that the system is trying to detect. The basic principles of matched filters will be known to the skilled man from various sources such as the references cited in appendix A hereto and the exact components to the system are not described in detail here.

As discussed in more detail below, the present invention makes use of the principle of "modules" within a bar code symbol, a module being the narrowest element (bar or space) of the bar code.

Referring to known (digital communication) receivers such receivers consist of a channel equalizer to compensate for a non-ideal channel followed by a matched filter for symbol detection. This approach addresses the two major factors that affect bar code reading: convolution distortion and noise. The channel equalizer (the edge enhancement filter mentioned earlier) depends on the channel which in bar code scanning corresponds to the spot size of the laser beam. This changes with distance and it would be necessary to determine the spot size approximately to correct for the laser beam width. The bar code matched filter is designed to match a single module bar followed by a single module space. A filter matched to a single module space followed by a single module bar is just the same as the first filter with the opposite sign, and so it is possible to cover both cases with only a single filter. In a communication system the symbols are synchronized so the receiver samples the output of the matched filters at the end of the symbol time.

Figure 34:
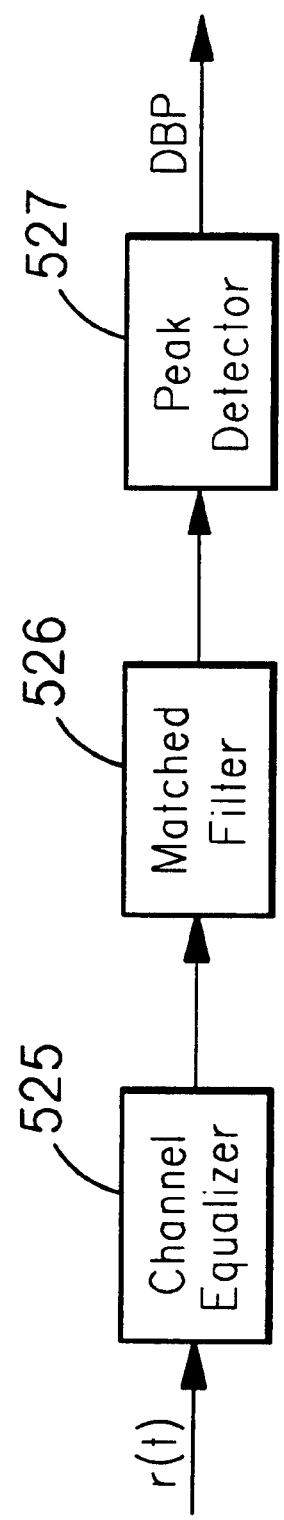
FIG. 34 is a block diagram of a bar code edge detector according to an aspect of the present invention.

As discussed above, no such synchronisation exists in a bar code system; the scan speed is unknown and often not even very uniform, so the edge detection scheme is not synchronized. The method of dealing with this is to detect the peak of the signal coming from the matched filter. FIG. 34 is a block diagram of the proposed bar code edge detector.

To equalize for the channel with channel equalizer it is necessary to determine the spot size of the laser beam which can be done for example with the adaptive filter approach discussed below. The components of the system that will be considered at this point are a matched filter 526 followed by a peak detector 527. To simplify the analysis it will be assumed that the bar code being scanned has a unit module size. All filters discussed here can be scaled by the actual module length to obtain the proper filter. In many systems filters are designed for the highest frequency signal (i.e. shortest module). If a system is built that scales the filter to the actual module length, however then an improvement in signal to noise ratio results.

The impulse response of the ideal matched filter mentioned above as shown in FIG. 35 is, $$h(t) = \begin{cases} 1 & 0 \le t < 1 \\ -1 & 0 \le t < 2 \\ 0 & \text{otherwise} \end{cases}$$

The impulse response of an approximate matched filter (discussed in more detail below) is shown on FIG. 35 by way of comparison.

In a communication system the signal to noise ratio is defined at the end of the symbol period. Since in bar code scanning the symbol interval is not known the signal to noise ratio is defined at the time when the peak detector detects the peak of the signal. Let $t_p$ be the time that the peak is detected. Following the analysis from appendix A the signal-to-noise ratio is given by Equation (A.7) with $t_p$ substituted for T, $$SNR \doteq \sqrt{\left(\frac{S(t_p)}{E[N^2(t_p)]}\right)} \quad (2)$$

Thus to determine the signal-to-noise ratio it is necessary to determine the peak time, $t_p$ and calculate $S(t_p)$. Since the noise is stationary its statistics do not change with time so the noise power is a constant.

The problem with the matched filter proposed is that it has a finite length impulse response. Such a filter cannot be built exactly with standard analog components since the transfer function has an infinite number of poles.

Since the ideal bar code matched filter is not realizable it is necessary to build an approximate filter that will perform as close to the ideal filter as possible. (See FIG. 35)

There are many methods of approximating a transfer function or equivalently an impulse response. The method proposed here is to approximate the transfer function of the bar code matched filter using a Padé approximation.

Padé approximations are discussed in "Padé Approximants—Part I: Basic Theory" Encyclopedia of Mathematics and its Applications, Vol. 13, G. A. Baker, Jr. and P. Graved-Morris, Addison-Wesley, 1981. The principles will be familiar to the skilled person, but in summary:

Given a complex function f(z) one method of representing the function is in a Taylor series, $$f(z) = c_0 + c_1 z + c_2 z^2 + \dots$$

The Taylor series can be truncated and one obtains an polynomial approximation of the function f(z). Similarly, a Padé approximation is an approximation of a complex function by the rat io of two polynomials, $$f(z) \approx \frac{a_0 + a_1 z + \dots + a_L z^L}{b_0 + b_1 z + \dots + b_M z^M}$$

The theory of Padé approximation explains how to determine the coefficients in an optimum manner.

If a transfer function is approximated by the ratio of two polynomials it is possible to realize the system described by this approximation with an analog circuit. That is what will be done for the matched filter. The impulse response of the matched filter can be written as, $$h(t) = u(t) - 2u(t-1) + u(t-2)$$

where u(t) is the Heavyside unit step function. Taking the Laplace transform of the impulse response gives the transfer function of the ideal matched filter, $$H(s) = \frac{1 - 2e^{-s} + e^{-2s}}{s}$$

In performing a Padé approximation it is necessary to select the order of numerator and denominator polynomials. In current systems the filters and the first derivative require at least three operational amplifiers. Therefore, one could realize a fifth order filter, which could be built with three operational amplifiers.

Such an approximate matched filter is termed a "third over fifth order system" and can be realised by a cascade of two second order systems and one first order system. We can factor H(s) as, $$H(s) = \frac{SN(s)}{D_1(s)D_2(s)D_3(s)}$$

where
N(s) is second order
$D_1(s)$ is first order
$D_2(s)$ is second order
$D_3(s)$ is second order
the write H(s) as, $$H(s) = \underbrace{\frac{S}{D_1(s)}}_{H_1(s)} \underbrace{\frac{N(s)}{D_2(s)}}_{H_2(s)} \underbrace{\frac{1}{D_3(s)}}_{H_3(s)}$$

Figure 36A:
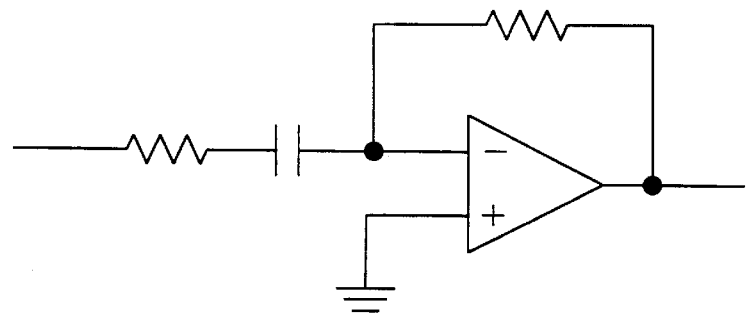
FIG. 36a shows a first order filter system.

According $H_1(s)$ is a first order system and is easily realised with an active RC filter circuit as shown in FIG. 36a.

$H_2(s)$ is a general second order system with two poles and two zeros (as discussed in more detail below). It can be realised using a circuit such as that shown in FIG. 36b. The circuit shown comprises a general biquadratic filter in which the elements labelled $Y_A$ to $Y_D$ are admittances.

Figure 36B:
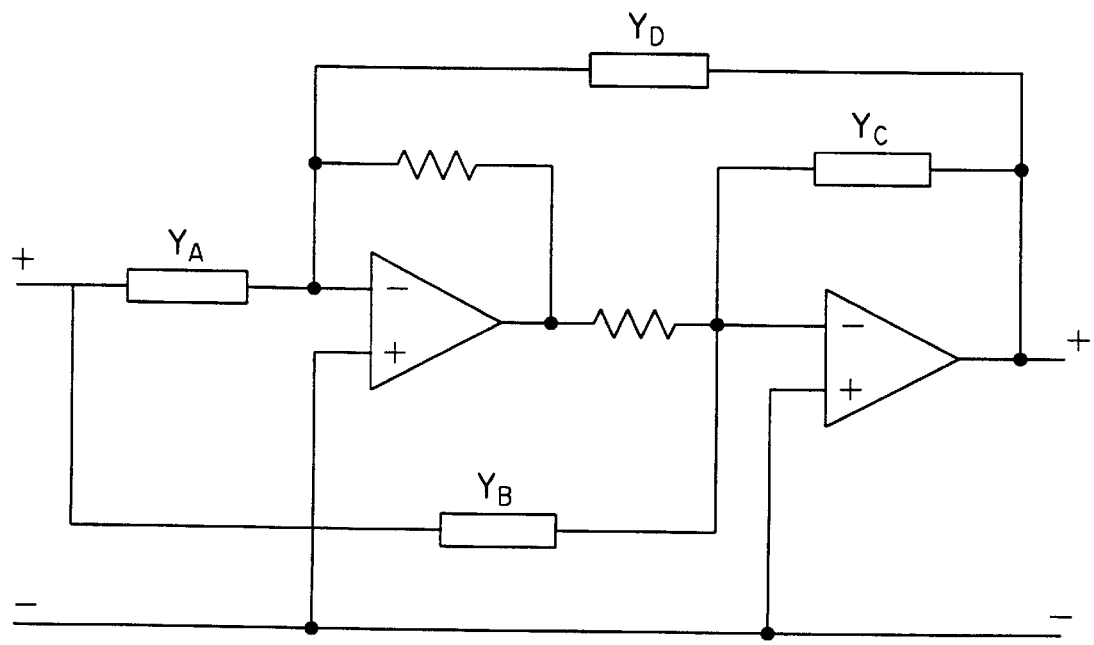
FIG. 36b shows a general biquadratic filter.
Figure 36C:
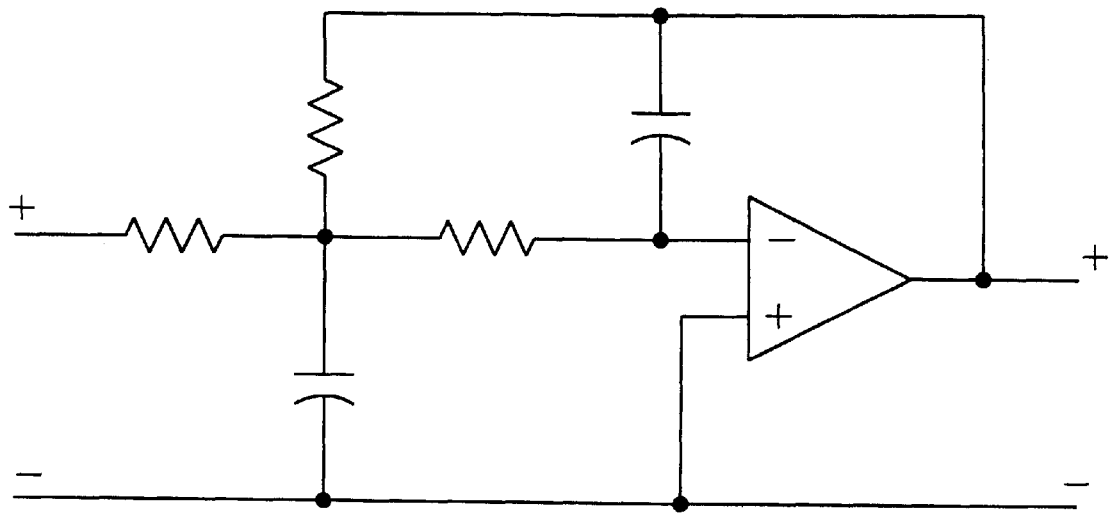
FIG. 36c shows a low-pass, multiple-feedback, infinite gain-amplifier filter.

$H_3(s)$ is a second order system with two poles and no zeros which can be realised with a circuit as shown in FIG. 36c. The figure shows a low pass multiple feed-back infinite gain amplifier filter. A further discussion of the circuitry and the corresponding theory can be found in "Introduction to Operational Amplifiers Theory and Practice" J. V. Wait, L. P. Huelsman and G. A. Korn, McGraw-Hill 1975.

Figure 36D:
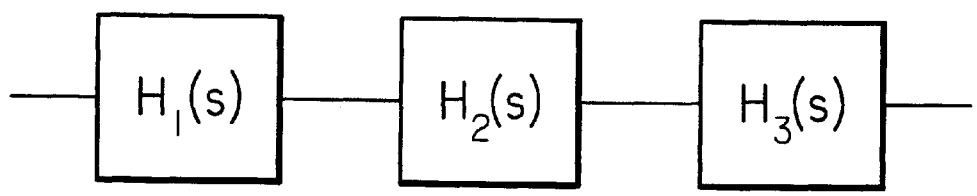
FIG. 36d is a block diagram of an overall matched filter.

The overall matched filter is shown at FIG. 36d wherein the circuit of FIG. 36a is represented as $H_1(s)$, the circuit of FIG. 36b is represented as $H_2(s)$ and the circuit of FIG. 36c is referenced $H_3(s)$ providing an overall matched filter.

Thus, the order of the denominator is set to five. It is desirable to have the filter response drop off at high frequencies so that high frequency noise will be attenuated. So the order of the numerator was selected to be two less than the denominator (i.e. third order numerator). The third-order over fifth-order Padé approximation of the matched filter can be derived, following "Mathematics: A system for Doing Mathematics by Computer", S. Wolfram.,:

$$H_p(s) = \frac{35.11s^3 - 44.02s^2 + 1254s}{s^5 + 16.19s^4 + 121.3s^3 + 513.8s^2 + 1210s + 1254}$$

The impulse response of the approximate matched filter is obtained by taking the inverse Laplace transform of $H_p(s)$. FIG. 35 shows the impulse response of both the ideal matched filter and the approximate matched filter. The question now is how good is this filter. There are two measures of performance of such a filter: the signal-to-noise ratio as defined previously and the distortion of the bar code signal caused by the filter (convolution distortion).

The signal-to-noise ratio is given by Equation (2) where the time $t_p$ is the time of the signal peaks in response to a single module bar space pair. So the input signal is $x(t)=u(t)+2u(t-1)-u(t-2)$. The peak time of the output, $t_p$, was found using a numerical routine for finding the maximum of a function. As defined in the S. Wolfram reference noted above the noise power is given by Equation (A.8). If the value of $N_0$ is selected to normalize the signal-to-noise ratio of the ideal matched filter is 0 dB. This is useful for comparison purposes since all other filters can easily be compared to the optimum filter. The value of 0 dB can also be found directly from Equation A.9 for the ideal matched filter. With this value of $N_0$ the signal to noise ratio for the approximate matched filter is $-0.31$ dB. So the approximate matched filter is excellent in terms of signal to noise ratio. The next issue to address is the distortion of the bar code signal caused by this filter.

The distortion of the bar code signal is measured in terms of the worst case character combination for the Universal Product Code (UPC). The distortion is measured in modules where an error of half a module is enough to prevent decoding. It has been proposed that the distortion caused by the analog filters in the scanner should be much less than the distortion caused by the optical beam. Based on that argument the maximum distortion caused by the analog filters should be approximately 0.05 modules, say. A designer may choose to accept slightly more distortion in order to improve performance in other areas (e.g. signal to noise ratio).

Figure 35:
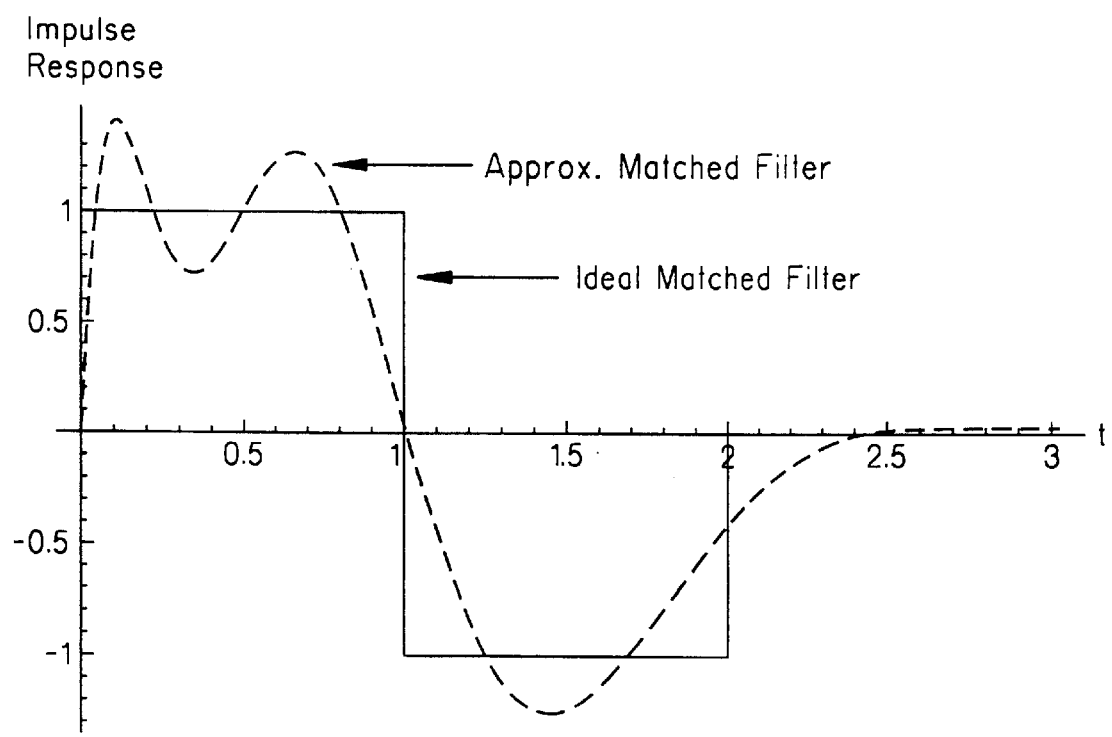
FIG. 35 shows the impulse response of an ideal matched filter and an approximate matched filter each according to the present invention.

Notice that in FIG. 35 the impulse response of the ideal matched filter is zero outside the interval [0,2] so there will be no distortion caused by adjacent elements. So the ideal matched filter is optimum in terms of distortion as well as signal to noise ratio. The impulse response of the approximate matched filter extends past the interval [0,2] so there will be some interference from adjacent elements leading to distortion of the bar code signal. When methods used to determine the distortion caused by an analog filter are applied to the approximate matched filter, the distortion caused by the approximate matched filter turns out to be 0.1 modules. This is twice the original design goal but is still not excessive.

One method of producing an alternative approximation to the matched filter is to use a Padé approximation to a filter that has a shorter impulse response. Several prototype filters were used in attempting to find a new filter with distortion of about 0.05 modules. For example for a filter that has an impulse response of $h(t)=u(t)-2u(t-0.88)+u(t-1.76)$, the Padé approximation to this filter is, $$H_{p2}(s) = \frac{39.90s^3 - 56.84s^2 + 1841s}{s^5 + 18.40s^4 + 156.7s^3 + 754.0s^2 + 2018s + 2377}$$

Figure 43:
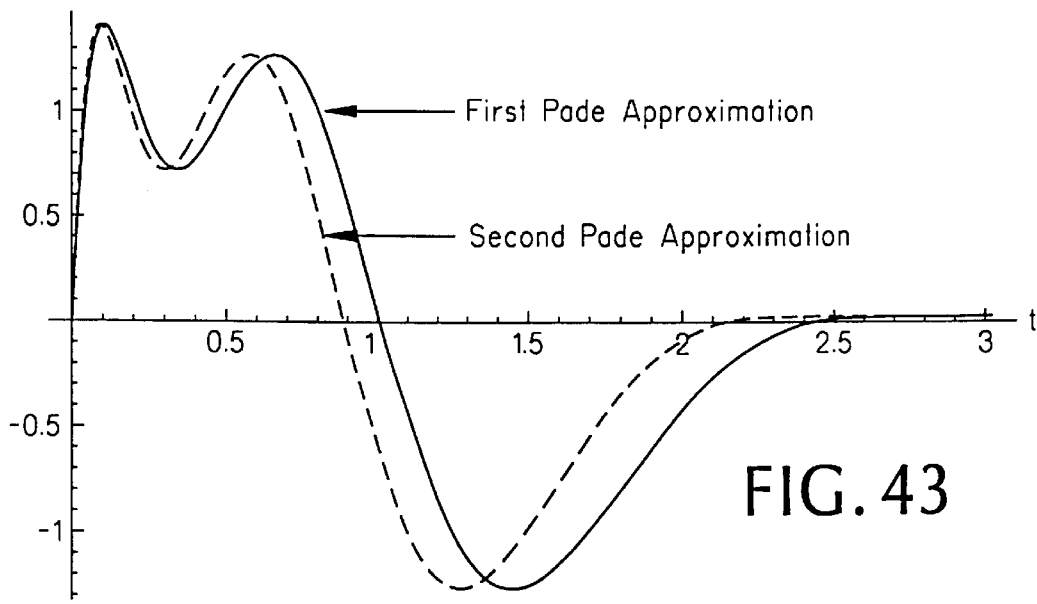
FIG. 43 shows the impulse response of two different approximate matched filters.

The signal to noise obtained by such a filter can be calculated to be $-0.86$ dB, so by reducing the distortion the signal to noise is reduced by about 0.5 dB. The impulse response of this filter is plotted, along with the impulse response of the first Padé approximation, in FIG. 43.

One concern about any proposed filter is the difficulty of using standard off-the-shelf parts. Another primary concern for the filter is that it does not use very high Q poles that would require high speed operation on amplifiers. By approximating the ideal matched filter with a fifth-order transfer function it is possible to build the filter using an active RC-filter. The only other issue to be examined is whether the poles and zeros of the filter have a very large Q which would require higher bandwidth operational amplifiers than in standard filters. The second approximate matched filter is basically a time scaled version of the first one and so the Q of the poles and zeros will not change, just their absolute position.

Figure 37:
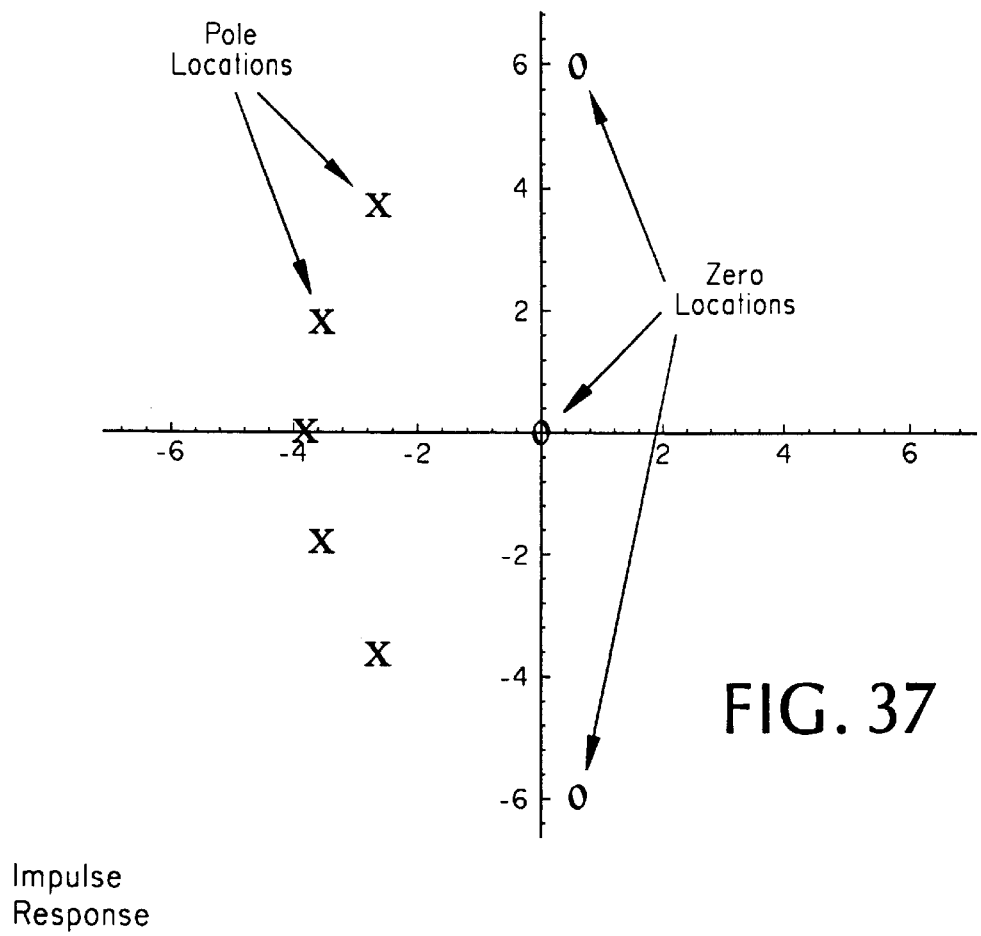
FIG. 37 shows the pole and zero locations for an approximate matched filter.

If the denominator of the transfer function for the first Padé approximation filter (7) is factored the pole locations can be found. Similarly, the zeros can be found by factoring the numerator. FIG. 37 is a plot of all the pole and zero locations of the filter.

The largest Q of the poles is only 0.86 which is quite acceptable. Notice that the two complex zeros are rather close to the jw-axis so their location may be a bit more sensitive to component variation. In any design it would always be necessary to consider the effect of component variation as well as non-ideal operational amplifiers. The transfer function that is obtained by taking into consideration these factors can then be analysed in terms of signal-to-noise and distortion. However, since the filter is just an approximation of the ideal matched filter small changes to the transfer function will likely have minimal effect on performance.

The performance of a number of filters will now be compared. The filters being considered are: the ideal matched filter, the first and second approximate matched filters, the Butterworth filter with first-derivative, and a three real-pole filter with a first-derivative. The filters will be compared in terms of both signal to noise ratio and distortion. To make comparisons easier all the filters will be scaled so that the noise after the filter (A.8) will have the same noise power as the ideal matched filter. This gives the ideal matched filter a signal to noise ratio of 0 dB which is useful for comparison purposes. By scaling all the filters so that their output noise powers are the same the signal to noise ratio can be seen by just looking at the output signal power of the filter in response to a bar code edge.

Figure 38:
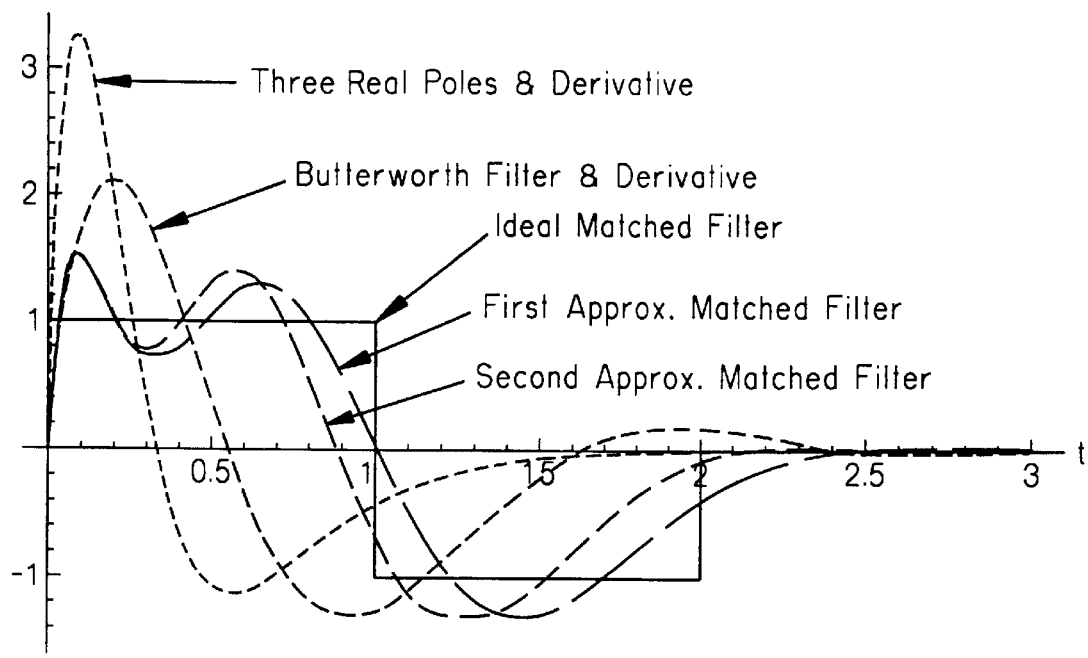
FIG. 38 shows a comparison of the impulse responses of five different types of filters.

The impulse responses of the five filters are shown in FIG. 38. One can see how the Padé approximations are close to the ideal matched filter, the Butterworth is different and the real-pole filter is very different. The cutoff frequency of the Butterworth filter is $0.6T^{-1}$, where T is the duration of a module. The cutoff frequency of the real-pole filter is $0.5T^{-1}$. These are typical cutoff frequencies for known products.

Since each of these filters has been normalized to result in the same noise the measure of performance is which filter enhances the signal the most.

Figure 39:
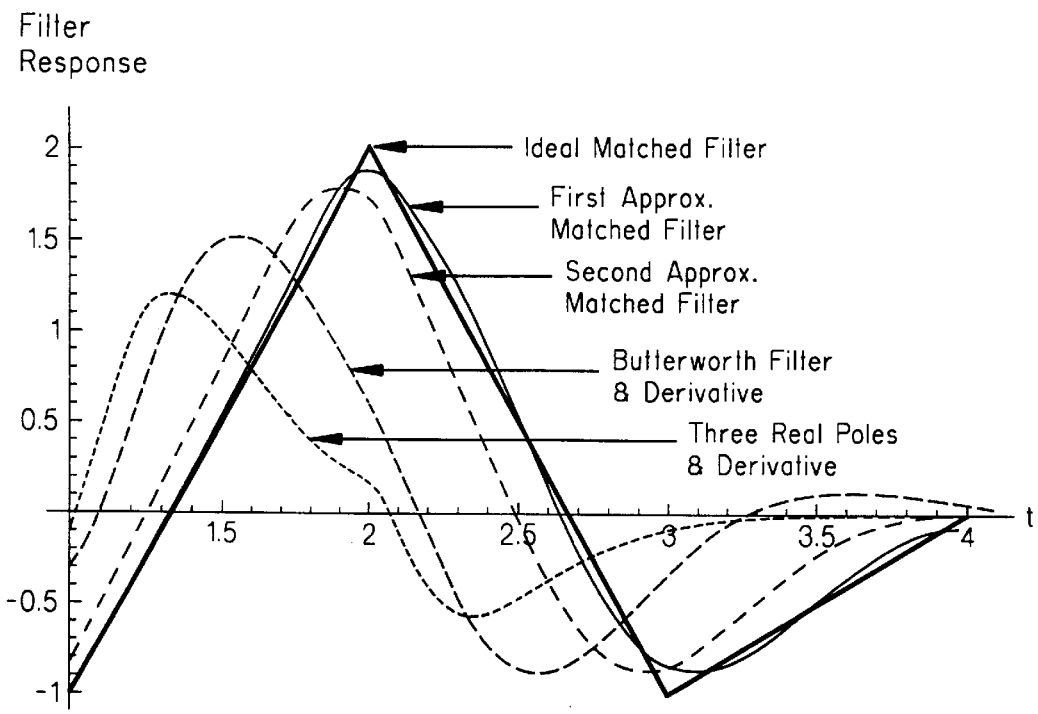
FIG. 39 shows the responses of the five different filters of FIG. 38 to a bar code edge.

This can be seen by looking at the response of the filters to a single module bar space pair. So the input signal is $x(t)=-u(t)+2u(t-1)-u(t-2)$. The response of the filters to this bar code edge is shown in FIG. 39.

The filter that has the largest peak response has the largest signal to noise ratio. The ideal matched 25 filter is the best, followed by the first and second approximations, and then the Butterworth, and the real-pole filter.

| FILTER | SIGNAL TO NOISE (dB) | DISTORTION (MODULES) |
|---|---|---|
| Ideal Matched Filter | 0 | 0 |
| First Approx. Matched Filter | −0.31 | 0.10 |
| Second Approx. Matched Filter | −0.86 | 0.05 |
| Butterworth Filter & Derivative | −2.83 | 0.02 |
| Real Pole Filter & Derivative | −4.20 | 0.02 |

Table 1 compares all five filters in terms of normalized signal-to-noise ratio and convolution distortion. The signal to noise ratio has been normalized so that the ideal matched filter has a signal to noise ratio of 0 dB, which makes for easy comparisons. Notice that the ideal matched filter has no distortion and the highest signal to noise ratio. The first approximate matched filter is an excellent approximation in that the signal to noise ratio only drops 0.31 dB. However, the worst case distortion is 0.1 modules, which is a bit high. The second approximate matched filter is 0.86 dB worse than the ideal matched filter and has a distortion of only 0.05 modules. The Butterworth and the real-pole filter both have lower signal to noise ratios, by 2.83 and 4.20 dB, respectively. The distortion is lower in those filters so the cutoff frequencies could be made a bit lower, but not much, which would only increase the signal to noise slightly.

We now consider what improvements in the scanner can be obtained by this improvement in signal to noise ratio. Two types of improvements will be discussed in this section: a reduction in the collection area and an increase in working range when limited by noise (e.g. under high ambient light). The collection area represents the mirror size for a retro scanner or the photodiode size for a non-retro scanner (using a staring detector).

When the ambient light induced noise is dominant the signal to noise ratio is proportional to the square root of the optical collection area, $$SNR \propto 20\log(\sqrt{\text{area}}).$$

So for example, by switching from a real-pole filter to the first Padé approximation of the matched filter a 3.89 dB improvement in signal to noise will enable the use of a collector with 41% of the area of the original collector. In another example, by switching from the Butterworth filter to the second Padé approximation a signal to noise ratio improvement of 1.97 dB will enable the use of a collector with 64% of the area of the original collector.

The signal to noise ratio is proportional to the square of the distance to the bar code.

$$SNR\ 20\log(r^2)$$

So the working range will be increased if the limiting condition is the signal to noise ratio. Using the previous two examples a 3.89 dB improvement in signal to noise ratio will lead to a working range of 1.25 times the original working range. Similarly, a 1.97 dB improvement will lead to a working range of 1.12 times the original working range.

The bar code matched filter discussed here is one of a number of signal processing concepts that can be applied to bar code decoding. The implementation of the matched filter in a fixed analog circuit is also only one option.

The filters that are used are usually designed for the smallest module (in time). However, if the module size is known to be twice the minimum (say the decoder can determine the approximate module duration for example in a known manner) the filter could be adapted to the actual module size. If the filter is rescaled to a module twice the original size the signal to noise ratio will be increased by 3 dB, see Equations (A.9) and (A.10). So the use of filters with variable bandwidths can lead to a significant increase in signal to noise.

Another issue concerning the realization of the matched filter is that in an all digital system the ideal matched filter can easily be implemented digitally, since it is just a simple finite impulse response (FIR) filter. It is of course even easier to adapt the filter to the signal in a digital system. Another issue is that the FIR filter consists of only 1's and −1's so it could be built without any multipliers. This makes for simple low cost implementation. Another realisation would be an analog sampled data system using charge coupled devices.

One final issue to mention is that the bar code matched filter is the optimal filter for additive Gaussian white noise, which is a good assumption in many cases.

The filters of the invention are especially useful in scanners that are limited by the signal to noise ratio, due to additive Gaussian white noise. This applies to long range scanners, high speed scanners, non-retro scanners and LED scanners. Since these filters can be used for no additional cost it could lead to a cost savings in terms of photodiode size or mirror size. It is also very useful to have the ideal matched filter as a benchmark for any filter that may be considered for use in a scanner.

Figure 40:
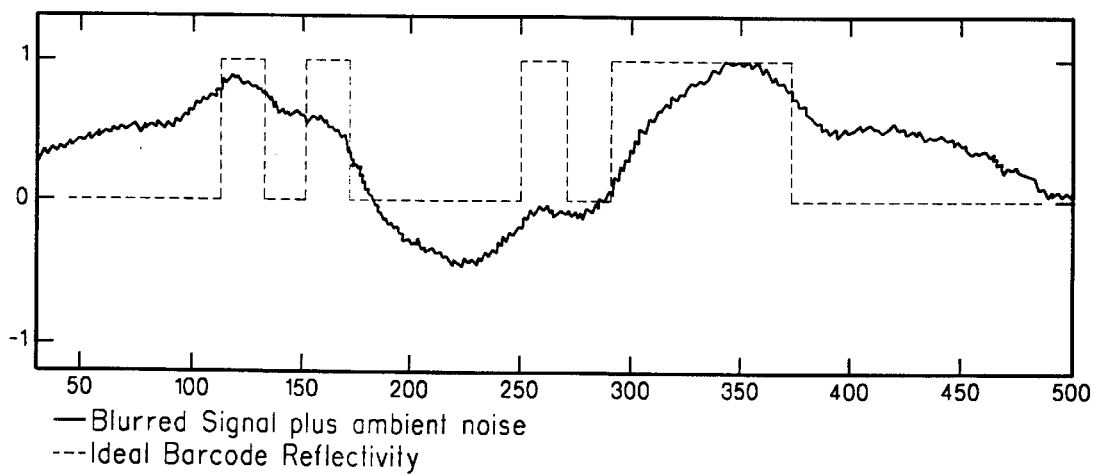
FIG. 40 shows a reflected noisy bar code signal with heavy blurring (spot/module size=2.8)

According to another aspect of the invention the problem of automatic deblurring for bar code laser scanners is addressed. Various systems have been proposed in the past, for example the method set out in U.S. Pat. No. 5,302,812 of Symbol Technologies, Inc. Other known systems include a tuneable enhancement filter and a lens focusing module for a laser—those systems generally move the deblurring control input between several values while collecting several scans of data in the hope of decoding one of the scans. The system according to the above-identified patent examines the contrast of the analog signal received. This implies some means of sampling the analog signal in order to compute the contrast as given by:

$$C=(I_{max}-I_{min})/(I_{max}+I_{min})$$

where $I_{max}$ is the value of the analog signal at a peak, which corresponds to the light reflected from a light coloured (e.g. white) region of the code, and $I_{min}$ is the value of the analog signal at a minimum, which corresponds to the light reflected from a dark coloured (e.g. black) region of the code. However, determining the signal contrast this way can produce erroneous results when ambient light, specular reflection, or random noise corrupts the signal. For example, FIG. 29 shows waveforms of an ideal bar code signal as compared with the received analog signal with ambient light components. The signal is only slightly blurred in this figure. If the signal is then heavily blurred but has the same ambient light components as shown in FIG. 40, one can appreciate that the maximum and minimum signal remain essentially unchanged. Yet, this image is heavily blurred. Accordingly the signal contrast is not necessarily a good indicator of the level of blurring.

Figure 41:
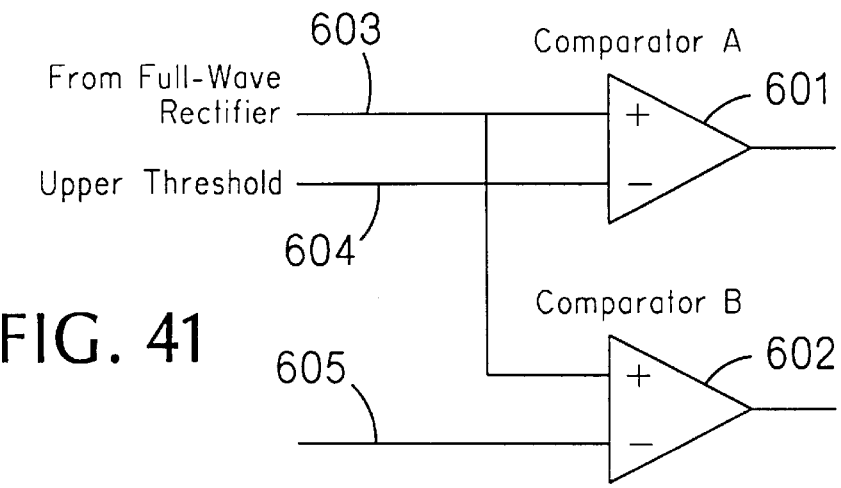
FIG. 41 shows an implementation of a level quantizer.
Figure 42:
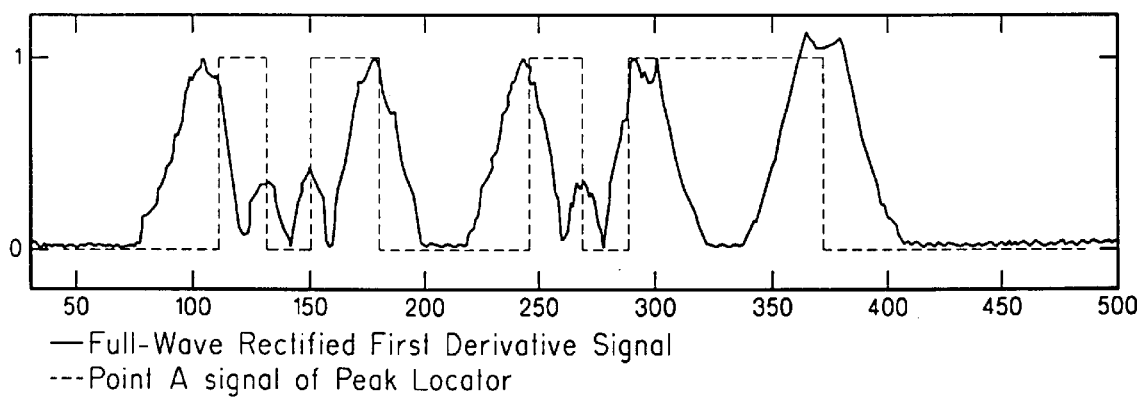
FIG. 42 shows the full-wave rectified first derivative signal of the analog signal of FIG. 40.

The variance of the peaks of the full-wave rectified first derivative signal is a better indicator of when the image is focused. For example, FIG. 30 shows the first derivative signal of the ambient light corrupted analog signal corresponding to FIG. 29. Since the image is only slightly blurred, the peak heights of the full-wave rectified first derivative signal are nearly equal. In contrast, the full-wave rectified first derivative signal of a heavily blurred signal is shown in FIG. 41. This corresponds to the ambient noise corrupted analog signal of FIG. 40. By visual inspection, one can see that this signal exhibits a much larger variation in the peak heights, thereby indicating heavy blurring.

The first derivative signal is generally immune to low frequency noise components in the received analog signal because of its high pass filter characteristic. This is why using it to determine when the signal is in focus proves to be robust in a high ambient noise environment. In addition, it is not necessary to sample the entire signal in order to determine the signal values at a maximum or minimum. Rather, only the peak heights of the full-wave rectified first derivative signal are needed. The reduced number of data points that must be processed lowers the system cost and complexity tremendously. After registering the peak heights of the full-wave rectified first derivative signal, the variance of these peak levels is computed. The smaller the variance, the sharper (or more decodable) the reflected image. The control system will, therefore, work to minimize the variance.

Too much deblurring can, however, increase the noise in the received signal. Therefore, deblurring must only be done to the extent required by the digitizer. This can be ensured by determining when the peak heights of the full-wave first derivative signal are all within a window of voltage range. This window is set by an upper and lower threshold input to a level quantizer such as the one shown in FIG. 41.

Figure 44:
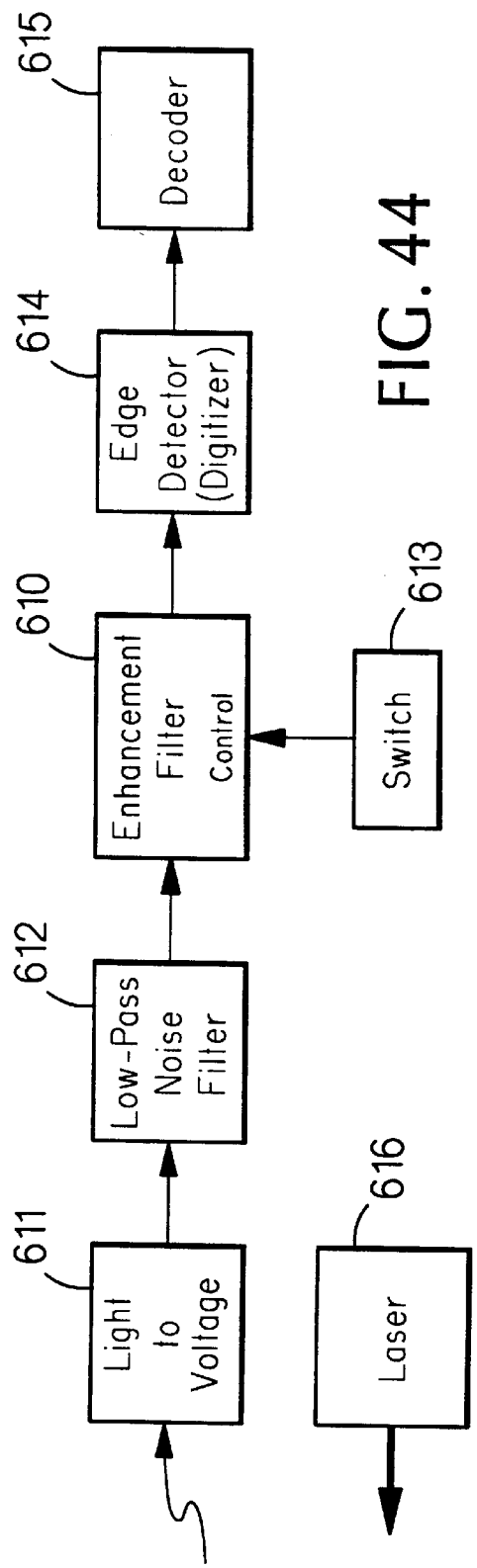
FIG. 44 shows a prior art deblurring system using an electronic enhancement filter.
Figure 45:
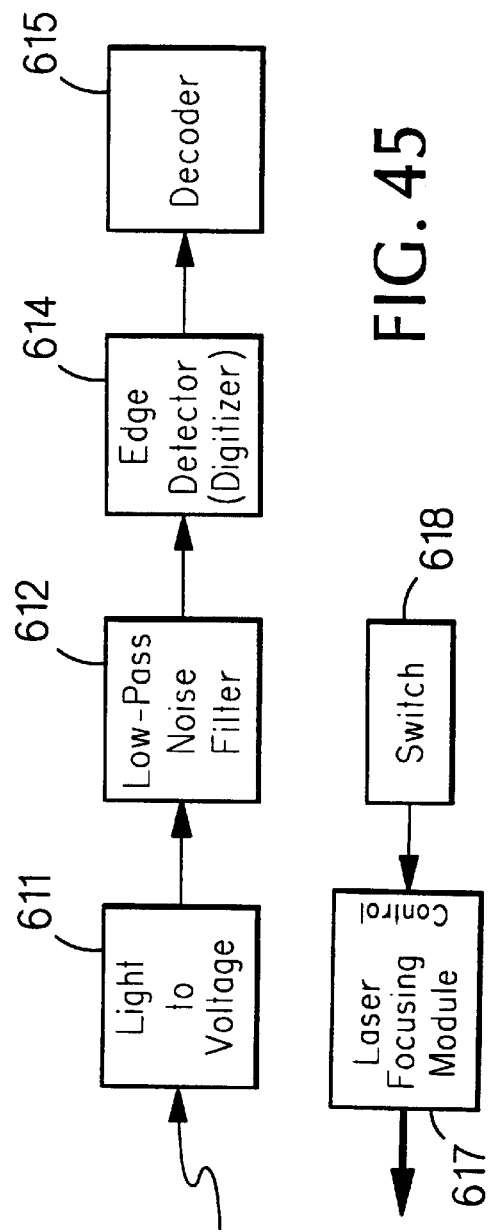
FIG. 45 shows a prior art deblurring system using a laser focusing module.

FIG. 44 and FIG. 45 show prior art deblurring systems for bar code scanning including first and second comparators 601,602, a full-wave rectifier input 603 and upper and lower thresholds 604,605. The system in FIG. 44 uses an enhancement filter 610 such as the type mentioned above to which the light signal converted to a voltage signal at 611 is passed via a low-pass noise filter 612. The enhancement filter 610 is controlled by a switch 613 and outputs to an edge detector 614 and a decoder 615. The light signal is initially generated by a laser 616. FIG. 45 uses a laser focusing module 617 such as the one disclosed in U.S. Pat. No. 5,302,812 and the light signal is converted to a voltage signal at 611, and is processed by a low-pass noise filter 612, an edge detector 614 and a decoder 615. The laser focusing module is controlled by a switch 618. Both systems are essentially open loop in that their control input is randomly switched by switches 613,618 between two or more settings without knowledge of the degree of image blur.

Figure 46:
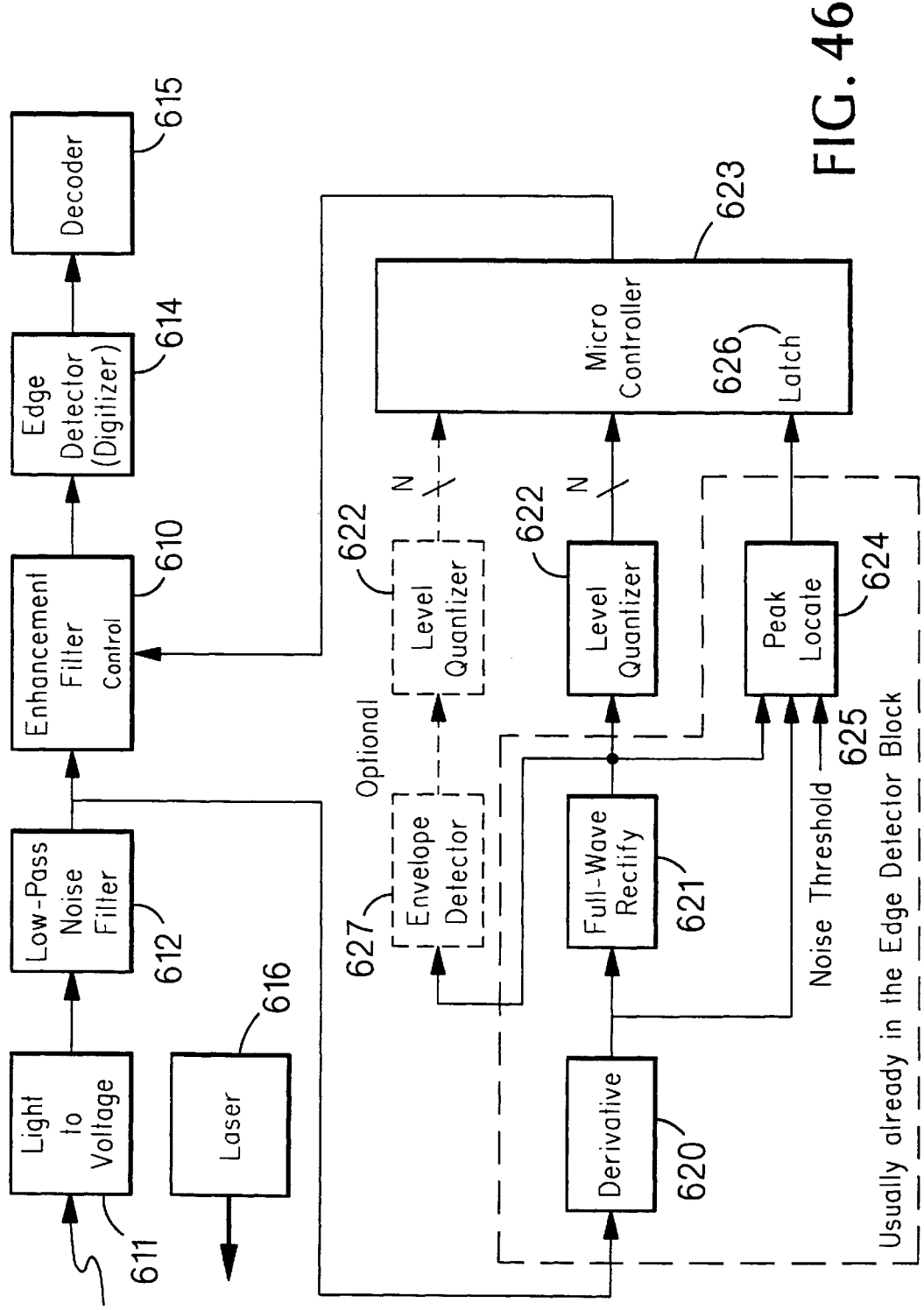
FIG. 46 shows a closed loop deblurring signal according to the present invention using an enhancement filter.
Figure 47:
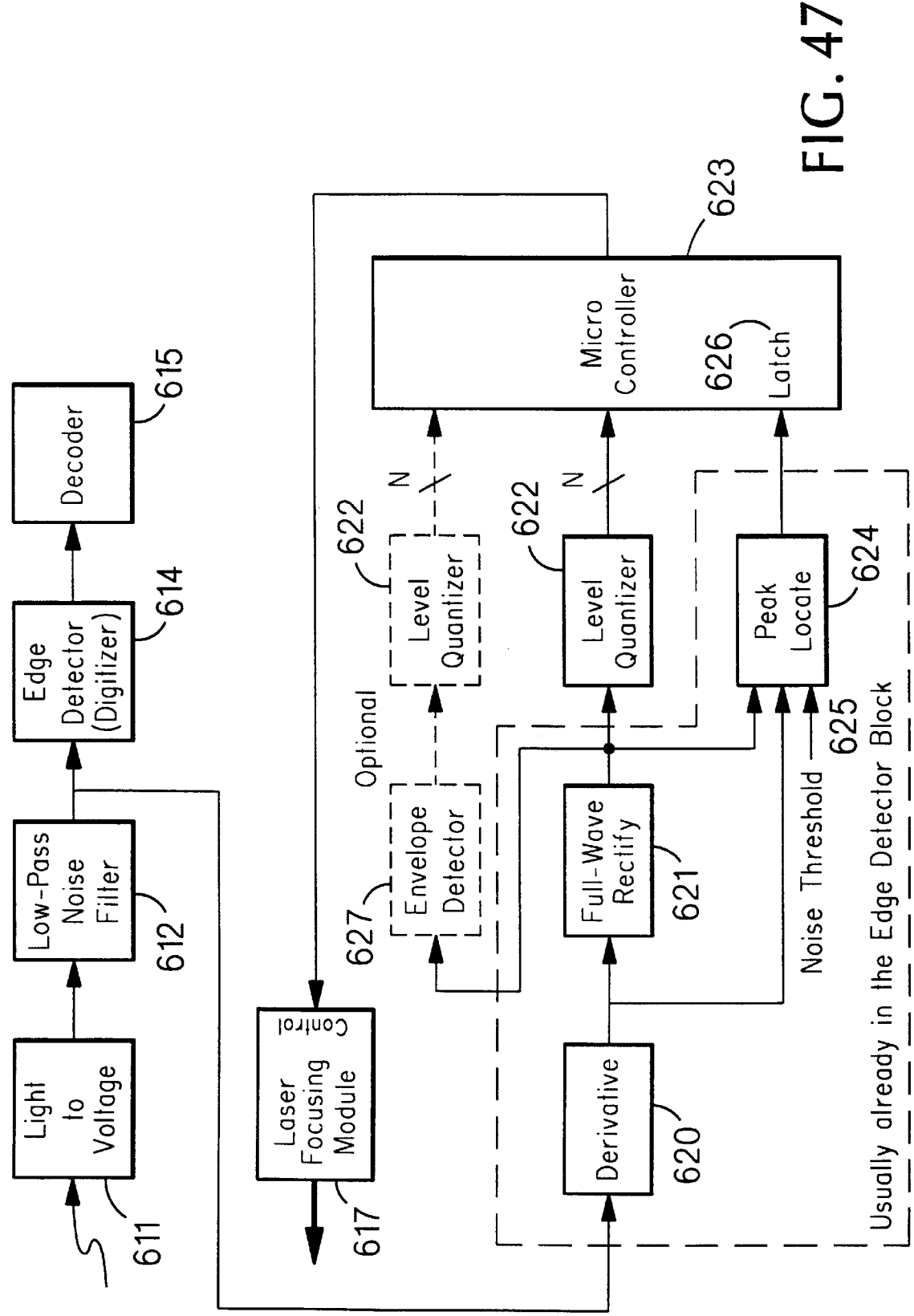
FIG. 47 shows a closed loop deblurring system using a laser focusing module according to the present invention.

FIG. 46 and FIG. 47 shows closed loop versions of the system that checks the variance of the peak heights of the full-wave rectified first derivative signal, and produces the correct control signal that will minimize blurring.

FIG. 46 includes a light signal to voltage signal converter 611, a low-pass noise filter 612, an enhancement filter 610, an edge detector 614 and a decoder 615 as in FIG. 44 together with a laser source 616. Unlike the randomly switched enhancement filter of FIG. 44, however, a closed loop deblurring system is incorporated. FIG. 47 shows a closed deblurring system using a laser focusing module, the basic components of which correspond to FIG. 45. The laser focusing module, however, is switched by the closed loop deblurring system. The control system as shown in FIG. 46 and 47 involves a differentiation 620, a full-wave rectifier 621, a peak location 624, a level quantizer 622, and a micro-controller 623. In most cases, the differentiator 620, full-wave rectifier 621, and peak locator 624 are already part of the edge-detection or digitizer circuity and the required signals may be monitored directly. The micro-controller will count the number of peaks within a voltage window and product a signal appropriate t the level of deblur necessary. This is done in real-time after each scan is collected and before the next scan begins. Since the micro-controller has little to do, these functions can be part of the microprocessor that does the decoding.

Figure 48:
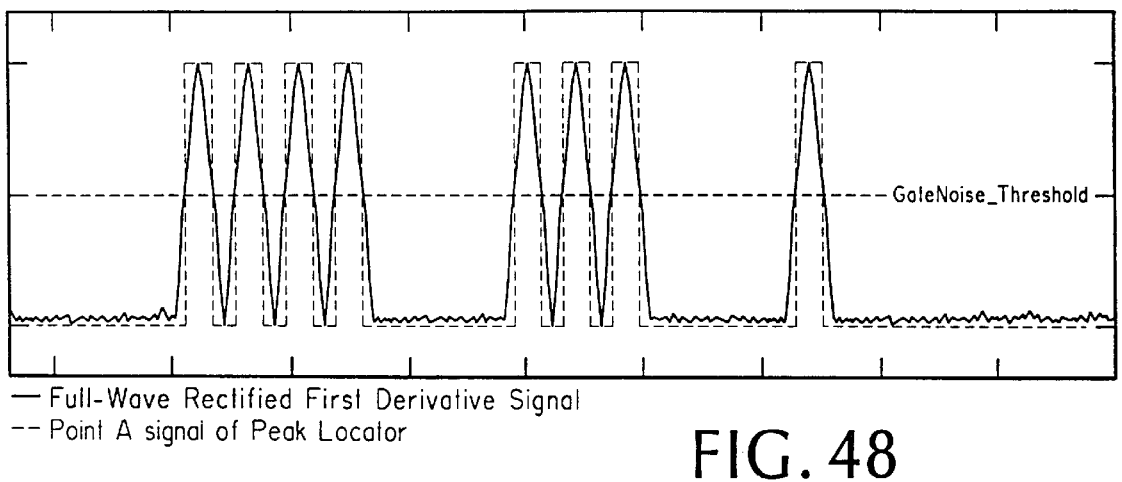
FIG. 48 illustrates the function of the peak locator block of FIGS. 46 and 47.
Figure 49:
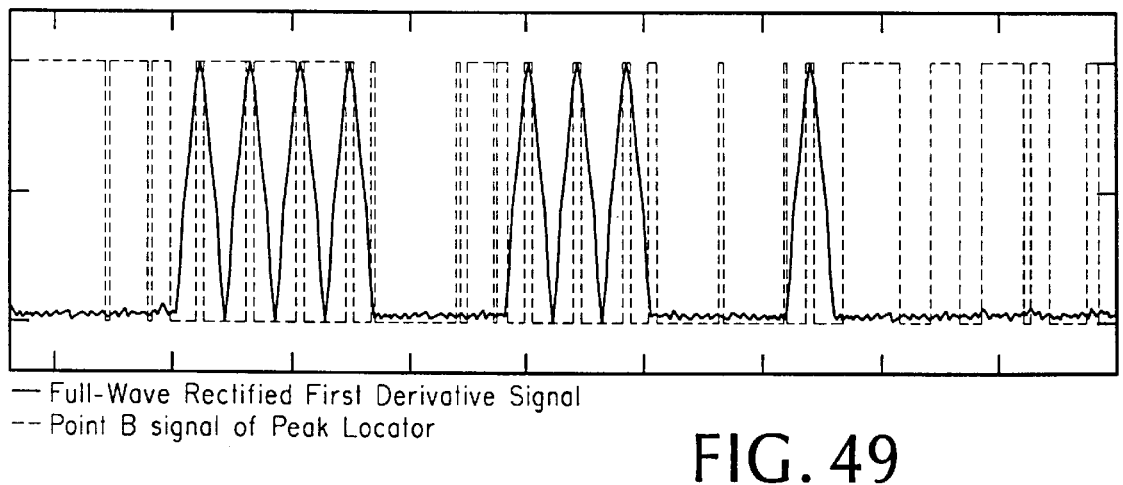
FIG. 49 illustrates the operation of the peak locator block of FIGS. 46 and 47.
Figure 50:
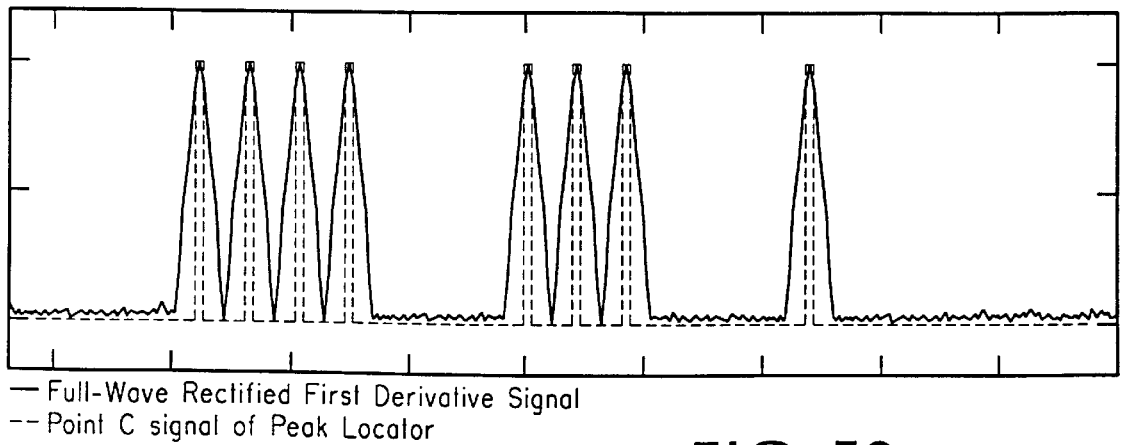
FIG. 50 illustrates the function and operation of the peak locator block of FIGS. 46 and 47.
Figure 51A:
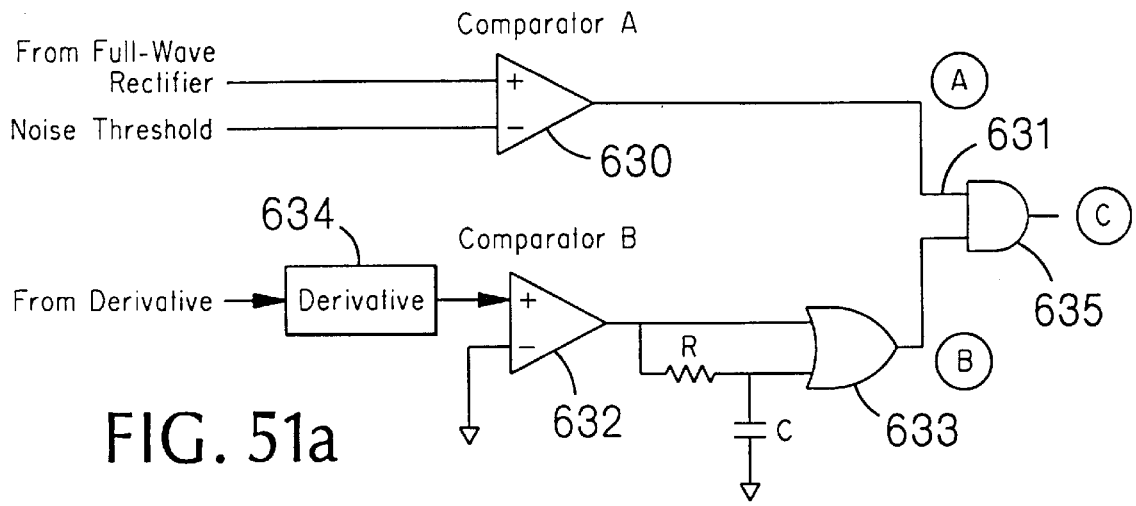
FIG. 51a shows the implementation of a peak locator block.
Figure 51B:
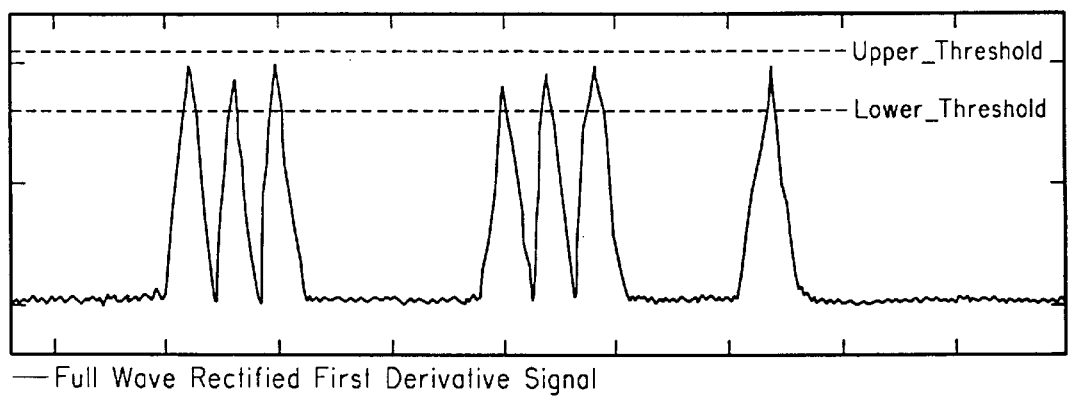
FIG. 51b shows the threshold limits and peaks when an image is focused.

FIG. 48 through FIG. 50 illustrates the function of the peak locator block 624, and FIG. 51 is a block diagram of its implementation. The noise threshold input 625 essentially prevents the block from responding to noise below that threshold. This block's output is a single pulse to a latch 626 in the micro-controller 623 whenever a peak of the full wave rectified first derivative signal is detected above the noise threshold. A comparator A 630 produces the gating signal A 631 above a preset noise threshold. This is shown in FIG. 48. A comparator B 632 and an exclusive-OR gate 633 produce a signal pulse each time the second derivative signal from differentiator 634 crosses zero volts. This event happens at the peak locations of the full-wave rectified first derivative signal, as well as in other parts of the signal. This is shown in FIG. 49. After an AND gate 635, the pulses indicating the true peak locations of the full-wave rectified first derivative signal are produced as shown in FIG. 50.

Figure 52:
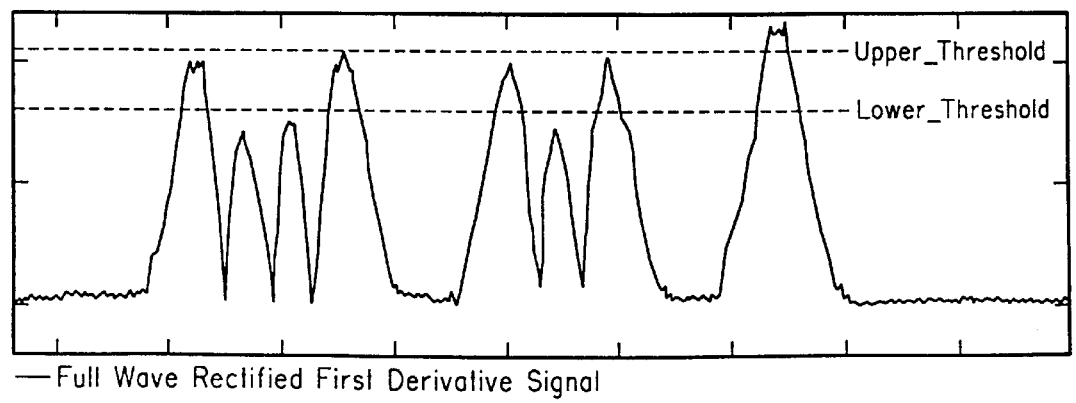
FIG. 52 shows the threshold limits and peaks when the image is blurred.

The peak locator signal is used to indicate the time position of a peak so that the processor may latch the peak value into the level quantizer 622. The number of levels in the quantizer depends on the dynamic range of the received signal. If the system includes an AGC, then the level quantizer may require only two levels. That is, it is only necessary to know whether or not all the peaks are within a certain window of values. If not, the image needs further deblurring. This is shown in FIG. 51 and FIG. 52. Care must be taken not to over-deblur because the increased noise may render decoding impossible. Therefore, the upper and lower thresholds to the level quantizer 622 are set to values that are optimum for the digitizer (edge-detector) 614 used in the system.

It should also be noted that if an AGC will not be used in the system, the level quantizer 622 may be generalised as an N-bit A/D converter. This will make an envelope detector 627 optional. That is, the overall signal strength may be approximated by taking either the average or maximum full-wave rectified peak derivative height. In addition, the voltage level window for determining when the peaks are all of similar heights may be set arbitrarily.

If a focusing module 617 is used for deblurring, the level of the received signal may also be used to determine if the image is moving away from or closer to the scanner. This will help to speedily determine in what direction the control signal should change in order to minimize the blurring. That is, we want to make the spot size smaller by moving the waist of the beam to the image location. For example, if the signal is getting blurrier but the overall signal is getting larger, this indicates that the image is moving closer to the scanner and away from the beam waist. Likewise, if the signal is getting blurrier but the overall signal strength is getting smaller, this indicates that the image is moving away from the scanner and the waist of the beam.

The level quantizer for the peak derivative values may be implemented using several comparators. The number of comparators depends on the dynamic range of the signal. A flash type N-bit A/D converter essentially has $2^N$ integrated comparators. If an AGC is included in the system, only two comparators 601,602 may be used as shown in FIG. 41. This is because the overall signal level will be maintained approximately constant. However, the relationship between the peak heights of the full-wave rectified peak derivative signal will remain unchanged.

Figure 53:
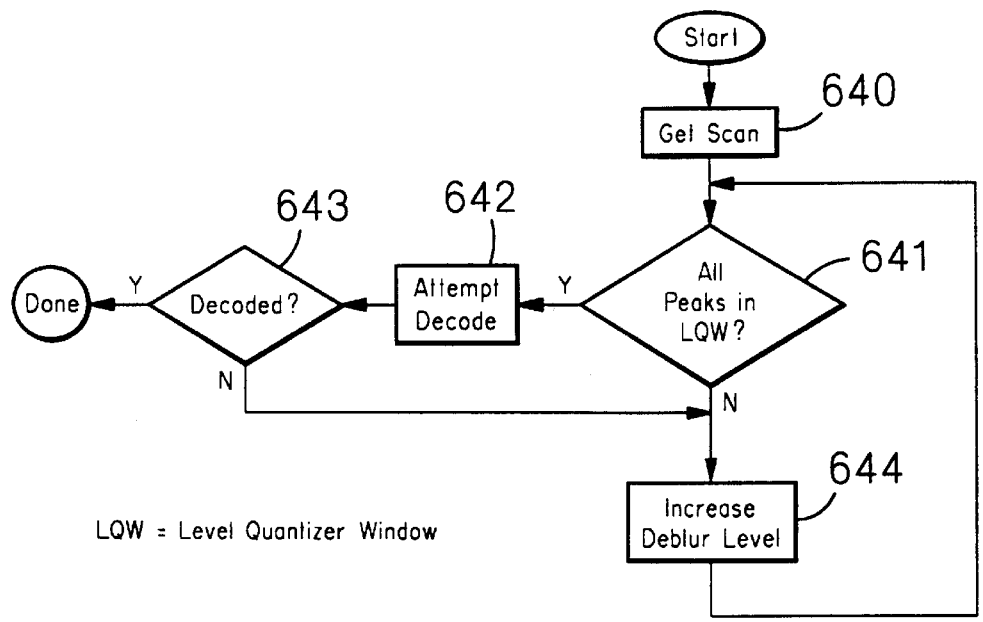
FIG. 53 is an algorithm for deblurring when using a tuneable electronic enhancement filter.

As the spot grows, some of the peak locations will be missed by the peak locator block. This is because some of the valid peaks will fall below the noise threshold level. Therefore, the algorithm must seek not only to minimize the variance of the peak derivative heights, but also maximize the number of valid peaks within the level quantizer window. For instance, in a very noisy environment there may be a large number of peaks, but not all the peaks will be within the level quantizer window. This indicates that the image is not in focus. If the number of peaks is small, and some of the peaks fall outside the level quantizer window, this may indicate that only the larger peaks were detected. That is, the spot may have been too big so that the smaller valid peaks fell below the noise threshold and were not detected. The image is, therefore, in focus when the maximum number of peaks are all located within the level quantizer window. If the current scan has all of the peaks located within the level quantizer window, a decode may be attempted. If the decode fails, more enhancement may be applied to the new scans in an attempt to increase the number of peaks within the level quantizer window. FIG. 53 shows a basic algorithm when the system is used with an electronic enhancement filter and FIG. 54 when the system is used with a laser focusing module.

FIG. 53 shows an algorithm for deblurring when using a tuneable electronic enhancement filter. A scan is received at 640 and a check is carried out to see if all peaks are within the level quantizer window at 641. If yes a decode is attempted at 642 and a decode check is carried out at 643. If not all peaks are in the level quantizer window (LQW) the deblur level is increased at 644 and the process is repeated starting at 641. If the decode at 643 is unsuccessful then the deblur level is increased at 644.

Figure 54:
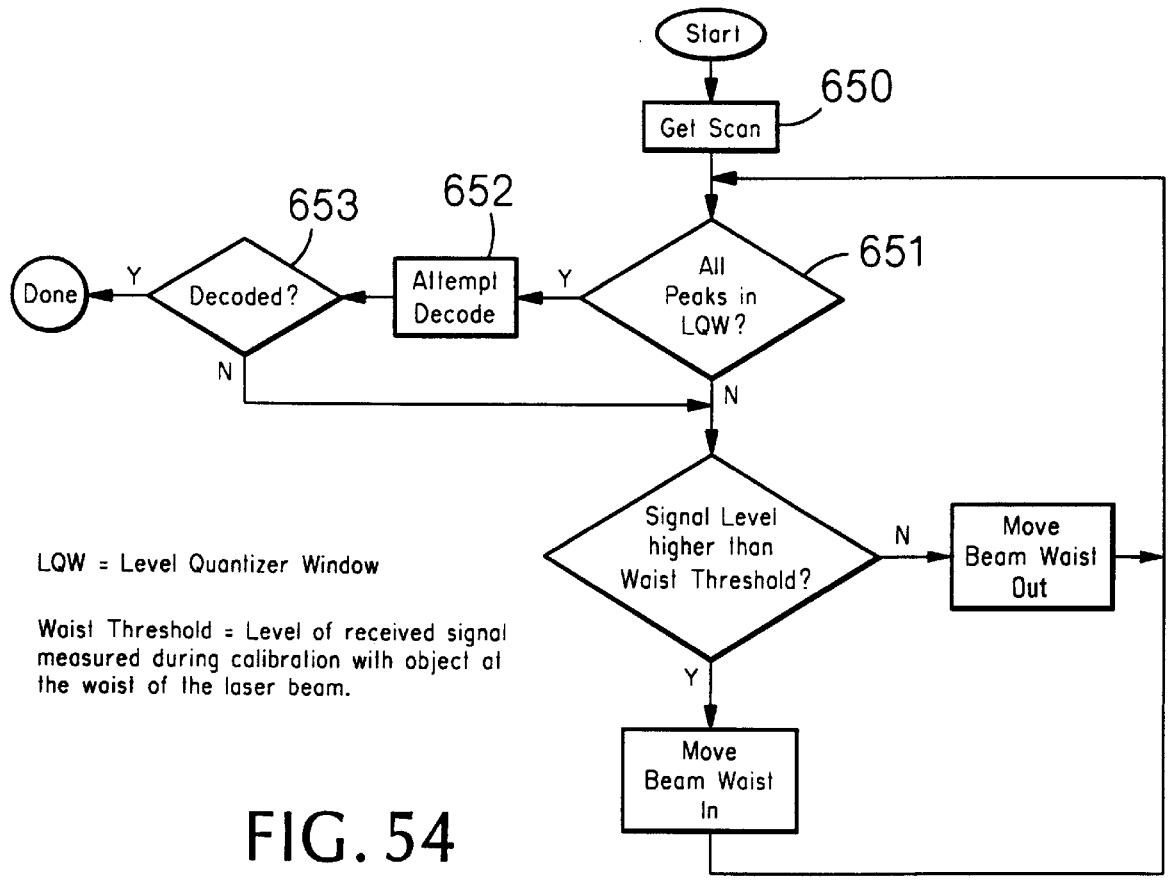
FIG. 54 is an algorithm for deblurring when using a focusing module.

With reference to the algorithm for deblurring when using a focusing model, as shown in FIG. 54, the scan is obtained at 650 and it is determined whether all of the peaks are in the level quantizer window at 651. If yes then a decode is attempted at 652 and a decode check is carried out at 653 if not all of the peaks are within the window, or the decode is unsuccessful, then the signal level is compared with a waist threshold which defines the level of received signal measured during calibration with the object at the waist of the laser beam. If the signal level is higher then the beam waist is moved in and the steps are repeated from 651 if the signal level is lower the beam waist is moved out and the steps repeated from 651.

Where scanners of the "multi-bit" or "fuzzy logic" known types are used, they capture data about the signal's edge strength and location, which information can also be used with the algorithms shown in FIGS. 53 and 54 in order to determine the amount and direction of blur in the received image. The "edge strength" signal may replace a full-wave rectified peak derivative heights.

Figure 55:
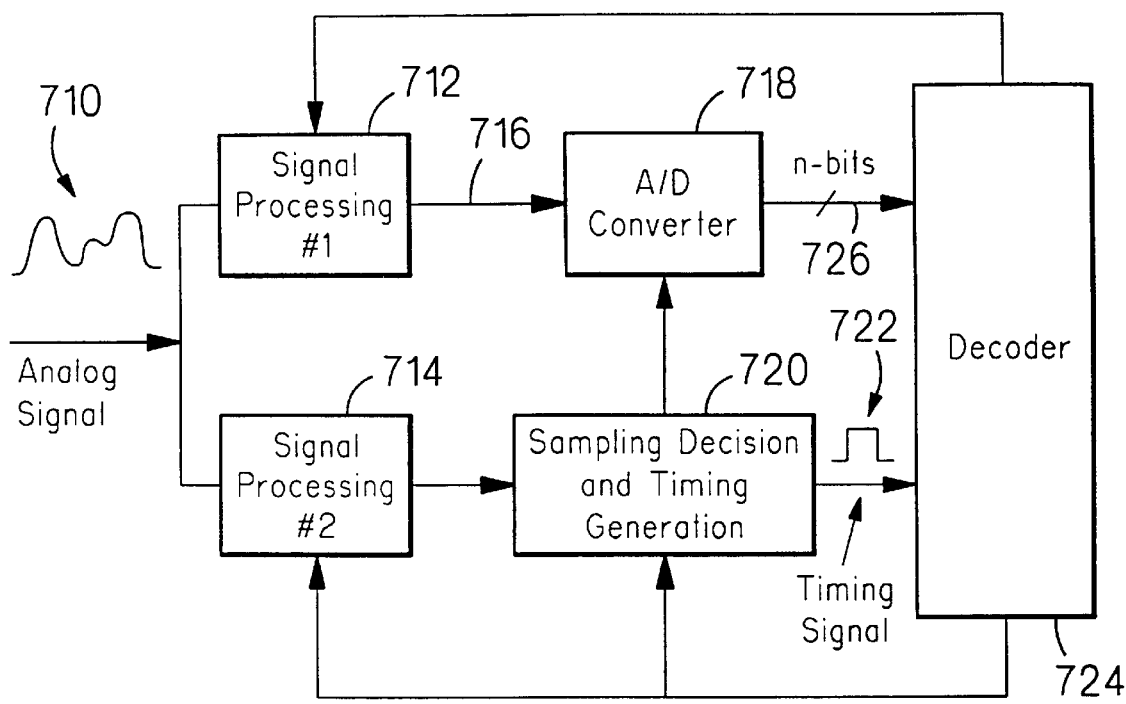
FIG. 55 is a block diagram of an exemplary apparatus for use with a method according to the present invention.

According to another aspect the invention relates to a method of scanning indicia using selective samplings. Turning first to FIG. 55, there is shown a block diagram of an apparatus which embodies the preferred method of the present invention.

The analog signal 710 to be decoded, which may be distorted and/or which may have noise associated with it, is applied in parallel to first and second signal processing blocks 712,714. Although two separate signal processing blocks are shown, some or all of the signal processing functions may be shared. For example, a derivative function could be shared between the two blocks. The first signal processing block 712 operates upon the signal in any desired manner, to derive a waveform which is output along a line 716 and applied to an A/D converter 718. The output waveform need not be a simple function of the analog signal 710. For example, the output waveform may be derived from the analog signal using a combination of sample and hold circuits, derivatives, threshold functions and subtractors. Nonlinear circuits such as clamping circuits may also be utilized.

The output waveform is selectively sampled by the A/D converter 718 according to signals provided by a sampling decision and timing generation block 720.

The second signal processing block 714 receives the analog signal 710, and performs the processing that is required by the sampling decision and timing generation block 720. The block 720 decides when a selective sample should occur and generates the appropriate timing signal 722, which is passed to a decoder 724. The appropriate signal is also passed to the A/D converter 718.

Figure 56:
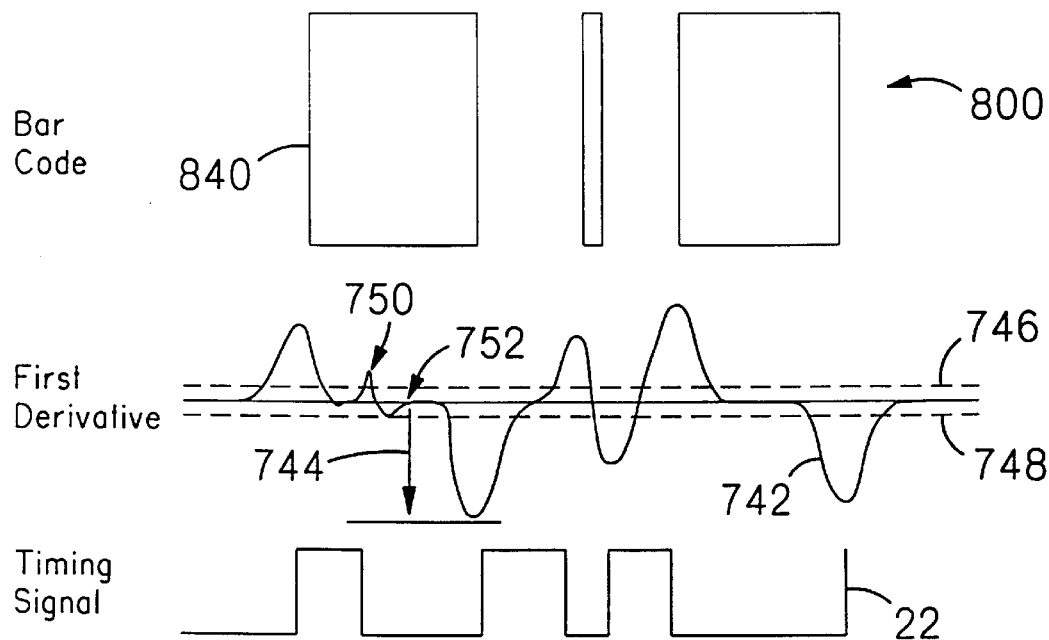
FIG. 56 shows an exemplary method according to the present invention, for decoding a bar code signal.

The detailed logic within the block 720, which determines exactly when the output waveform along the line 716 is to be sampled, may be chosen according to the particular application. The decision criteria will, however, frequently involve a selected noise threshold, with features in the signal below that threshold being ignored. A specific example is shown in FIG. 56, which will be described below.

The main purpose of the timing signal 722 is to synchronize the transfer of the selective samples to the decoder. This is necessary due to non-uniform sampling of the waveform. The timing signal provides crucial timing information such as the time between the selective samples.

The timing signal need not be a single signal but could, in some circumstances, be a multiple signal on a plurality of digital lines. Alternatively, the timing information could be multiplexed on a single line. There may be situations, for example, where it is convenient to have two digital lines, one for positive peaks which have been detected in the output signal on the line 716, and one for negative peaks.

Although synchronization is the timing signal's main function, the timing signal may in itself contain additional information about the waveform that the A/D samples do not convey. Additional pulses can, for example, selectively send additional timing information about the original waveform. The timing signal may, for example, not only synchronize the data transfer but may also contain edge rise time information represented as a pulse width. Such a concept is disclosed in a patent application filed concurrently herewith entitled "Optical Scanners and Signal Processors Therefore", inventors David Goren, Stephen Shellhammer, Harry Kuchenbrod, Donna Pandolfo, Gary Serbin, Guy Cipriani, and Edward Barkin, assigned to the same assignee as the present invention. The information could also be used without the A/D converter for a very low cost implementation: see for example our copending US patent application number.

The A/D converter 718 receives the output signal along the line 716, and selectively samples it according to instructions received from the sampling decision and timing generation block 720. The sampled n-bit output is passed along the line 726 to the decoder 724.

The A/D converter 718 may include a sample and hold circuit if required. Due to the slower data rate compared with sampling the analog signal at the Nyquist rate, a relatively slow and relatively inexpensive A/D converter can be used. The number of bits required depends on the accuracy of the feature being measured, but normally 4 to 8 bits will be sufficient. The A/D converter may, if necessary, be bipolar to contain signed data. For example, if the peaks of the first derivative of the analog signal 710 are above a reference voltage, the peaks can be positive. If the peaks are below the reference voltage, the values may be negative.

Figure 57:
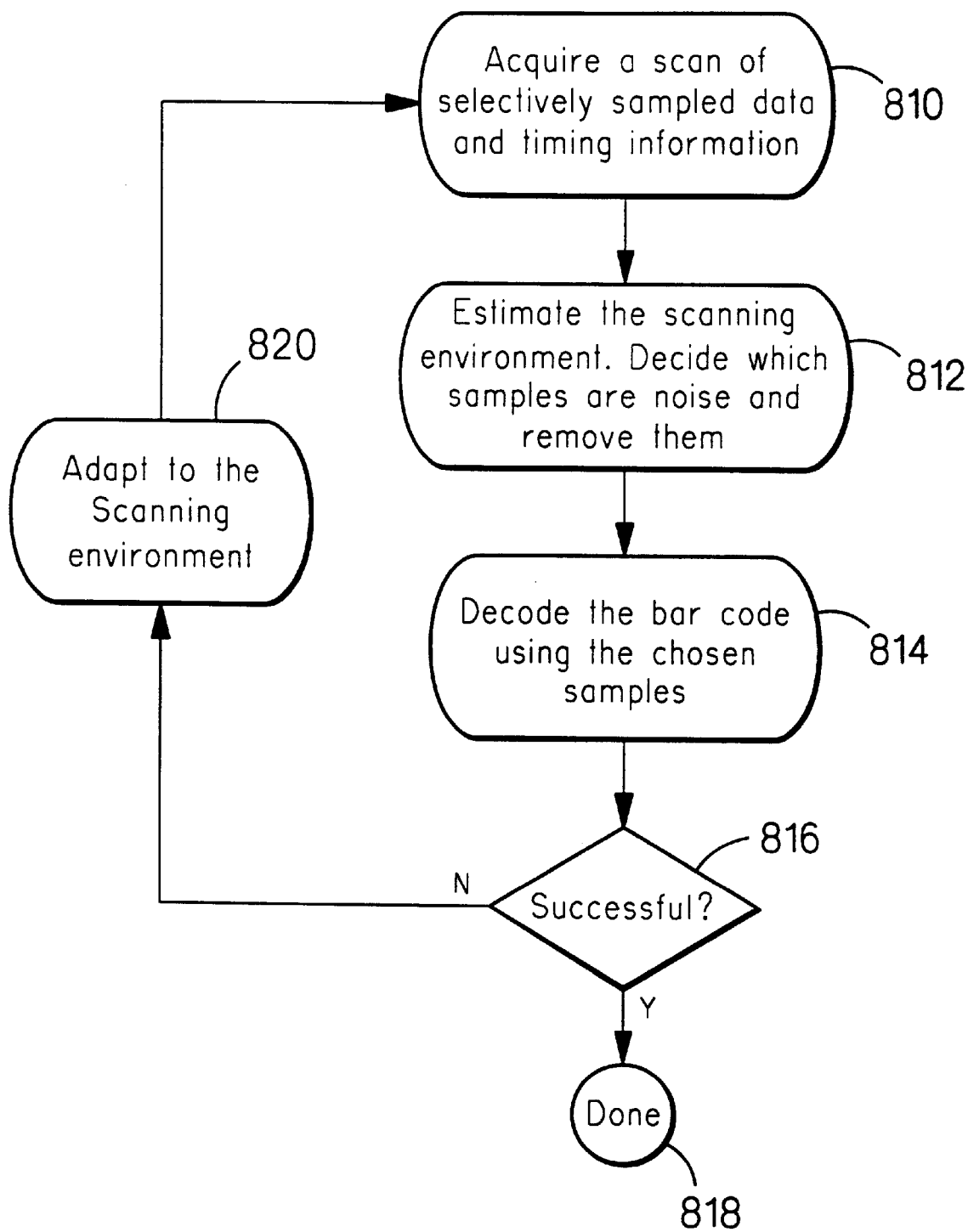
FIG. 57 is a flow chart of the operation of the decoder shown in FIG. 55.
Figure 58:
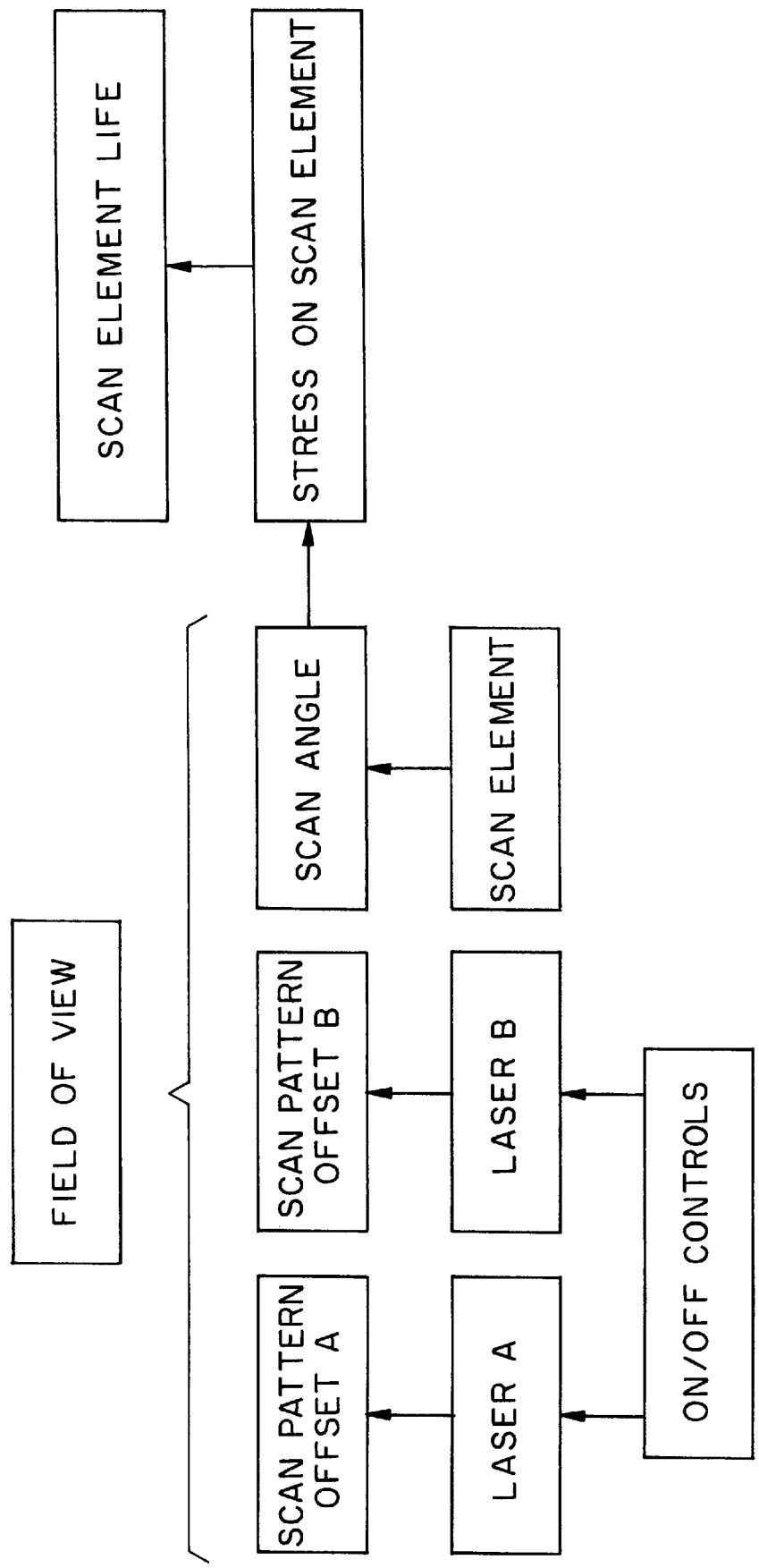
FIG. 58 is a diagram illustrating a field of view resulting from a scan element and multiple lasers having different scan pattern offsets.
Figure 60:
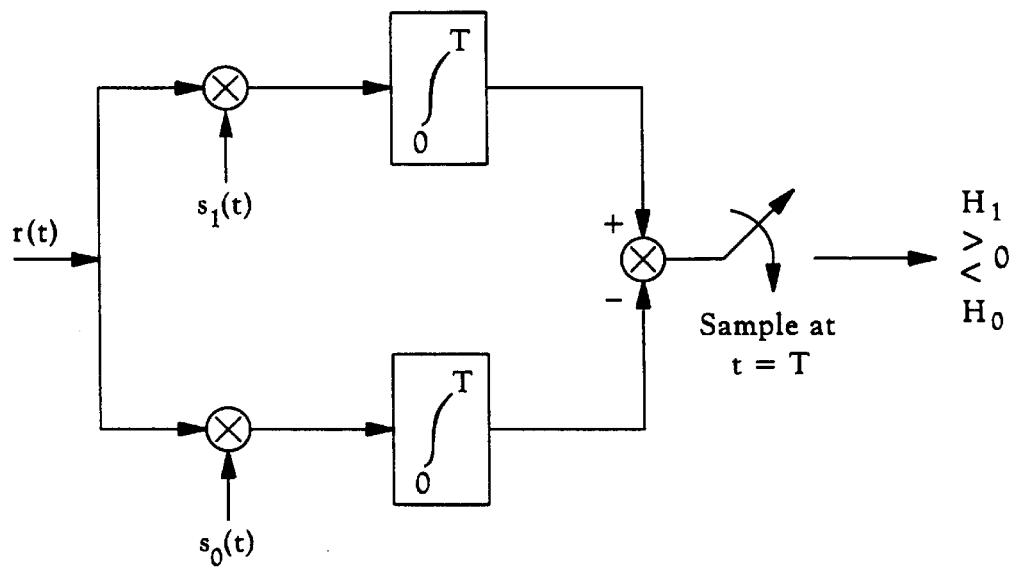
Figure 59:
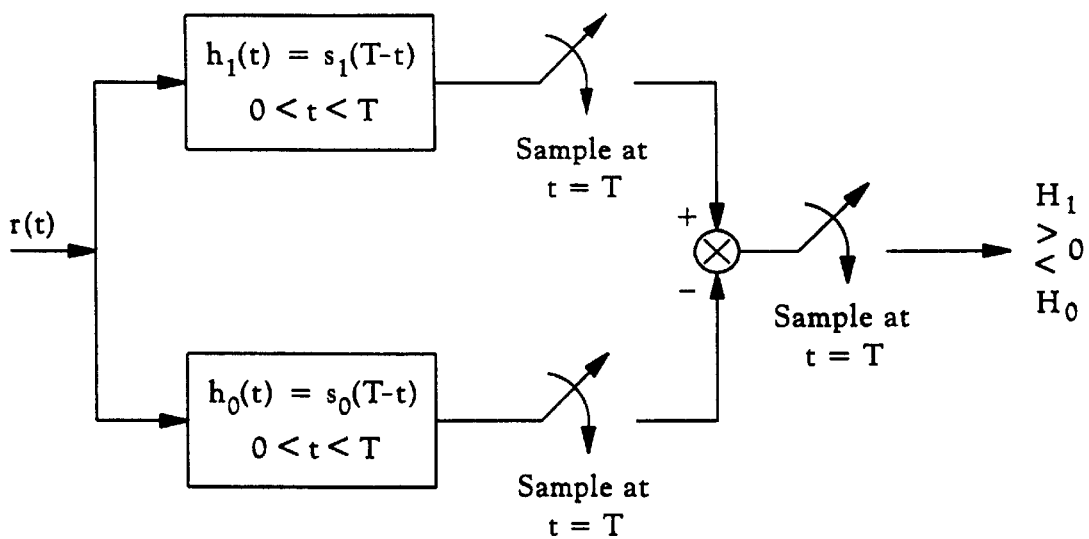

A flow chart of the operation of the decoder 724 is shown in FIG. 57. The decoder first acquires and stores the selective samples and the timing information. This information will normally contain both the features of the waveform that identify the bar code or other indicia (for example the bar code edges) as well as unwanted noise. The decoder then uses an appropriate algorithm (the details of which are well within the scope of a skilled man in the art) to attempt to identify which samples are noise and which samples represent the indicia to be decoded. Typically, the algorithm will use a combination of trial and error and data analysis techniques, such as statistical classification. This analysis will also lead to an estimate of the coding environment, for example the noise level and the distortion levels. An attempt is then made to decode the indicia using only those features which have been determined by the algorithm to represent the indicia.

Added decode security may be required, according to the algorithms estimate of the difficulty of the decode environment. For example, the decoder may require additional redundancy before signalling a successful decode if it determines that a high noise level is present if the decode is unsuccessful, a feed-back signal or series of signals is sent from the decoder to the second signal processing block 714 and the sample decision and timing generation block 720. These react to the signals by adapting the scanner to the scanning environment. Another scan of the indicia to be decoded may then be taken, this being processed by the adapted electronics and/or digital logic for a second attempt to achieve a satisfactory decode.

The adaptations of the scanner may include, inter alia, changing noise thresholds, signal filtering, frequency bandwidths, enhancement or deconvolution filters, and other electronic and/or digital logic. The mechanical/optical features of the scanner may also be adaptive, for example the system may automatically change the intensity of the laser beam used for scanning, the laser focusing, scanning speed and pattern, or other variables.

Returning to FIG. 57, it will be seen that at step 810 the system acquires a scan of selectively sampled data and timing information. The decoder then attempts to estimate the scanning environment, and to deal as far as possible with noise and with systematic inaccuracies in the data. This is carried out at step 812. At step 814, the decoder attempts to decode the bar code (or other indicia) using only those samples which have been determined to represent real data. At step 816, a test is made to see whether the decode has been successful. If it has, the algorithm finishes at step 818. If the decode was unsuccessful, the scanner is adapted to the scanning environment at step 820, and the process is repeated using a new scan.

A simple embodiment of the present invention is illustrated at FIG. 56. As illustrated, the bar code symbol 800 to be decoded includes a small flaw 840.

The symbol 800 is scanned in the usual way, and the first derivative 742 of the raw analog signal is determined. In this embodiment, it is the peak values of the first derivative signal which are used as the selective sample points. These peaks may be positive or negative, and typical negative peak being illustrated in the drawing by the arrow 744.

The sample decision and timing generation logic is arranged to output a timing signal 722 which changes state at each of the selected sample points.

The decision logic within the block 720 (FIG. 55) is arranged to accept a sample only when the first derivative is larger than a positive minimum level 746 or is lower than a negative minimum level 748. Accordingly, the small peak 750, associated with the flaw 740 corresponds to an accepted sample point, because it lies outside the lines 746,748, whereas the even smaller peak 752 is not accepted.

The peaks in the first derivative signal 742 represent inflection points of the original raw data signal, and are defined as bar code edge locations in many prior art digitizers. The decoder 724 reads in all the pack values, some of which of course represent real edges and others which represent noise. The decoder then decides which edges are real, for example by trial and error or by histogram analysis. Once the real edges have been chosen, the bar code signal can be decoded by standard methods. If the decode is unsuccessful, it is clear that the edges have not been chosen correctly, and the adaptive algorithm shown in FIG. 57 comes into play.

From the peaks of the first derivative and the bar code decoded or partially decoded, information about the decoding environment can be determined. For example, a large number of false edges can indicate a noisy environment. The various heights of the peaks of the real edges can also be used to estimate the ratio of the scanning spot size to the bar sizes being scanned. This information about the scanning environment is then used to adapt the mechanical, optical, electronic or digital features of the scanner prior to a further scan being taken and another attempt being made to decode the bar code symbol. In an alternative version of the method, selective sampling may be performed on more than one feature simultaneously. This could be done either with multiple A/D convertors, or alternatively by using a single A/D convertor and multiplexing the output.

If is of course not essential for the preferred method to be embodied within the specific architecture shown in FIG. 55. There are many alternatives. For example, the first and second signal processing blocks 712,714 could be merged into a signal unit, or even omitted altogether for suitable analog input signals 710.

As previously mentioned, the method that has been described above may find particular application in laser scanners of the type in which the received beam profile is multi-modal, and contains side lobes which are an artifact of the imaging process. The example scanners using non-conventional optics such as axicon or holographic optics, and scanners using enhancement filters to increase depth of modulation.

It will be appreciated that whilst specific features may have been discussed in relation to specific embodiments, all of the features and embodiments may be interchanged or combined where appropriate. In addition the embodiments may include various alternative or additional features. For example, where it is desired to optimise working range and decoder robustness with respect to changes in the scanning environment, various additions can be made. For example the signal to noise ratio and the noise components in a received signal from artificial light sources can be sensed, and the laser coherence, laser focus, laser power and optical and electronic filter bandwidths can be adapted accordingly.

Where noise pulses are received resulting from artificial light sources, the scanning frequency and phase can be suitably adjusted to avoid those noise pulses, and an adaptive noise filter can be used to eliminate interference from ambient sources. A two dimensional array of photodiodes each with a limited field of view can be used, wherein the on time of several of these photodiodes can be synchronised from a laser spot so that a moving field of view is arrived at in a manner analogous to a phased array antenna. Expressed in other words, the signals from several of the photodiodes are summed together but the amplitudes rather than the phases between photodiodes are modified.

An edge enhancement filter can be used to change the enhancement level based on bar code density such that, for higher densities a large enhancement value is used. Different optical modules and laser wave lengths can be used dependent on the environment in which the scanner is to be used—relevant information can be gained from a site survey to determine the optimum modules and wave lengths. In high ambient light environments the scan pattern can be changed to a lower frequency single line, the field of view being corresponding shrunk. If the omni-directional mode was previously selected it is overridden—thus the high ambient light will have less effect.

The bandwidth of the optical filter can be reduced if a closed loop temperature control on the laser is maintained (using a thermo-cooler) so that the wavelength is kept within a very narrow margin. Alternatively the bandwidth of the optical filter can be adjusted to match the wavelength of the laser as the temperature changes, again minimising the required bandwidth. It is also possible to sense the bar code transport speed and size—the scan pattern can then be changed to optimize for aggressiveness. The mode of operation in which the scanner is being used, for example passed through or presentation, can be learnt by looking at the past history of scan attempts and changing the scan pattern to one that is optimum for the mode of operation. For example, in presentation mode, more of the bar code signal will be collected for a given number of scans, and less in pass-through mode. For CCD's, the integration time focusing lens and illumination intensity and localisation can all be changed to optimise operation with regard to the scanning environment.

Another problem that may be desired to solve will be to increase the field of view without increasing the scan angle on the scan element. It is desired to increase the scan element life by reducing stress on the element. To that end, multiple lasers that have different scan pattern off-sets can be used, the on/off controls of the lasers being synchronised such that a larger field of view can be covered. The scan pattern shape can be changed to cover the required field of view which may be of particular use in, for example, reverse vending applications.

It may also be desired to improve the scanning ergonomics and to do that the orientation in which the user is holding the device (for example a terminal) can be sensed so that the scan pattern is pointed in a fixed direction (perhaps downwards) independent of how the user holds the device. The scanner may be arranged to allow the scan pattern to switch to an optimum pattern for either left or right handed use. A bull's-eye or similar pattern can be produced for aiming purposes. The aiming pattern can be used to determine the size of a bar code such as a scan pattern need only open to the correct size.

Each user may input a customised set of scanning preferences. For example one user might want the scanner to be a single line scanner when it is picked up and another may want it to be in an omni-direction configuration instead. The personal preferences can be stored in a bar code (either 1-D or 2-D) and the user can scan the bar code to configure the scanner to the user's liking. Alternatively, when the user signs on to the user's register by entering an ID code which is a required procedure in many establishments the scanner can automatically be configured for that user by reading the code.

In some cases a large scan pattern may cover too much of the counter space and bar codes may be decoded unintentionally, for example bar code symbols found on objects other than that which are being scanned. To overcome this a scan pattern can be adapted to confine the area of scanning. For example the counter top may be cluttered during transactions and the scanner may use object sensing means to direct the scan pattern to a less cluttered area.

Whilst the scanner is idle, it is desired to use that idle time in a profitable and useful manner and it is proposed to use the laser scan engine to display scan patterns, numbers, letters, words, symbols, signs, service messages (such as battery low), error messages and other messages such as "welcome" that will enhance the shopping experience for the customer and improves the scanner's utility.

The scanner device can also be utilised for other forms of identification than product identification, for example biometric identification. In that case the bar code scanner can generate a dense pattern for imaging finger prints and signatures. The scan pattern can adapt to the optimum shape and density for capturing these as images.

It is desirable for the scanners to provide user feed-back, for example where the scanner includes a sound-emitting device such as a beeper, the volume of the beeper can be adjusted to rise above the ambient noise level by having the beeper's speaker coil sense the level of ambient noise. Voice feed-back can be provided directing the user to bring a bar code closer to the bar code symbol, move it further away, slow down the pass-through rate, aim and align the beam of the correct position (especially for signature capture applications) and generally direct the user to other parameters of operation or other 2-D applications. The scanner could be arranged to sense feed-back from components in the scanner, such as a laser current, motor feed-back signals and overall power consumption changes, and provide user feed-back for pending service calls in order to keep the maintenance level of the scanner at a high level.

The scanner's performance can be optimised depending on a bar code set expected to be scanned. Evidently, during different times of the day or year products of a certain type may be more popular—alcoholic beverages in the evenings, gift-type products during the Christmas period. The scan pattern of the scanner can be changed to match the characteristics of the bar codes and packing of these types of products at the relevant times of day or year. For example, the bar code may be located in a busy graphical background on the packaging of goods that can upset the signal processing when using large scan patterns—hence a smaller scan pattern would be desired. In shipping applications, products from different vendors may be expected during different times of the day. Each vendor may use a characteristic printing style of symbology which a different scan pattern may be optimised. The user may consistently scan a number of bar codes of different styles but in a specific order. For example a UPC, then a PDF, then a signature. The scanner can sequence the best scan patterns for this process.

Although the invention has been specifically described in connection with the decoding of indicia, particularly bar code symbols, the technique could be applied to many different types of signals and applications. More generally, the method the present invention may be applied to pattern recognition, either in detected images or in detected sounds. The method could be used, for example, in voice recognition techniques and/or speech recognition.

While this invention has been described with reference to a specific embodiment, the above description is not meant to be construed in a limiting sense. Various modifications of the disclosed embodiments, as well as other embodiments of the invention, will be apparent to persons skilled in the art upon reference to this description. It is accordingly intended that the appended claims will cover any and all such modifications and embodiments as fall within the scope and spirit of the invention.

APPENDIX A

MATCHED FILTERS

Matched filters are known for communication receivers and radar detectors and are discussed in detail in "Detection of Signals in Noise" by A. D. Whalen, Academic Press, 1971 and "Detection, Estimation and Modulation Theory, Part I," by H. L. Van Trees, Wiley 1968. The skilled man will therefore be aware of the basic components and characteristics of such a system. There follows, however, a summary of the important points:

In a binary communication system one of two signals is transmitted and the received signal is the transmitted signal corrupted by additive white noise. The receiver design can viewed as a hypothesis testing problem where there are two hypothesis and the receiver must determine which hypothesis is most likely. The two hypothesis are, $$H_0 : r(t) = s_0(t) + n(t) \quad \text{(A.1)}$$
$$H_1 : r(t) = s_1(t) + n(t).$$

The signal is transmitted during the time interval [0, T]. The noise, n(t), is a zero-mean Gaussian white noise process with power spectral density of $N_0/2$.

The optimum receiver that minimizes the bit error rate is the correlation receiver see FIG. A.1. The difficulty with the correlation receiver is that the correlation operation is difficult to perform. It requires modulating the received signal with one of the possible input signals and then integration. It turns out that the correlation operation can be replaced with a linear filter. The filter that gives the same output as the correlator is the matched filter as shown in FIG. A.2.

The filter is called a matched filter since the impulse response of the filter is matched to the signal that one is trying to detect. The impulse response of the filter is a time reversal of the signal that is to be detected, $$h_i(t) = s_i(T-t) \quad 0 \leq t \leq T; \quad i = 0, 1. \quad \text{(A.2)}$$

The matched filter receiver represents the optimum receiver in the sense of minimizing the bit error rate. The matched filter has another desirable characteristic; it maximizes the signal-to-noise ratio. Let the output of the matched filter be e(t), then at the sample time we have, $$e(T) = \int_0^T h(\tau) r(T-\tau) d\tau. \quad \text{(A.3)}$$

If we let r(t) = s(t) + n(t) then the filter output becomes, $$e(T) = \int_0^T h(\tau) s(T-\tau) d\tau + \int_0^T h(\tau) n(T-\tau) d\tau. \quad \text{(A.4)}$$

The signal and noise components are easily identified as, $$S(T) = \int_0^T h(\tau) s(T-\tau) d\tau. \quad \text{(A.5)}$$

$$N(T) = \int_0^T h(\tau) n(T-\tau) d\tau. \quad \text{(A.6)}$$

APPENDIX A-continued

MATCHED FILTERS

The signal-to-noise ratio is the signal value divided by the standard deviation of the noise (the noise has zero mean), $$SNR \triangleq \frac{S(T)}{\sqrt{E[N^2(T)]}}. \quad \text{(A.7)}$$

Since the noise is white the expected value of $N^2(T)$ is given by [3], $$E[N^2(T)] = \frac{N_0}{4\pi} \int_{-\infty}^{\infty} |H(j\omega)|^2 d\omega. \quad \text{(A.8)}$$

It can been shown that for the matched filter the signal-to-noise ratio (in power) is given by, $$(SNR)_p = \frac{2E}{N_0} \quad \text{(A.9)}$$

where E is the energy of the signal, $$E \triangleq \int_0^T s^2(t) dt \quad \text{(A.10)}$$

and the power spectral density of the noise is $N_0/2$.

We claim:

1. A device for reading a bar code, said device comprising:
   a) a scanner for scanning the bar code with a plurality of scan patterns using a plurality of lasers;
   b) a sensor for sensing light reflected from the bar code on a first scan and for producing an analog signal representative of the bar code indicia;
   c) a comparator for comparing a first signal corresponding to the analog signal against a threshold range to identify whether features of the first signal fall within the threshold range; and
   d) an adjuster for varying a parameter of the device on the second scan if the comparison is unsuccessful.

2. The device of claim 1, further including a derivative module arranged to receive the analog signal and output the first signal for comparison with the threshold range, wherein said first signal is representative of the first derivative of the analog signal.

3. The device of claim 1, further including an electronic enhancement filter for enhancing the features of the analog signal.

4. The device of claim 3, wherein said adjuster varies the parameter of said enhancement filter.

5. The device of claim 1, wherein said adjuster varies laser focusing parameters of the plurality of lasers.

6. A method for reading a bar code, said method comprising the steps of:
   a) scanning the bar code with a plurality of scan patterns using a plurality of lasers;
   b) sensing light reflected from the scanned bar code and for producing an analog signal from the first scan representative of the bar code indicia;
   c) processing the analog signal; and
   d) adjusting the shape of a scan pattern from the plurality of scan patterns based on the result of the processing step.

* * * * *